United States Patent
Schrems

(10) Patent No.: US 11,039,238 B2
(45) Date of Patent: *Jun. 15, 2021

(54) WIRELESS EARBUD CHARGING AND COMMUNICATION SYSTEMS AND METHODS

(71) Applicant: Royal Isle Design LLC, Howell, MI (US)

(72) Inventor: Paul Schrems, Howell, MI (US)

(73) Assignee: Royal Isle Design LLC, Howell, MI (US)

( * ) Notice: Subject to any disclaimer, the term of this patent is extended or adjusted under 35 U.S.C. 154(b) by 160 days.

This patent is subject to a terminal disclaimer.

(21) Appl. No.: 16/303,444

(22) PCT Filed: May 19, 2017

(86) PCT No.: PCT/US2017/033681
§ 371 (c)(1),
(2) Date: Nov. 20, 2018

(87) PCT Pub. No.: WO2017/201500
PCT Pub. Date: Nov. 23, 2017

(65) Prior Publication Data
US 2020/0068286 A1    Feb. 27, 2020

Related U.S. Application Data

(63) Continuation-in-part of application No. 15/340,133, filed on Nov. 1, 2016, now Pat. No. 9,906,851.
(Continued)

(51) Int. Cl.
*H04R 1/10* (2006.01)
*H02J 50/10* (2016.01)
(Continued)

(52) U.S. Cl.
CPC ......... *H04R 1/1025* (2013.01); *G06F 1/1626* (2013.01); *G06F 1/1632* (2013.01);
(Continued)

(58) Field of Classification Search
CPC   H04R 1/1025; H04R 1/1016; H04R 2420/07; H04R 2499/11; H02J 50/10;
(Continued)

(56) References Cited

U.S. PATENT DOCUMENTS 6,269,259 B1    7/2001  Lai
7,612,997 B1   11/2009  Diebel et al.
(Continued)

FOREIGN PATENT DOCUMENTS

WO    2005053289 A1    6/2005
WO    2015026859 A1    2/2015

OTHER PUBLICATIONS

International Search Report issued on PCT Application Serial No. PCT/US2017/33681 by ISA/US dated Sep. 28, 2017, p. 1-4.
(Continued)

*Primary Examiner* — Sean H Nguyen
(74) *Attorney, Agent, or Firm* — Aurora Consulting LLC; Ashley Sloat

(57) ABSTRACT

A case for storing a mobile computing device and a wireless earbud includes a back panel; a front panel defining a viewing aperture which extends through the front panel; a plurality of sidewalls extending around a perimeter of the back panel and configured to couple the perimeter of the back panel to a perimeter portion of the front panel; a dividing layer between the front panel and the back panel, such that the front panel and the dividing layer together define a first housing configured to receive and restrain a mobile computing device, and the dividing layer and the back panel together define a second housing; and a wireless
(Continued)

earbud charging contact disposed within the second housing and configured to contact and charge the wireless earbud when the wireless earbud is positioned in the case.

17 Claims, 36 Drawing Sheets

Related U.S. Application Data

(60) Provisional application No. 62/339,443, filed on May 20, 2016.

(51) Int. Cl.
| | | |
|---|---|---|
| *G06F 1/16* | (2006.01) | |
| *H02J 50/50* | (2016.01) | |
| *H02J 7/00* | (2006.01) | |
| *H04M 1/02* | (2006.01) | |

(52) U.S. Cl.
CPC .......... *G06F 1/1635* (2013.01); *G06F 1/1698* (2013.01); *H02J 7/0044* (2013.01); *H02J 50/10* (2016.02); *H02J 50/50* (2016.02); *H04M 1/0249* (2013.01); *H04M 1/0256* (2013.01); *H04M 1/0262* (2013.01); *H04M 1/0274* (2013.01); *H04R 1/1016* (2013.01); *G06F 2200/1633* (2013.01); *H04R 2420/07* (2013.01); *H04R 2499/11* (2013.01)

(58) Field of Classification Search
CPC ....... H02J 50/50; H02J 7/0044; G06F 1/1626; G06F 1/1632; G06F 1/1698; G06F 2200/1633; H04M 1/0249; H04M 1/0256; H04M 1/0262; H04M 1/0274
USPC ........................................................ 381/370
See application file for complete search history.

(56) References Cited

U.S. PATENT DOCUMENTS

| | | | |
|---|---|---|---|
| 8,367,235 | B2 | 2/2013 | Huang |
| 8,390,255 | B1 | 3/2013 | Fathollahi |
| 8,891,800 | B1 | 11/2014 | Shaffer |
| 8,917,506 | B2 | 12/2014 | Diebel et al. |
| 2005/0107131 | A1 | 5/2005 | Abramov |
| 2007/0147630 | A1 | 6/2007 | Chiloyan |
| 2008/0076489 | A1 | 3/2008 | Rosener et al. |
| 2009/0017881 | A1 | 1/2009 | Madrigal |
| 2009/0046869 | A1 | 2/2009 | Griffin et al. |
| 2009/0084705 | A1 | 4/2009 | Justiss |
| 2009/0124202 | A1 | 5/2009 | Seshadri et al. |
| 2010/0104118 | A1 | 4/2010 | Sasidharan |
| 2011/0286615 | A1 | 11/2011 | Olodort et al. |
| 2012/0128193 | A1 | 5/2012 | Stevinson |
| 2012/0306431 | A1 | 12/2012 | Li et al. |
| 2013/0044884 | A1 | 2/2013 | Tammi et al. |
| 2013/0121517 | A1 | 5/2013 | Anderson et al. |
| 2013/0206612 | A1 | 8/2013 | Chun |
| 2013/0238829 | A1 | 9/2013 | Laycock et al. |
| 2013/0265702 | A1 | 10/2013 | Merenda |
| 2013/0272527 | A1 | 10/2013 | Oomen et al. |
| 2014/0016799 | A1 | 1/2014 | Kumar |
| 2014/0161301 | A1 | 6/2014 | Merenda |
| 2014/0219484 | A1 | 8/2014 | Zellner |
| 2014/0376754 | A1 | 12/2014 | Banerjea et al. |
| 2015/0086062 | A1 | 3/2015 | Schrems et al. |
| 2015/0245125 | A1 | 8/2015 | Shaffer |
| 2015/0245126 | A1 | 8/2015 | Shaffer |

OTHER PUBLICATIONS

Written Opinion issued on PCT Application Serial No. PCT/US2017/33681 by ISA/US dated Sep. 28, 2017, p. 1-6.
Protective iPhone Case & Retractable Headphones in One, Hybrid One, https://hybrid.one/, printed May 1, 2017.

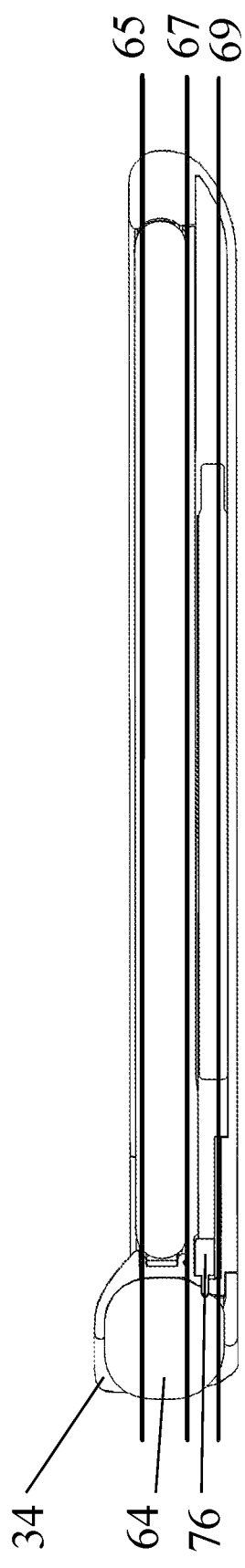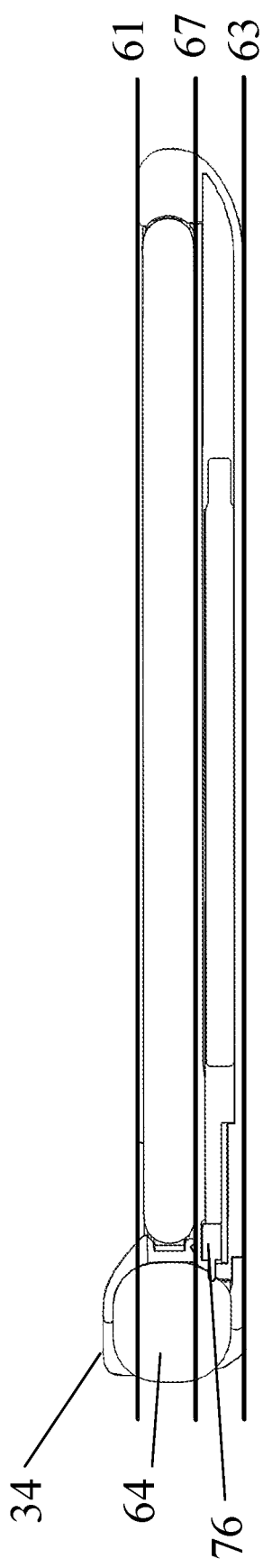
FIG. 1D
FIG. 1E

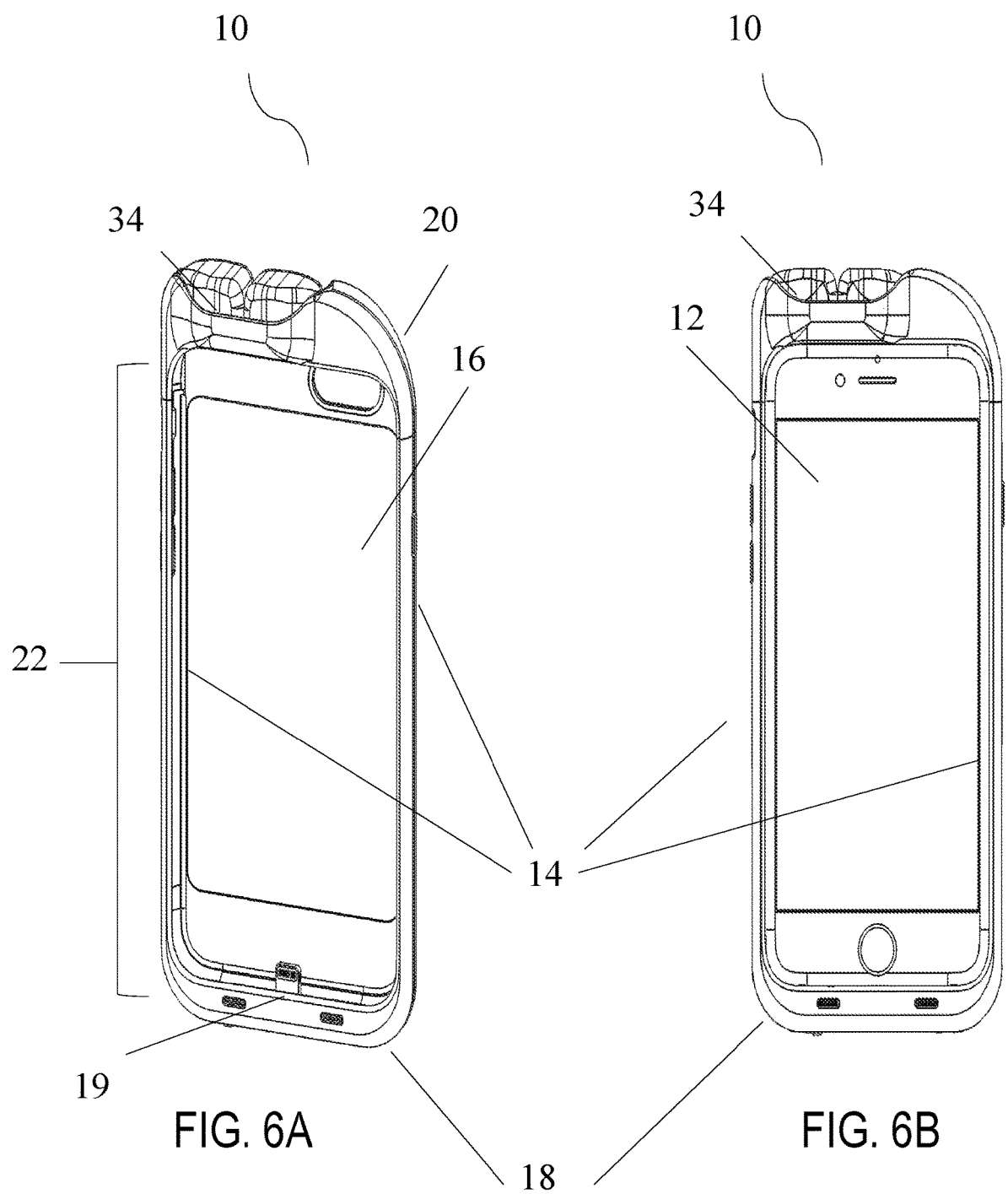

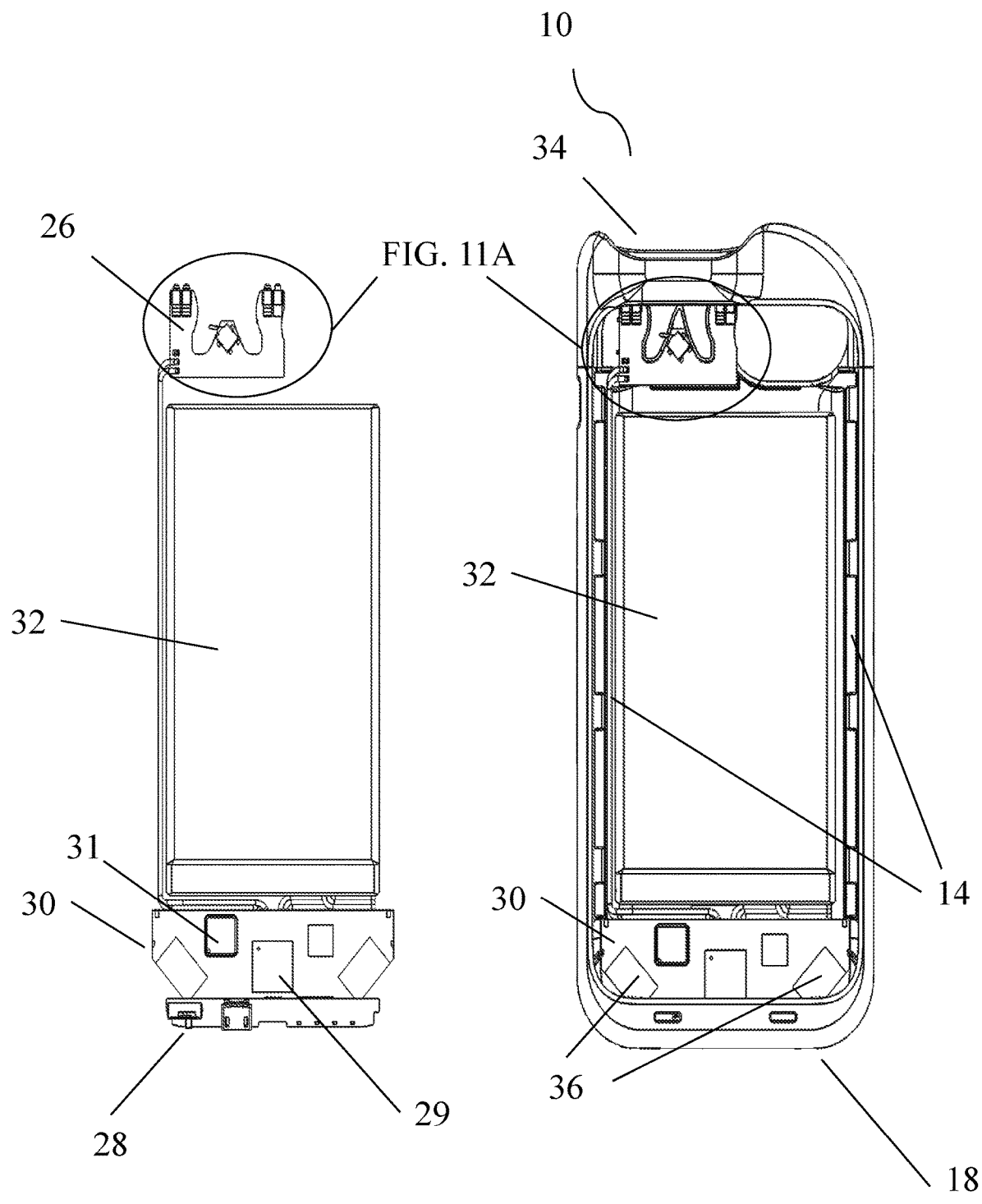

WIRELESS EARBUD CHARGING AND COMMUNICATION SYSTEMS AND METHODS

CROSS-REFERENCE TO RELATED APPLICATIONS

This application is the national stage filing of International Patent Application No. PCT/US17/33681 with an international filing date of May 19, 2017, which claims priority to U.S. patent application Ser. No. 15/340,133, entitled "Wireless Earbud Charging and Communication Systems and Methods," filed Nov. 1, 2016 (now U.S. Pat. No. 9,906,851 issued Feb. 27, 2018), and the benefit of U.S. Provisional Patent Appl. No. Ser. 62/339,443 filed May 20, 2016, the disclosure of both of which is herein incorporated by reference in its entirety.

INCORPORATION BY REFERENCE

All publications and patent applications mentioned in this specification are herein incorporated by reference in their entirety, as if each individual publication or patent application was specifically and individually indicated to be incorporated by reference in its entirety.

FIELD OF THE INVENTION

This invention relates generally to the field of the Internet of Things, and more specifically to wireless earbud charging and communication systems and methods.

BACKGROUND OF THE INVENTION

Currently, there are a number of headset or earbud configurations available which allows a user to listen to audio streaming from his cellular device. For example, the headset may comprise two earbuds tethered together and optionally tethered to the cellular device or a completely wireless configuration. However, each of these configurations has deficiencies rendering its use less than ideal. For example, the cord that links the two earbuds together and/or links the earbuds to the cellular device often becomes tangled on clothing, hair, or other accessories potentially dislodging one or both earbuds from their position in the user's ear. The cord that links the two earbuds together and/or links the earbuds to the cellular device may restrict movement of the user as the user needs to avoid pulling the cord during use of the system (e.g., exercise, dancing, running, working, etc.).

Further, the communication methods used by available wireless earbuds are also less than ideal. Currently, a first earbud receives a packet of information with a time stamp and then transmits that same packet of information to a second earbud (i.e., a master-slave configuration, as shown in FIG. 17A). Once the time indicated in the time stamp occurs, the audio that was delivered to the first and second earbuds in the packet is played. However, currently available wireless earbuds have two inherent disadvantages with this approach. First, if the time indicated on the time stamp passes and both earbuds do not have the packet containing the audio, then the earbuds do not play the audio, resulting in the first issue: poor signal reception. Second, to decrease poor signal reception (i.e., drop-outs), the time between packet transmission (e.g., by computing device, mobile computing device, case, etc.) to an earbud, packet receipt by the earbud, and time stamp elapse at the earbud is increased (i.e., improve the chances of both earbuds receiving the packet without the time indicated in the time stamp occurring or passing), resulting in the second issue: latency between visual and audio experiences (e.g., lip movement in video does not align with audio). Further, current completely wireless earbuds have a master-slave configuration in which the first earbud needs to receive the packet first and then retransmit the packet to the second earbud, the second earbud receiving the retransmitted packet. This master-slave configuration increases the time required to transmit data or audio to both earbuds increasing the likelihood of poor signal reception (i.e., dropouts). The shadow created by the user's head for the second earbud only exacerbates these disadvantages since the wireless signal does not readily penetrate the skull of the user. Occasionally, environments that provide adequate surfaces for wireless signal reflection and/or that decrease wireless signal dispersion (e.g., more wireless signal reaches intended destination) decrease dropouts and/or the need for latency, but once the user moves outdoors or into a more open space, the latency and poor signal reception problems return.

The poor signal reception and latency issues can be inversely proportional: if latency is increased, audio-visual synchronization is decreased (i.e., fewer dropouts, but audio lagging behind video playback), but if latency is decreased to synchronize audio and video, dropout frequency increases. Thus, a manufacturer is forced to choose which is more important to the user base as a whole: audio-visual synchronization or signal (e.g., audio, data, information, etc.) reception quality (i.e., fewer dropouts).

Further, when using wireless earbuds, it is difficult for a user to continually track the location of their earbuds and provide the earbuds with the re-charge needed after only a few hours of use. However, current cases that allow storage of the earbuds in the case are bulky and difficult to use. For example, if the earbuds are stored near the bottom of the case, the case includes a bulge or widening to accommodate the earbuds which results in difficult one-handed manipulation of the mobile computing device positioned in the case. For example, housing the earbuds at the bottom of the case makes it harder for a user's finger or thumb to reach all the rectangular surface area of the cellular device's touch screen, especially along the top edge. Further, for example, current cases that allow storage of the earbuds in a top portion of the case, to avoid the issues described above, usually include a widening or bulge to accommodate the earbuds and/or include an overall increased case thickness, resulting in the case being difficult to use and store in a user's pocket.

Mobile computing devices are repeatedly being redesigned to be lighter, thinner, and increasingly portable. To protect these lighter and thinner mobile computing devices, users' desire cases that protect their mobile computing device and house their earbuds but that do not result in increased bulkiness to the overall slim design of the mobile computing device.

Thus, there is a need for new and useful wireless earbud charging and communication systems and methods. This invention provides such new and useful systems and methods.

SUMMARY

One aspect of the present disclosure is directed to a case for storing a mobile computing device and a wireless earbud. In some embodiments, the case includes a back panel, a front panel defining a viewing aperture which extends through the front panel, a plurality of sidewalls extending from the back panel and configured to couple a first portion of the back panel to a front panel portion, a dividing layer between the front panel and the back panel, and a wireless earbud charging contact disposed within the second housing and configured to contact and charge the wireless earbud when the wireless earbud is positioned in the case. In some embodiments, one or more of the back panel, the front panel, and a subset of the plurality of sidewalls is configured to receive a wireless earbud. In some embodiments, the front panel and the dividing layer together define a first housing configured to receive and restrain a mobile computing device, and the dividing layer and the back panel together define a second housing.

In some embodiments, the case further includes a rechargeable battery disposed in the second housing, such that the wireless earbud charging contact is positioned adjacent to the rechargeable battery. In some embodiments, the rechargeable battery charges the mobile computing device when the mobile computing device is positioned in the case. Additionally or alternatively, in some embodiments, the rechargeable battery charges the first and second wireless earbuds when positioned in the case.

In some embodiments, the subset of the plurality of sidewalls define an earbud cavity configured to receive the wireless earbud. In other embodiments, the back panel, the second portion of the front panel, and the subset of the plurality of sidewalls define an earbud cavity configured to receive the wireless earbud. In some embodiments, the earbud cavity is positioned adjacent to the first housing and the second housing. In some embodiments, the earbud cavity is parallel to the front panel and the back panel.

In some embodiments, a combined thickness of the second housing and the back panel does not exceed 6 mm.

In some embodiments, a first portion of the front panel is parallel to the back panel and a second portion of the front panel includes a groove to accommodate the wireless earbud.

Another aspect of the present disclosure is directed to a case for storing a mobile computing device and wireless earbuds. In some embodiments, the case includes a back panel, a front panel defining a viewing aperture which extends through the front panel, a plurality of sidewalls extending from the back panel and configured to couple a first portion of the back panel to a front panel portion, a dividing layer between the front panel and back panel, and an earbud locking mechanism configured to removably secure the first wireless earbud and the second wireless earbud in the case. In some embodiments, the front panel and the dividing layer together define a first housing for receiving and restraining a mobile computing device.

In some embodiments, one or more of the back panel, the front panel, and a subset of the plurality of sidewalls is configured to receive a first wireless earbud and a second wireless earbud. In some such embodiments, the earbud locking mechanism is adjacent to the first housing and adjacent to the first and second wireless earbuds when the first and second wireless earbuds are positioned in the case. In some embodiments, the earbud locking mechanism functions to removably secure the first and second wireless earbuds in the earbud cavity.

In one embodiment, the earbud locking mechanism includes a stationary lock for the first wireless earbud and a sliding lock for the second wireless earbud. In another embodiment, the earbud locking mechanism includes a first sliding lock for the first wireless earbud and a second sliding lock for the second wireless earbud. In a further embodiment, the earbud locking mechanism includes a first stationary lock for the first wireless earbud and a second stationary lock for the second wireless earbud.

In some embodiments, the subset of the plurality of sidewalls define an earbud cavity in a top portion of the case. In some embodiments, the earbud cavity is adjacent to the first housing, the dividing layer, and the second housing.

In some embodiments, the back panel and the dividing layer together define a second housing for receiving an electrical component. In some such embodiments, the electrical component includes one or more of: a rechargeable battery, a printed circuit board, an earbud charging contact, and an antenna.

In some embodiments, the case further includes the first and second wireless earbuds. In some such embodiments, the first and second wireless earbuds each include a depression configured to engage the earbud locking mechanism.

Another aspect of the present disclosure is directed to a case for storing a mobile computing device and wireless earbuds. In some embodiments, the case includes a back panel, a front panel defining a viewing aperture which extends through the front panel, a plurality of sidewalls extending from the back panel and configured to couple a first portion of the back panel to a front panel portion, and a dividing layer between the front panel and the back panel. In some embodiments, the front panel and the dividing layer together define a first housing for receiving and restraining the mobile computing device. In some embodiments, a subset of the plurality of sidewalls define an earbud cavity configured to receive a first wireless earbud and a second wireless earbud. For example, in some embodiments, the earbud cavity is positioned in a top portion of the case opposite a bottom portion.

In some embodiments, the top portion and the bottom portion of the case are transitionable between a coupled state and a decoupled state, such that, in the coupled state, the mobile computing device is restrained in the case.

In some embodiments, the subset of the plurality of sidewalls define a top edge of the case, such that the top edge is perpendicular to the front panel, the dividing layer, and the bottom panel.

In some embodiments, the back panel is planar. In some embodiments, the back panel and the dividing layer together define a second housing, such that at least a portion of the first and second wireless earbuds extends into the second housing when the first and second wireless earbuds are positioned in the earbud cavity.

In some embodiments, a front surface portion and a back surface portion of each of the first and second wireless earbuds are exposed for pinch removal of the first and second wireless earbuds from the earbud cavity.

In some embodiments, the earbud cavity is configured to charge one or more of the first wireless earbud and the second wireless earbud when the first and second wireless earbuds are positioned in the earbud cavity.

Another aspect of the present disclosure is directed to a case for storing a mobile computing device and wireless earbuds. In some embodiments, the case includes a back panel, a front panel defining a viewing aperture which extends through the front panel, a plurality of sidewalls extending from the back panel and configured to couple a first portion of the back panel to a front panel portion, and a dividing layer between the front panel and the back panel. In some embodiments, the front panel and the dividing layer together define a housing for receiving and restraining the mobile computing device. In some embodiments, a subset of the plurality of sidewalls define a top edge of the case, such that the top edge is configured to receive a first wireless earbud and a second wireless earbud.

In some embodiments, the dimensions of the case do not exceed a thickness of 17.5 mm, a width of 75 mm, and a length of 164 mm.

In some embodiments, the front panel and back panel are transitionable between a coupled state and a decoupled state, such that the mobile computing device is restrained in the case in the coupled state.

In some embodiments, the top edge is opposite a bottom portion of the case, such that the bottom portion comprises a connector configured to electrically couple the case to the mobile computing device.

Another aspect of the present disclosure is directed to a system for wirelessly transmitting audio directly to a first wireless earbud and a second wireless earbud. In some embodiments, the system includes the first and second wireless earbuds; and a case including: a back panel, a plurality of sidewalls extending around the back panel and defining a housing configured for receiving a mobile computing device, a receiver configured for receiving a wireless data transfer from the mobile computing device, and a transmitter configured for transmitting a plurality of wireless data transfers directly to at least the first and second wireless earbuds.

In some embodiments, the case further includes a rechargeable battery disposed therein. In some embodiments, the rechargeable battery charges the mobile computing device when the mobile computing device is positioned in the case. Alternatively or additionally, in some embodiments, the rechargeable battery charges the first and second wireless earbuds when positioned in the top portion of the case.

In some embodiments, the receiver is a transceiver. In some embodiments, the transmitter is a transceiver.

In some embodiments, the first wireless earbud receives the plurality of wireless data transfers at a first frequency and the second wireless earbud receives the plurality of wireless data transfers at a second frequency Another aspect of the present disclosure is directed to a system for wirelessly transmitting data directly to a first wireless earbud and a second wireless earbud. In some embodiments, the system includes the first and second wireless earbuds communicatively coupled to a mobile computing device; and a case including: a back panel, a plurality of sidewalls extending around the back panel and defining a housing configured for receiving the mobile computing device, a top portion adjacent to the back panel, and a rechargeable battery disposed in the base panel, such that the rechargeable battery charges the first and second wireless earbuds when positioned in the top portion. In some embodiments, a plurality of wireless data transfers occurs directly between the mobile computing device and the first wireless earbud and the mobile computing device and the second wireless earbud. In some embodiments, the back panel contacts a back surface of the mobile computing device. In some embodiments, the top portion comprises an aperture configured to receive the first and second wireless earbuds.

In some embodiments, the wirelessly transmitted data comprises audio.

In some embodiments, the rechargeable battery charges the mobile computing device when the mobile computing device is positioned in the case.

In some embodiments, the first wireless earbud receives the plurality of wireless data transfers at a first frequency and the second wireless earbud receives the plurality of wireless data transfers at a second frequency. In some embodiments, the plurality of wireless data transfers occurs bidirectionally. In other embodiments, the plurality of wireless data transfers does not occur between the first and second wireless earbuds.

BRIEF DESCRIPTION OF THE DRAWINGS

FIG. 1D shows a side view of one embodiment of a case housing at least one earbud.

FIG. 1E shows a side view of one embodiment of a case housing at least one earbud.

FIG. 6A shows a front view of one embodiment of a case housing two earbuds.

FIG. 6B shows a front view of one embodiment of a case housing a mobile computing device and two earbuds.

FIG. 7A shows one embodiment of a layered circuit board configuration.

FIG. 7B shows one embodiment of a layered circuit board configuration in a case.

DETAILED DESCRIPTION OF THE INVENTION

Figures 1A, 1B:
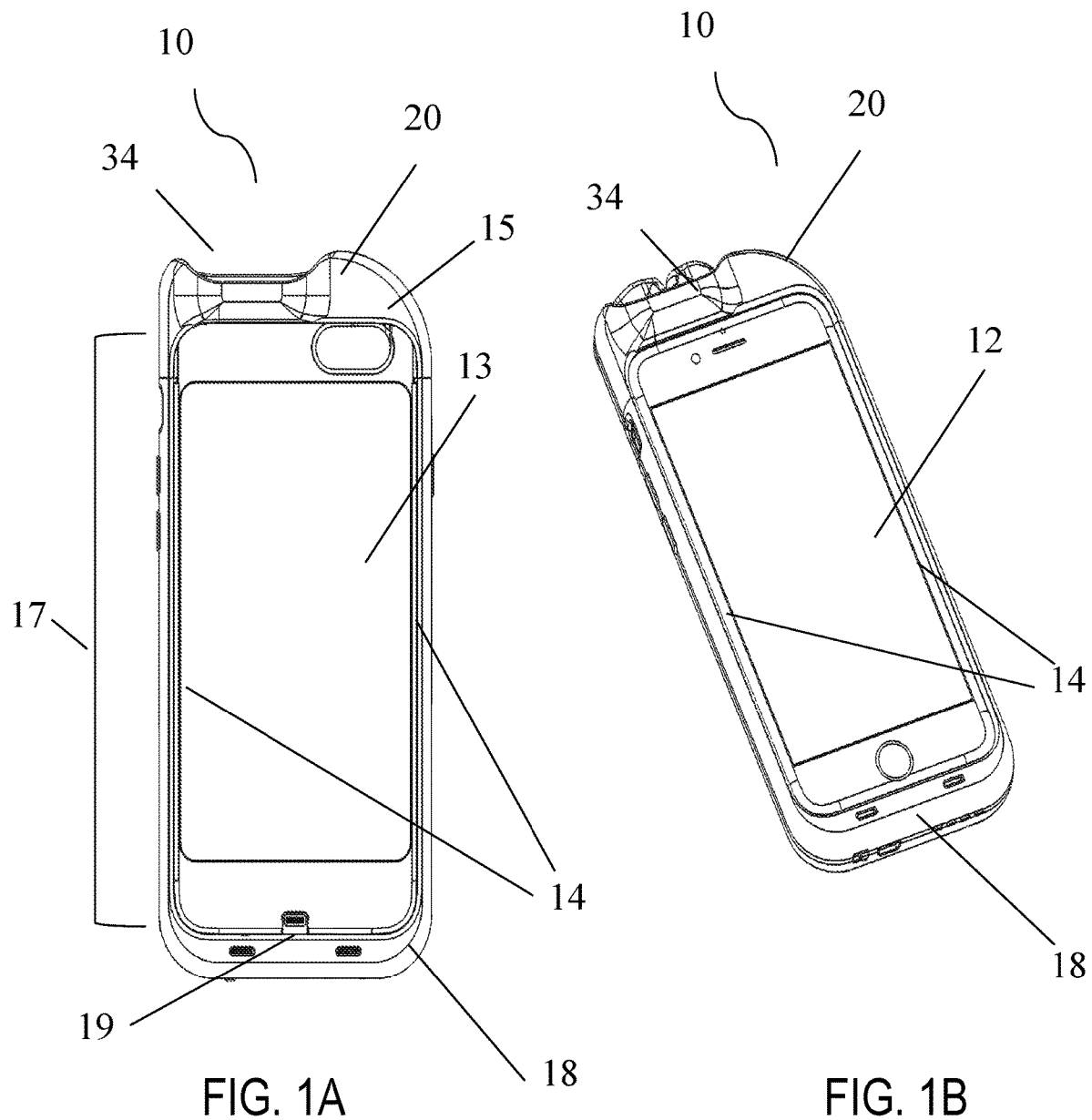
FIG. 1A shows a front view of one embodiment of a case.
FIG. 1B shows a bottom perspective view of one embodiment of a case.

The above mentioned aspects, as well as other aspects, features, and advantages of the present technology will now be described in connection with various embodiments. The inclusion of the following embodiments is not intended to limit the invention to these embodiments, but rather to enable any person skilled in the art to make and use this invention. Other embodiments may be utilized and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

Disclosed herein are systems including wireless earbuds with integrated charging and communication systems and methods for using such systems. In general, the systems and methods described herein are used by a user. A user may include: a female, a male, a person partaking in an activity (e.g., exercising, biking, walking, dancing, playing sports, working, doing yard work, etc.); a disc jockey (DJ); a service personnel or technician (e.g., fast-food service, clothing retail, make-up retail, telecommunications, etc.); a scientist; a hard-of-hearing or deaf person; a performer or musician (e.g., pianist, soloist, conductor, etc.); a person driving; or any other person needing or using the systems and methods described herein.

As used herein, a "computing device" refers to any stationary or portable computing device. For example, a computing device includes a desktop computer, laptop, netbook, mobile or cellular phone, notebook, personal computer, personal digital assistant (PDA), workstation, server, and wearable computer (e.g., Google Glass, Apple Watch, Pebble, FitBit, etc.).

As used herein, a "mobile computing device" refers to any portable computing device. For example, a mobile computing device includes a laptop, netbook, mobile or cellular phone, notebook, PDA, and wearable computer.

As used herein, a "case" refers to any material and/or device that protects, shields, or encases partially or wholly a computing device or mobile computing device. For example, a case may include plastic (e.g., polypropylene, polyurethane, etc.), carbon fiber, leather, synthetic leather, wood, metal, rubber, silicone, or any other suitable material known to one of skill in the relevant art. A case may include one intact rigid section, such that the computing device snaps into the case. A case may include one bendable section, such that the case is bent or maneuvered to fit around the computing device. A case may include two sections that snap-fit together, are hinged together, slide together, click together, or otherwise couple together to form the case. A case may include a plurality of sections that couple together to form the case. The case may be tailored to suit any mobile computing device, for example a mobile computing device from Samsung®, Apple®, Nokia®, HTC®, Sony Ericsson®, LG Electronics®, Blackberry®, Motorola®, Sony®, MyPhone®, Huawei®, Alcatel®, Lenovo®, Cherry Mobile®, Micromax®, Jolla®, Asus®, and/or any other company or brand marketing or commercializing mobile computing devices.

As used herein, an "earbud" refers to an earphone inserted into the ear, an earphone worn in the ear for use with audio devices, a headphone that fits inside the ear against the outer opening of the ear canal, or, in some embodiments, a hearing aid.

As used herein, "wireless" refers to communication via Bluetooth, low energy Bluetooth, near-field communication, infrared, near field magnetic induction, wireless local area network (WLAN), or any other radiofrequency technology. In some embodiments, "wireless" also refers to communication using near field magnetic induction. In some embodiments, "wireless" also refers to power transfer systems that use, for example, induction (e.g., magnetic). As used herein, a wireless earbud may receive a wireless data transfer at any frequency, amplitude, or form from the case, mobile computing device, or computing device.

As used herein, "monophonic" or "wireless data transfer" refers to wireless communication using a single frequency directed to one terminal or end point (e.g., earbud). In some embodiments, monophonic or wireless data transfer refers to the same packet of information, data, or audio being transmitted to the first earbud and then the second earbud. The first and second earbuds receive the same packet of information, data, or audio (i.e., packet includes data for a single channel). In some embodiments, monophonic or wireless data transfer refers to the same packet of information, data, or audio being transmitted to the first earbud and then the second earbud, but each earbud plays the relevant portion of the packet intended for the respective earbud (i.e., packet includes data for two or more channels). For example, the first earbud plays a first channel from the packet at the same time as the second earbud is playing a second channel from the packet.

As used herein, "stereophonic" or "a plurality of wireless data transfers" refers to wireless communication using multiple frequencies either simultaneously or asynchronously directed to two or more termini or end points (e.g., earbuds). In some embodiments, "stereophonic" or "a plurality of wireless data transfers" refers to the amplitude of at least two waves of the same frequency, out-of-phase with each other (e.g., 90°, in quadrature) being changed (i.e., modulated or keyed) to represent the data signal. The first wireless earbud receives a first wave comprising a first amplitude and the second wireless earbud receives a second wave comprising a second amplitude. In some embodiments, each wave or wireless data transfer includes the same packet of information, data, or audio being transmitted to the first and second earbuds. The first and second earbuds receive the same packet of information, data, or audio (i.e., packet includes data for a single channel). In some embodiments, each wave or wireless data transfer includes the same packet of information, data, or audio being transmitted to the first and second earbuds, but each earbud plays the relevant portion of the packet intended for the respective earbud (i.e., packet includes data for two or more channels). For example, the first earbud plays a first channel from the packet at the same time as the second earbud is playing a second channel from the packet.

As used herein, "packet" refers to data, information, audio data, etc. for one or more channels played through an earbud, set of earbuds, headset, headphone; microphone information, configuration, or settings; and/or earbud button push information (e.g., pausing, playing, forward skipping, and backward skipping, initiating a phone call, receiving an incoming phone call, disconnecting an in-progress phone call, prompting the use of a virtual assistant associated with the computing device, adjusting the volume, earbud battery capacity level, charging connection, etc.).

Systems

Figure 6C:
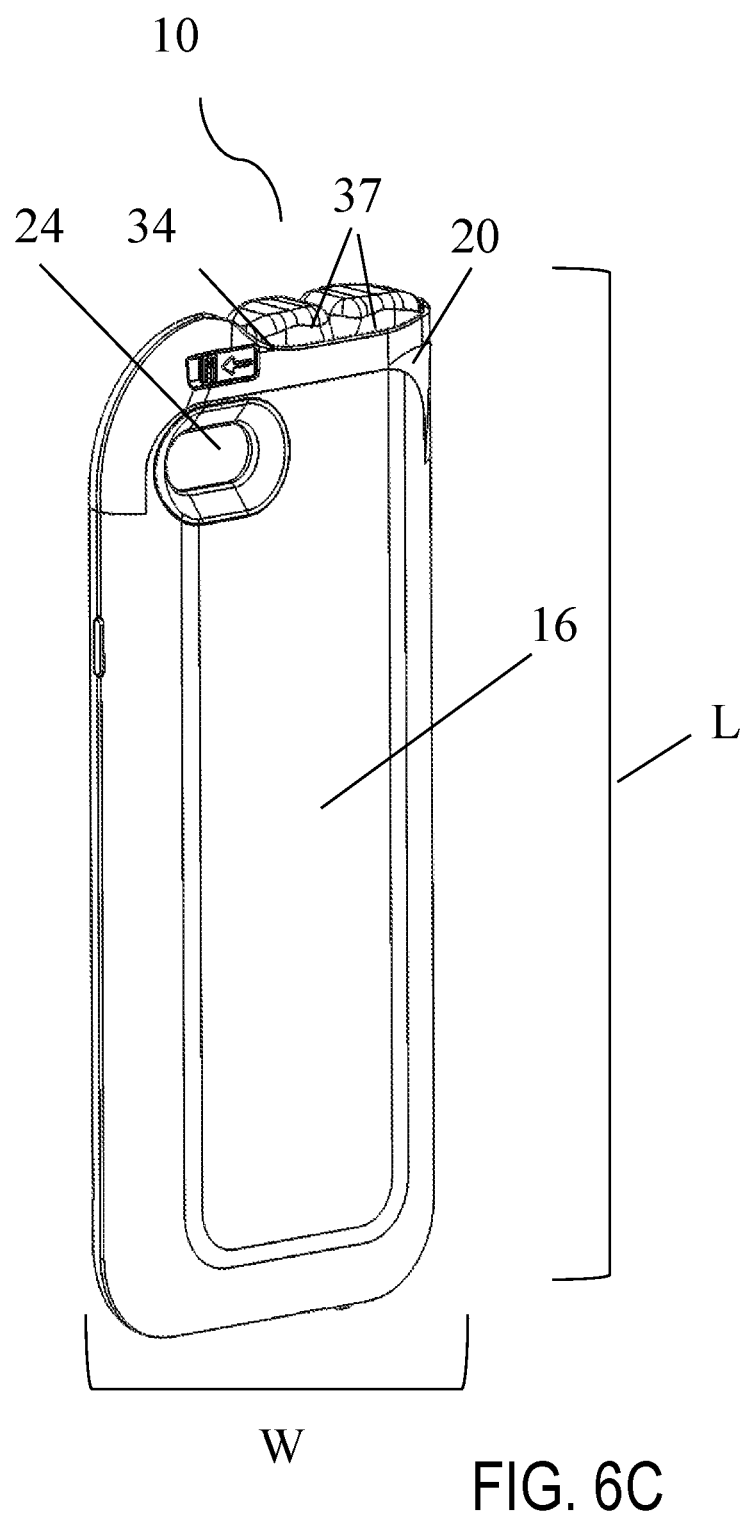
FIG. 6C shows a back view of one embodiment of a case housing two earbuds.

In some embodiments, a system for storing and charging one or more earbuds 64 includes a case 10. FIGS. 1A-1B show a front view and bottom perspective view, respectively, of one embodiment of a case 10. The case 10 functions to cushion, insulate, shield, or otherwise protect the mobile computing device 12 disposed in the case 10 from impacts associated with use, dropping, throwing, or misusing the mobile computing device 12. The case 10 includes a plurality of sidewalls 14, a front panel 15, a back panel 16 (as shown in FIG. 6C), a dividing layer 13 between the front panel 15 and the back panel 16 (as shown in FIG. 6A), a bottom portion 18, and a top portion 20 opposite the bottom portion 18. In some embodiments, the front panel 15 is parallel to the back panel 16. In some embodiments, the front panel 15 is parallel to the dividing layer 13. In some embodiments, the back panel 16 is parallel to the dividing layer 13.

Figure 8:
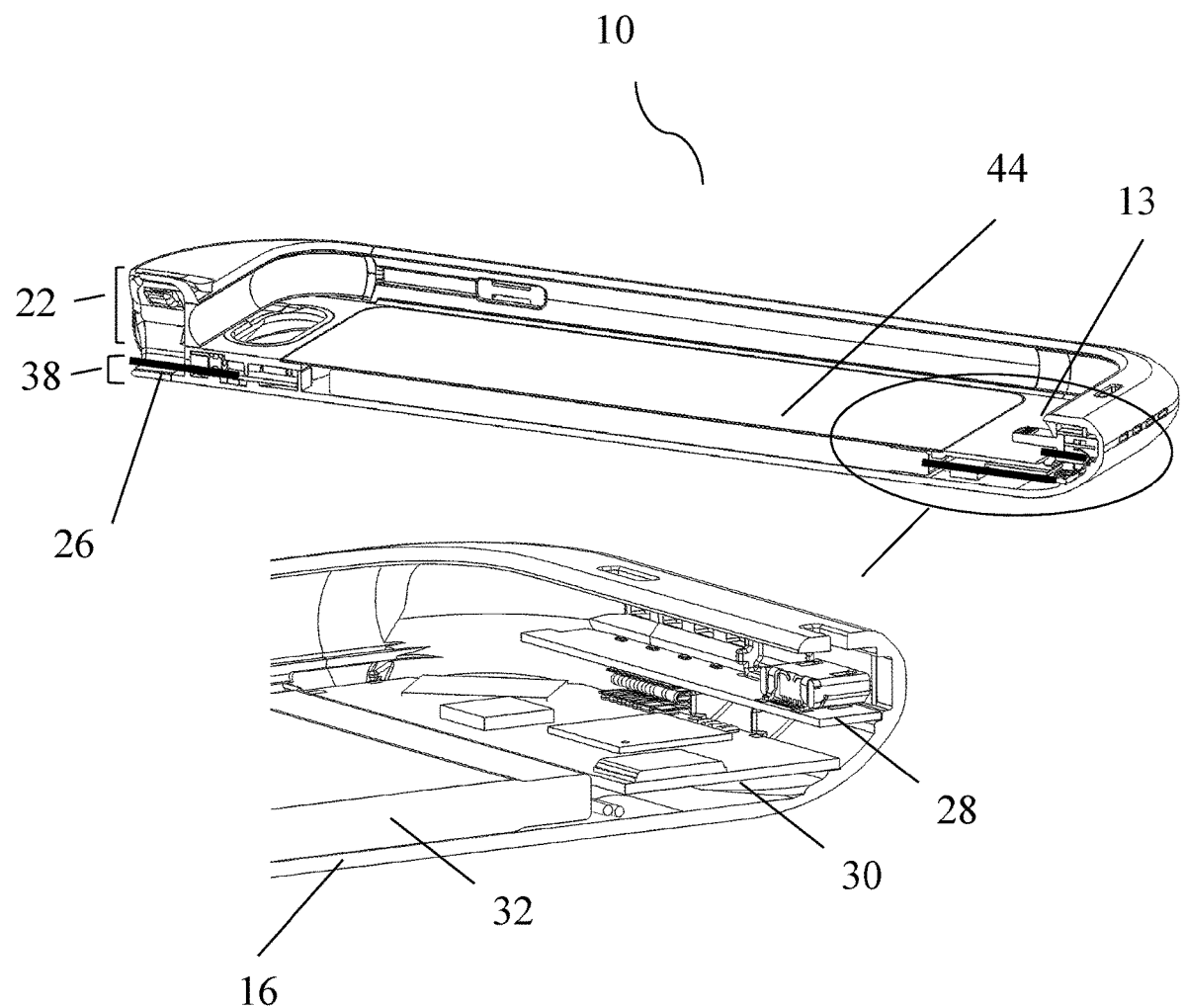
FIG. 8 shows one embodiment of a layered circuit board configuration and battery in a case.
Figure 10:
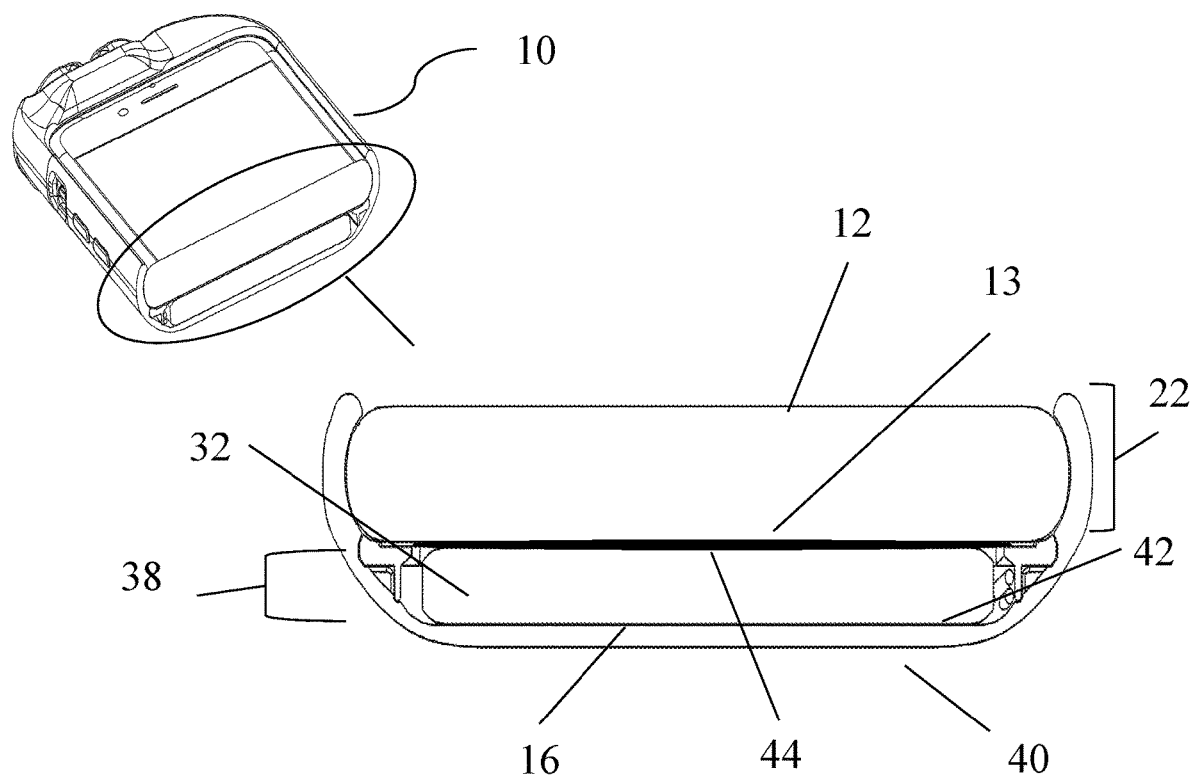
FIG. 10 shows one embodiment of a sealing layer of the back panel of the case.

The plurality of sidewalls 14 physically constrain a mobile computing device 12 positioned or disposed in the case 10, as shown in FIG. 1B and FIG. 6B. The plurality of sidewalls 14 extend from the back panel 16 or around a perimeter of the back panel 16 and are configured to couple the back panel 16 to the front panel 15 or a perimeter or perimeter portion of the back panel 16 to a perimeter or a perimeter portion of the front panel 15. As shown in FIGS. 6A, 8, and 10, the front panel 15 and the dividing layer 13 together define a first housing 22 configured to receive and restrain a mobile computing device 12. As shown in FIGS. 8 and 10, the dividing layer 13 and the back panel 16 together define a second housing 38 configured to receive one or more electronic components (e.g., one or more PCBs, battery, earbud charging contact, switch mechanism, antenna, etc.), as described in further detail elsewhere herein.

In some embodiments, a thickness of the second housing 38 and the back panel 16 does not exceed 4 mm, 5 mm, 6 mm, or 7 mm. In one embodiment, a thickness of the second housing 38 and back panel 16 does not exceed 5 mm. In one embodiment, a thickness of the second housing 38 and back panel 16 does not exceed 5.5 mm. In one embodiment, a thickness of the second housing 38 and back panel 16 does not exceed 6 mm. In one embodiment, a thickness of the second housing 38 and back panel 16 does not exceed 6.5 mm. In one embodiment, a thickness of the second housing 38 and back panel 16 does not exceed 7 mm.

Figure 1C:
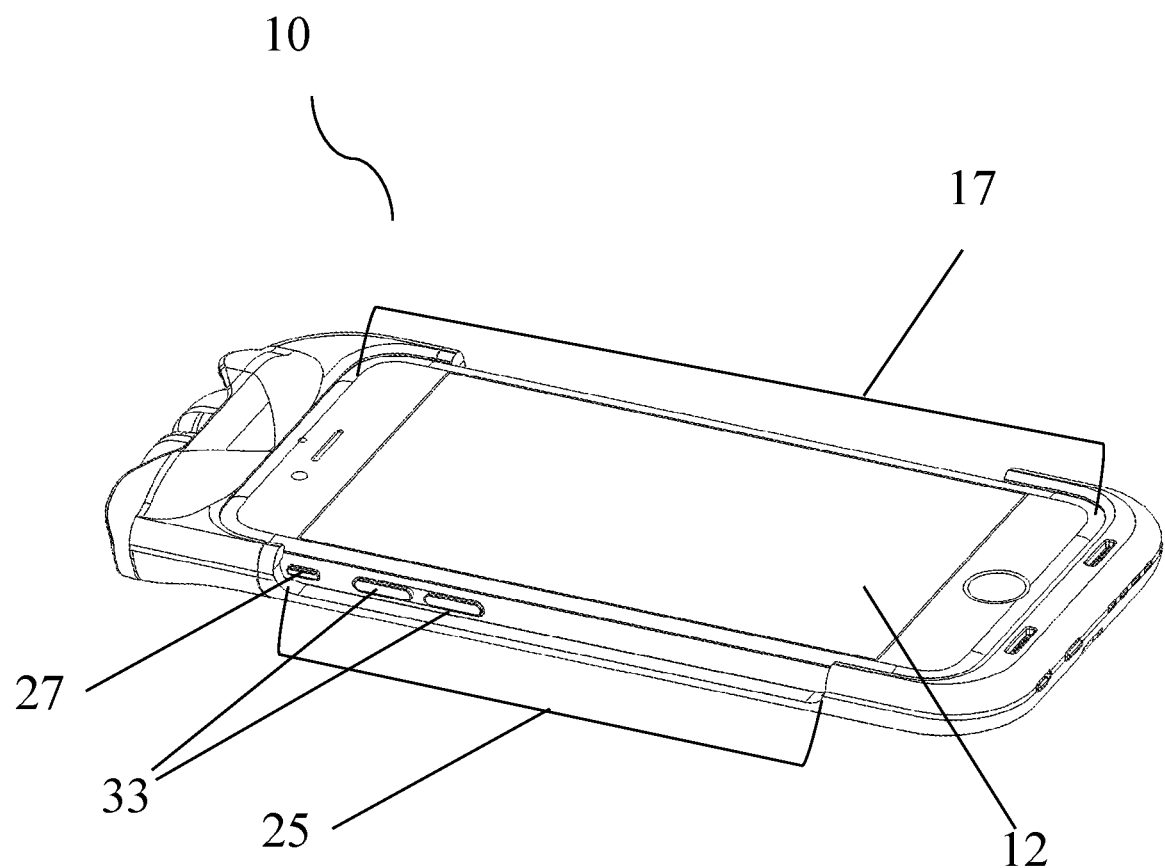
FIG. 1C shows a side perspective view of one embodiment of a case with a discontinuous viewing aperture perimeter.
Figure 2A:
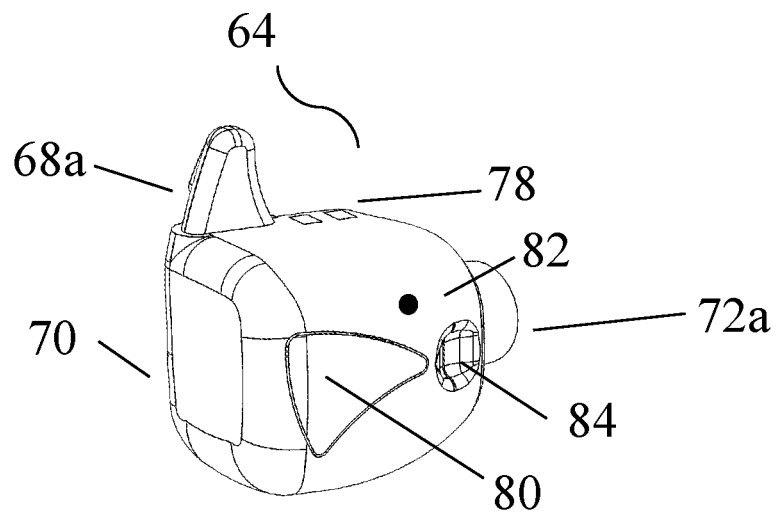
FIG. 2A shows a front view of one embodiment of a wireless earbud with a truncated fin and tip portion.
Figure 2B:
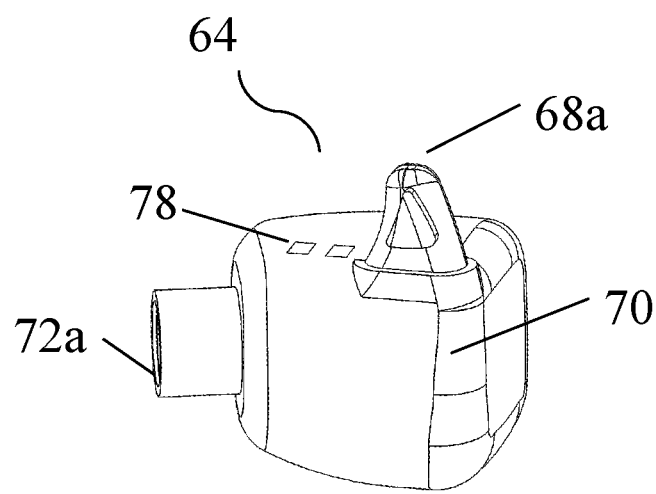
FIG. 2B shows a back view of one embodiment of a wireless earbud with a truncated fin and tip portion.
Figure 2C:
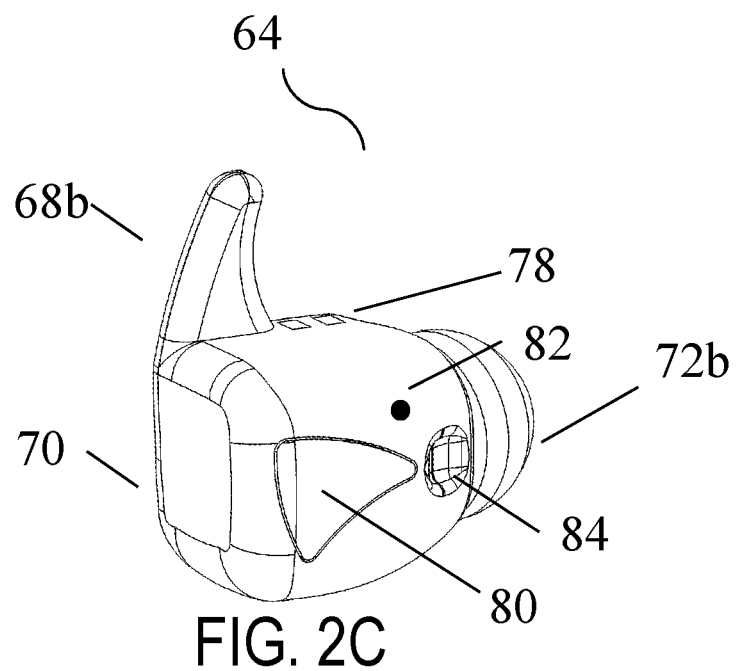
FIG. 2C shows a front view of one embodiment of a wireless earbud with an intermediate length fin and tip portion.
Figure 2D:
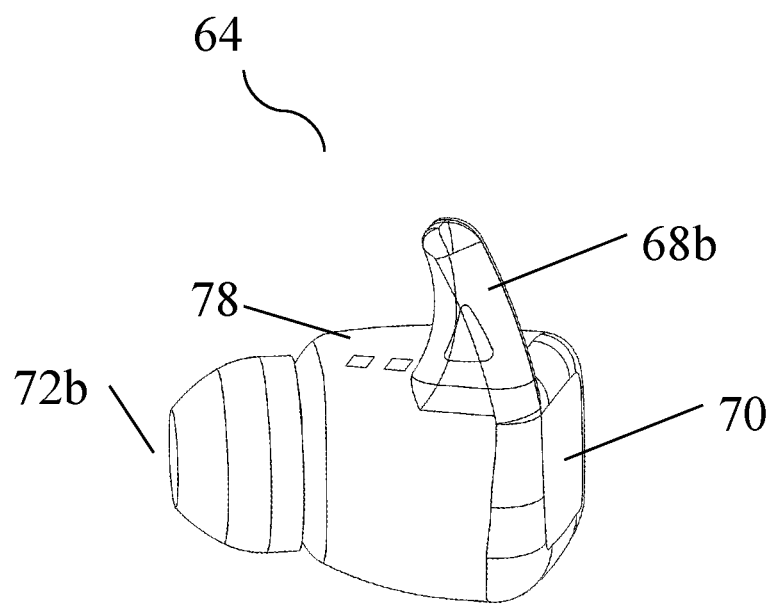
FIG. 2D shows a back view of one embodiment of a wireless earbud with an intermediate length fin and tip portion.
Figure 2E:
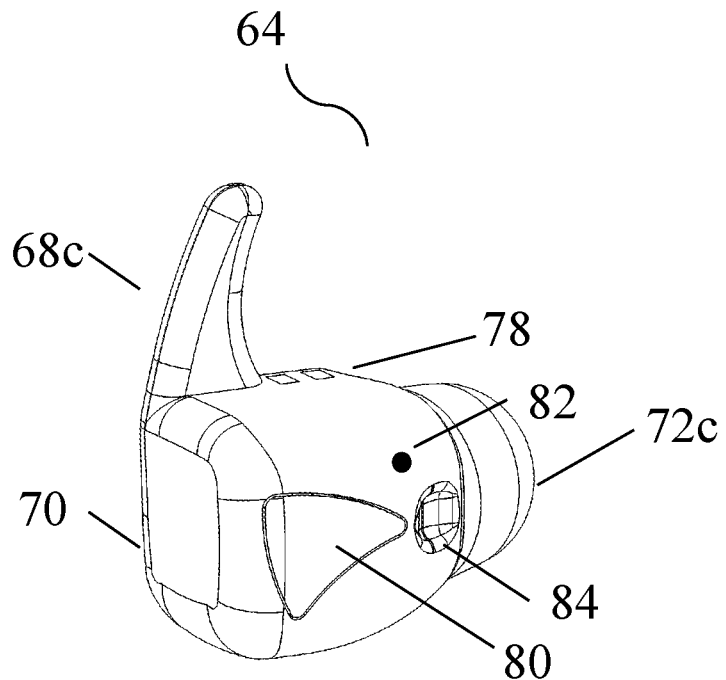
FIG. 2E shows a front view of one embodiment of a wireless earbud with an elongated fin and tip portion.
Figure 2F:
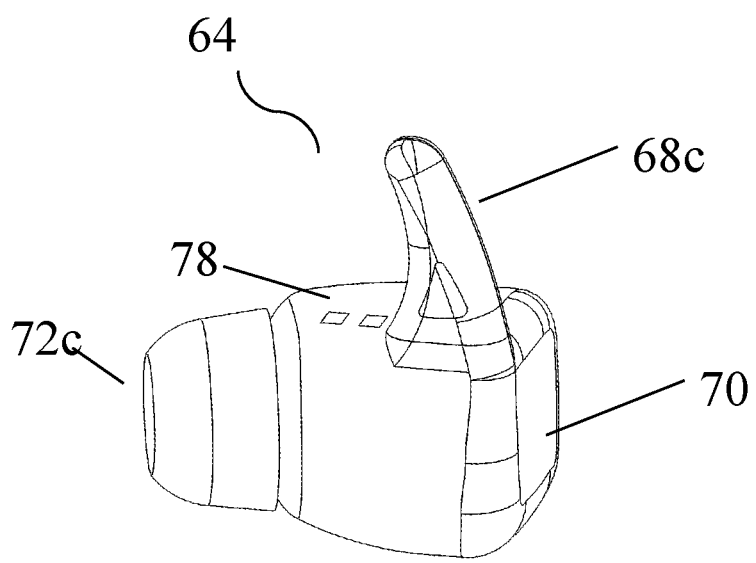
FIG. 2F shows a back view of one embodiment of a wireless earbud with an elongated fin and tip portion.

In some embodiments, as shown in FIG. 1A, the front panel 15 includes a viewing aperture 17 extending therethrough. The viewing aperture 17 functions to display a portion of or all of a display or screen of a mobile computing device 12. In some embodiments, a perimeter of the viewing aperture 17 may be continuous or discontinuous. In some such embodiments, as shown in FIG. 1C, a discontinuous viewing aperture perimeter may include one or more breaks, grooves, or bevels 25 to accommodate one or more components, for example a power button 27 or one or more volume adjustment buttons 33. In some embodiments, as shown in FIG. 9C, a first portion P1 of the front panel 15 is parallel to the back panel 16 and a second portion P2 of the front panel 15 includes a groove or widening to accommodate one or more of the wireless earbuds 64.

In some embodiments, the plurality of sidewalls 14 each include a bumper, padding, cushion, lining, or packing for providing shock absorption and/or cushion to the mobile computing device 12. The cushion may be sealed, adhered, glued, or otherwise coupled to an inner surface of each of the sidewalls 14 to contact an outer edge of a mobile computing device 12. A subset of the plurality of sidewalls 14 includes one or more apertures for displaying, for example, a power switch, audio cable input, earbud cable input, and/or power cable input of a mobile computing device 12 disposed in the case 10. A subset of the plurality of sidewalls 14 includes one or more protrusions sized and shaped to fit over one or more buttons, for example a power button or volume adjustment button, of a mobile computing device 12 disposed in the case 10. A subset of the plurality of sidewalls 14 or a bottom portion 18 may further include a connector 19 (e.g., Lightning, IEEE 1394, Thunderbolt, DVI, HDMI, Serial, Universal Serial Bus, Parallel, Ethernet, Coaxial, VGA, PS/2, etc.) configured to electrically couple the case 10 to the mobile computing device 12 or another computing device, for example as shown in FIG. 1A, FIG. 6A, and FIG. 8. In some embodiments, a subset of the plurality of sidewalls 14 define an earbud cavity 34 configured to receive the wireless earbud 64, as described in further detail elsewhere herein.

The dividing layer 13 provides a surface for supporting and/or contacting a back surface of a mobile computing device 12 positioned in the first housing 22 in the case 10.

In some embodiments, the back panel 16 provides a surface for supporting and/or contacting one or more electronic components positioned in the second housing 38 in the case 10. For example, one or more electronic components may include, but not be limited to, a battery 32, one or more PCBs, a switch mechanism 62, and an earbud charging contact 76. In some embodiments, as shown in FIG. 6C, the back panel 16 includes one or more camera apertures 24 extending there through for revealing, for example, a camera or flash associated with a mobile computing device 12 disposed in the case 10. In some embodiments, the back panel 16 is planar or substantially flat. For example, the back panel 16 may not include any widening or bulge to accommodate one or more wireless earbuds 64 in the case 10 or any other component.

In some embodiments, as shown in FIGS. 7A-7B, the second housing 38 houses one or more printed circuit boards (PCBs) for controlling the functionality of the case 10, mobile computing device 12, and/or earbuds 64. As shown in FIG. 8, the PCBs may be tiered, layered, and/or stair-stepped in the second housing 38 to reduce thickness of the case 10 and/or to give corners of the case 10 a rounded profile. For example, as shown in FIG. 8, a top PCB 26 and a center PCB 30 may be positioned in the second housing 38 of the case 10 parallel to the back panel 16 and adjacent to the battery 32. A bottom PCB 28 may be positioned in the first housing 22 adjacent to the mobile computing device 12, as described in further detail elsewhere herein.

The top PCB 26 functions to charge a rechargeable battery in one or more earbuds 64 and/or to detect a presence of one or more earbuds 64 positioned in the earbud cavity 34 in the top portion 20 of the case 10. The top PCB 26 comprises one or more charging contacts 76 for one or more wireless earbuds 64 and/or an earbud detection switch 62, for example to turn off a wireless signal emanating from the case 10 or the mobile computing device 12 when the one or more earbuds 64 are positioned in the earbud cavity 34 in the top portion 20 of the case 10. The charging mechanism and wireless signal switch are described in further detail elsewhere herein.

The bottom PCB 28 includes a case charging receptacle or jack, a computing device charge switch (i.e., activate or deactivate charging of the mobile computing device 12 using the battery disposed in the case), and/or one or more optical (e.g., LED, OLED, etc.) battery charge indicators. In one embodiment, a user manually activates or deactivates charging of the mobile computing device 12 disposed in the case 10 using the computing device charge switch. In one embodiment, one or more PCBs of the system automatically detect a charge status of the mobile computing device 12 disposed in the case 10 and activate or deactivate charging of the mobile computing device 12 disposed in the case 10 accordingly. The top 26 and bottom 28 PCBs are easily, readily, and affordably replaceable or interchangeable to tailor the case 10 to a model or type of mobile computing device 12.

In one embodiment, as shown in FIGS. 7A-7B, the center PCB 30 includes one or more wireless antennas 36, one or more processors 31, and/or a battery management system 29. Alternatively, the center PCB 30 may include one or more wireless antennas 36 and one or more processors 31. Alternatively, the center PCB 30 includes a battery management system 29 and one or more processors 31. The center PCB 30 is positioned in the case 10 to limit or reduce the need to change the center PCB 30 in the case 10 for different models and/or types of mobile computing devices 12. The center PCB 30 is electrically coupled by flex wires or cables to the top 26 and bottom 28 PCBs to control and provide power to or receive power from or input control signals from the top 26 and bottom 28 PCBs.

The processor 31 of the center PCB 30 may be a general purpose microprocessor, a digital signal processor (DSP), a field programmable gate array (FPGA), an application specific integrated circuit (ASIC), or other programmable logic device, or other discrete computer-executable components designed to perform the functions described herein. The processor 31 may also be formed of a combination of computing devices, for example, a DSP and a microprocessor, a plurality of microprocessors, one or more microprocessors in conjunction with a DSP core, or any other suitable configuration.

In some embodiments, the processor 31 is coupled, via one or more buses, to the memory in order to read information from, and optionally write information to, the memory. The memory may be any suitable computer-readable medium that stores computer-readable instructions for execution by the processor 31. For example, the computer-readable medium may include one or more of RAM, ROM, flash memory, EEPROM, a hard disk drive, a solid state drive, or any other suitable device. In some embodiments, the computer-readable instructions include software stored in a non-transitory format. The software may be programmed into the memory or downloaded as an application onto the memory. The software may include instructions for managing or running a communication system and/or one or more programs or applications of the case 10, as described elsewhere herein.

In some embodiments, the top 26 and center 30 PCBs are combined into one PCB; the bottom 28 and center 30 PCBs are combined into one PCB; or the top 26, center 30, and bottom 28 PCBs are combined into one PCB. In some embodiments, less than or more than three PCBs may be used to achieve the desired functionality in the case 10.

In some embodiments, as shown in FIGS. 7A-7B, the antennas 36 are positioned in the bottom corners of the bottom portion 18 of the case 10. The corner position of each antenna 36 functions to provide an air gap between the antenna 36 and the sidewalls 14 of the case 10 to allow the antennas 36 to receive and transmit data more effectively. In some embodiments, the antenna 36 of the center PCB 30 includes one or both of a receiver and a transmitter. The receiver receives data over a communication network and demodulates the received data. The transmitter prepares data according to one or more network standards and transmits data over a communication network. In some embodiments, a transceiver antenna acts as both a receiver and a transmitter for bi-directional wireless communication. In some embodiments, the center PCB 30 includes a first transceiver (or first transmitter) and a first antenna dedicated to a first earbud 64a and a second transceiver (or second transmitter) and a second antenna dedicated to a second earbud 64b. In some embodiments, a first antenna, receiver, or transceiver receives a wireless data transfer from a mobile computing device 12 and a second antenna, transmitter, or transceiver transmits a plurality of wireless data transfers directly to at least a first wireless earbud 64b and a second wireless earbud 64b. In some embodiments, the first wireless earbud 64a receives the plurality of wireless data transfers at a first frequency and the second wireless earbud 64b receives the plurality of wireless data transfers at a second frequency. Alternatively, in some embodiments, the first wireless earbud 64a receives the plurality of wireless data transfers at a first frequency, the first frequency comprising a first wave comprising a first amplitude: the second wireless earbud 64b receives the plurality of wireless data transfers at a second frequency, the second frequency comprising a second wave comprising a second amplitude. In some such embodiments, the first frequency and the second frequency are the same.

The center PCB 30 may further include a battery management system 29. The battery management system 29 functions to, for example, protect the battery 32 from operating outside its safe operating area (i.e., voltage and current condition over which device can be operated without self-damage), monitoring the state of the battery 32, controlling the environment of the battery 32, and/or battery balancing (i.e., maximizing capacity of battery to increase battery longevity). In some embodiments, the battery management system 29 includes charging order or prioritization. In one embodiment, the battery management system 29 prioritizes charging the mobile computing device 12 first and the battery 32 disposed in the case 10 second. In one embodiment, the battery management system 29 prioritizes charging the battery 32 disposed in the case 10 first and the mobile computing device 12 second. In one embodiment, the battery management system 29 splits charging capacity equally, proportionally, or randomly between the battery 32 disposed in the case 10 and the mobile computing device 12.

In some embodiments, the battery 32 is managed so that it does not discharge completely to recharge the mobile computing device 12. For example, the battery 32 may be allowed to discharge to a predetermined threshold (e.g., 50%, 60%, 70%, 80%, 90%, etc. of its rated capacity) to charge the mobile computing device 12 disposed in the case 10 so that a percentage of the battery power remains for charging one or more wireless earbuds 64 disposed in the case 10.

As shown in FIGS. 7A-7B, FIG. 8, and FIG. 10, the second housing 38 further includes a rechargeable battery 32 disposed therein and electrically coupled to the center PCB 30, top PCB 26, and bottom PCB 28. In some embodiments, the rechargeable battery 32 is a nickel cadmium, nickel-metal hydride, lead acid, lithium ion, or lithium polymer battery. In one non-limiting example, the rechargeable battery 32 is a lithium ion battery. In one embodiment, as shown in FIG. 10, the battery 32 is positioned parallel to the back panel 16 in the second housing 38 defined by the dividing layer 13 and the back panel 16. A mid-section of the back panel 16 of the case 10 has an outer surface 40 that forms the outside surface of the case 10, the inner surface 42 of the mid-section of the back panel 16 is directly against the back surface of the battery 32. The front surface 44 of the battery 32 is directly against the dividing layer 13.

In some embodiments, the dividing layer 13 at least partially comprises a sealing layer to further reduce a thickness of the case 10. In some such embodiments, an adhesive side of the sealing layer is directly against the front surface 44 of the battery 32, and the non-adhesive side of the sealing layer is positioned directly against the back side of the mobile computing device 12 positioned in the case 10. Said alternatively, a back surface of the rechargeable battery 32 is positioned against the back panel 16 and a front surface 44 of the rechargeable battery 32 is adjacent to and secured by a sealing layer. In some embodiments, the sealing layer minimizes thickness of the dividing layer 13 and therefore the overall thickness of the case 10. In some embodiments, the sealing layer may employ a pressure sensitive adhesive to bond a membrane or other material to the battery 32 to secure the battery 32 in the second housing 38. Non-limiting examples of pressure sensitive adhesives include: natural rubber, vinyl ethers, acrylics, butyl rubber, styrene block copolymers, silicones, or nitriles mixed with a resin, for example terpene-phenol, terpenes, aromatic resins, and hydrogenated hydrocarbon resins. In some embodiments, the sealing layer may employ a structural adhesive, for example epoxies, cyanoacrylates, urethanes, or acrylics, that secures a thin membrane or material over the battery 32 to secure the battery 32 in the second housing 38. In some embodiments, the dividing layer 13 and/or sealing layer is 0.05 to 0.5, 0.05 to 0.1, 0.1 to 0.15, 0.15 to 0.2, 0.2 to 0.25, 0.25 to 0.3, 0.3 to 0.35, 0.35 to 0.4, 0.4 to 0.45, or 0.45 to 0.5 millimeters thick. In one non-limiting embodiment, the sealing layer is 0.2 to 0.3 millimeters thick.

The bottom portion 18 of the case 10, as shown in FIG. 6A and FIG. 7B, houses the bottom PCB 28 in some embodiments and provides a case charging receptacle or jack, a computing device charge switch, and/or apertures to view one or more optical (e.g., LED, OLED, etc.) battery charge indicators.

The top portion 20 of the case 10, as shown in FIGS. 1A-1B, FIGS. 6A-6C, and FIGS. 11A-11B, includes an earbud cavity 34 configured to receive one or more wireless earbuds 64. In some embodiments, a subset of the plurality of sidewalls 14, the back panel 16, and a second portion of the front panel 15 together define the earbud cavity 34.

Alternatively or additionally, in some embodiments, the earbud cavity 34 is positioned adjacent to the first housing 22, the dividing layer 13, and the second housing 38 and/or parallel to the front panel 15 and the back panel 16. For example, as shown in FIG. 1D, the earbud cavity 34 and/or one or more wireless earbuds 64 positioned in the earbud cavity 34 may intersect a first housing longitudinal plane 65, a dividing layer longitudinal plane 67, and a second housing longitudinal plane 69. Said alternatively, the earbud cavity 34 and/or one or more wireless earbuds 64 positioned in the earbud cavity 34 are inline with a first housing plane 65, a dividing layer plane 67, and a second housing plane 69. Said alternatively, the earbud cavity 34 and/or one or more wireless earbuds 64 positioned in the earbud cavity 34 share a horizontal plane or longitudinal plane 65, 67, 69 with the first housing 22, dividing layer 13, and second housing 38. In some embodiments, a battery 32, one or more charging contacts 76, and/or one or more wireless earbuds 64 all share or are positioned in a second housing longitudinal plane 69, for example between the dividing layer 13 and the back panel 16. Further for example, as shown in FIG. 1E, the earbud cavity 34 and/or one or more wireless earbuds 64 positioned in the earbud cavity 34 may intersect a front panel longitudinal plane 61, a dividing layer longitudinal plane 67, and a back panel longitudinal plane 63. Said alternatively, the earbud cavity 34 and/or one or more wireless earbuds 64 positioned in the earbud cavity 34 are inline with a front panel plane 61, a dividing layer plane 67, and a back panel plane 63. Said alternatively, the earbud cavity 34 and/or one or more wireless earbuds 64 positioned in the earbud cavity 34 share a horizontal plane or longitudinal plane 61, 67, 63 with the first housing 22, dividing layer 13, and second housing 38.

Figure 9A:
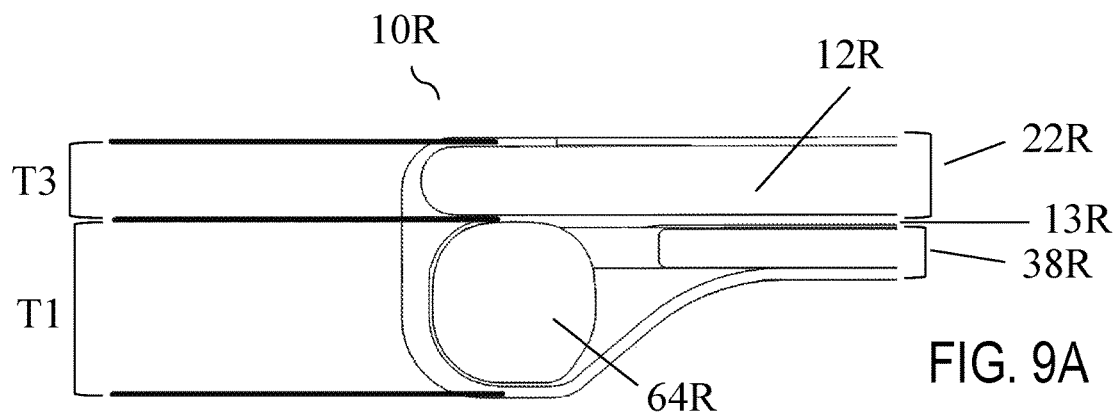
FIG. 9A shows a partial side view of one embodiment of a reference case.
Figure 9B:
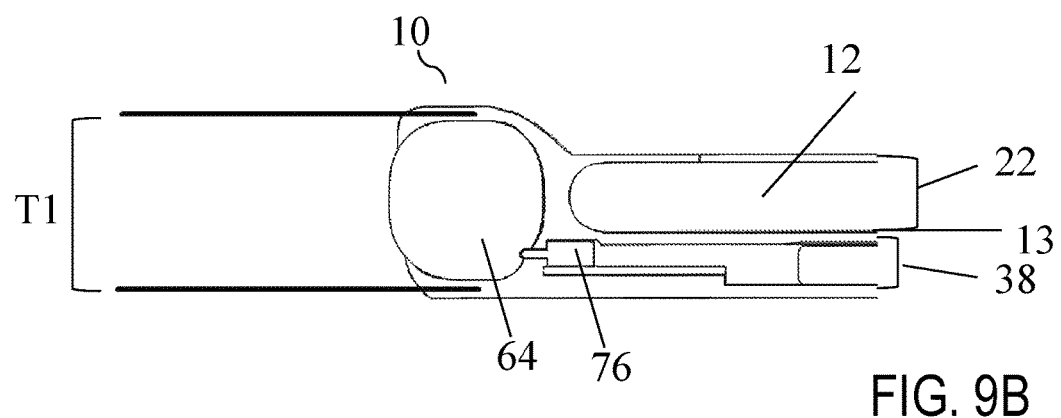
FIG. 9B shows a partial side view of one embodiment of a case of the present disclosure.
Figure 9C:
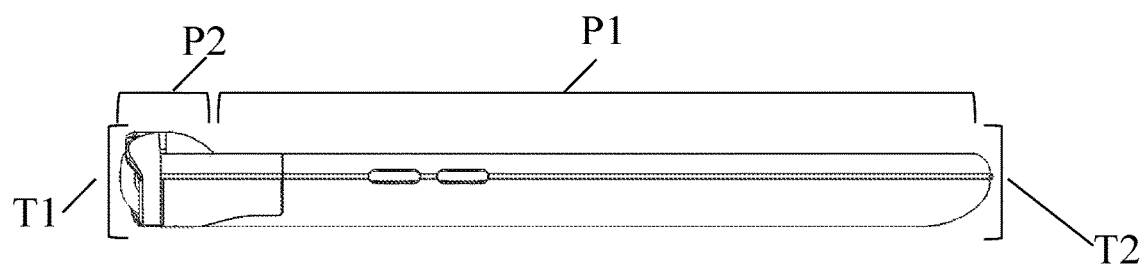
FIG. 9C shows a side view of one embodiment of a case of the present disclosure.

FIG. 9A shows a side view of a reference case 10R in which an earbud 64R is positioned behind a first housing 22R and dividing layer 13R, behind a mobile computing device 12R disposed in the reference case 10R. This orientation results in an overall reference case thickness T1 plus T3. In contrast, as shown in FIG. 9B and FIGS. 1D-IE, the case 10 described herein has one or more earbuds 64 positioned adjacent to, intersecting, or sharing a longitudinal or horizontal plane with the first housing 22, the dividing layer 13, and the second housing 38, as described elsewhere herein, resulting in an overall case thickness T1, which is less than T1 plus T3. In some embodiments, as shown in FIG. 9C, a thickness T1 of the case 10 does not exceed 10 mm, 11 mm, 12 mm, 13 mm, 14 mm, 15 mm, 16 mm, 17 mm, 18 mm, 19 mm, or 20 mm. In one embodiment, a thickness T1 of the case 10 does not exceed 19.0 mm. Further, in some embodiments, as shown in FIG. 9C, a thickness T2 of the case 10 does not exceed 8 mm, 9 mm, 10 mm, 11 mm, 12 mm, 13 mm, 14 mm, 15 mm, or 16 mm. In one embodiment, a thickness T2 of the case 10 does not exceed 14.5 mm. In some embodiments, T1 is equal to T2; in some embodiments, T1 is different than T2. In some embodiments, as shown in FIG. 6C, a length L of the case 10 does not exceed 110 mm, 120 mm, 130 mm, 140 mm, 150 mm, 160 mm, 170 mm, or 180 mm. In one embodiment, a length L of the case 10 does not exceed 167 mm. In some embodiments, as shown in FIG. 6C, a width W of the case 10 does not exceed 50 mm, 60 mm, 70 mm, 80 mm, 90 mm, or 100 mm. In one embodiments, a width W of the case 10 does not exceed 75 mm.

Figure 5A:
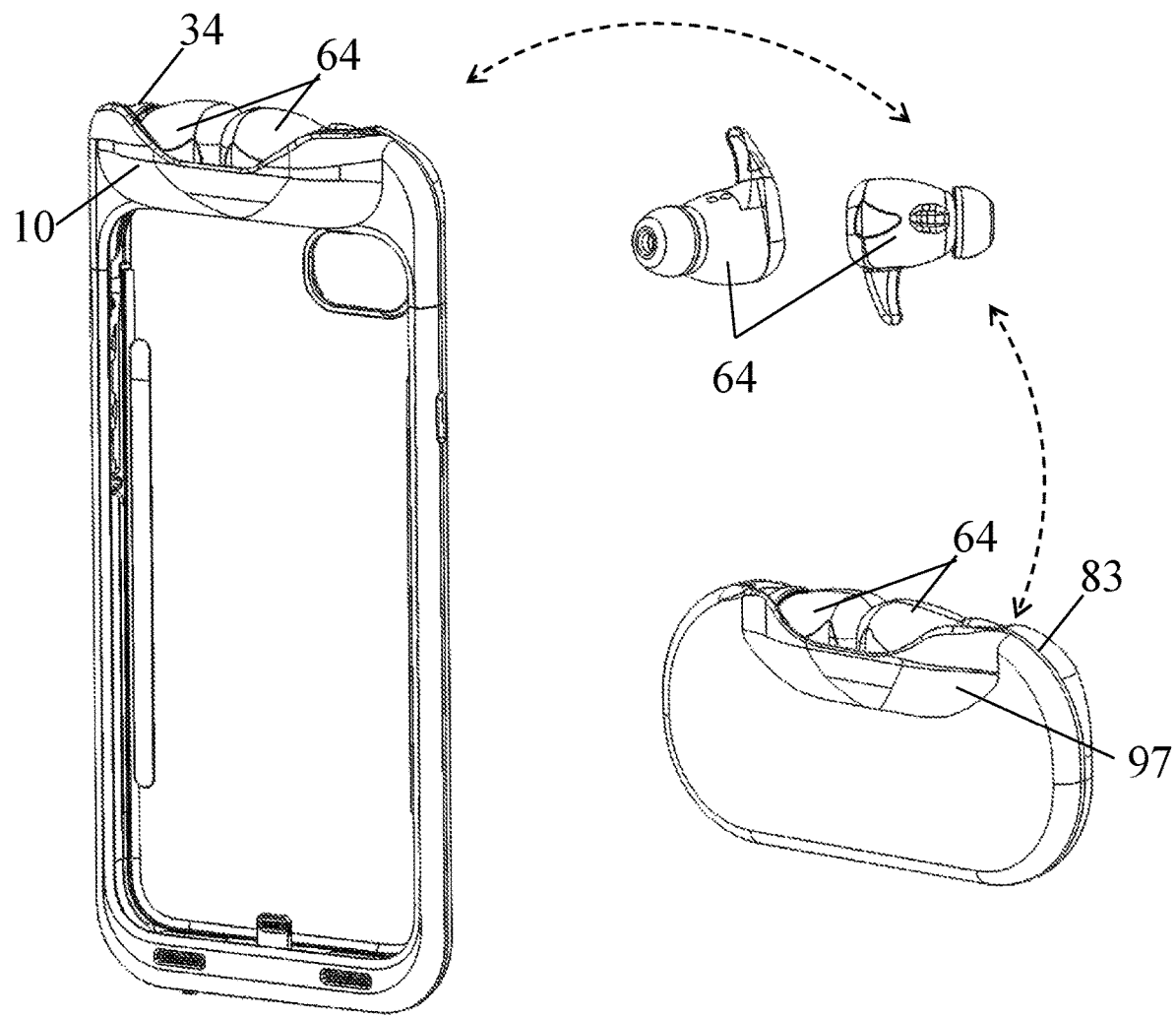
FIG. 5A shows one embodiment of wireless earbuds being removed from a case and positioned in an earbud charging or storage device or removed from an earbud charging or storage device and positioned in a case.
Figure 5B:
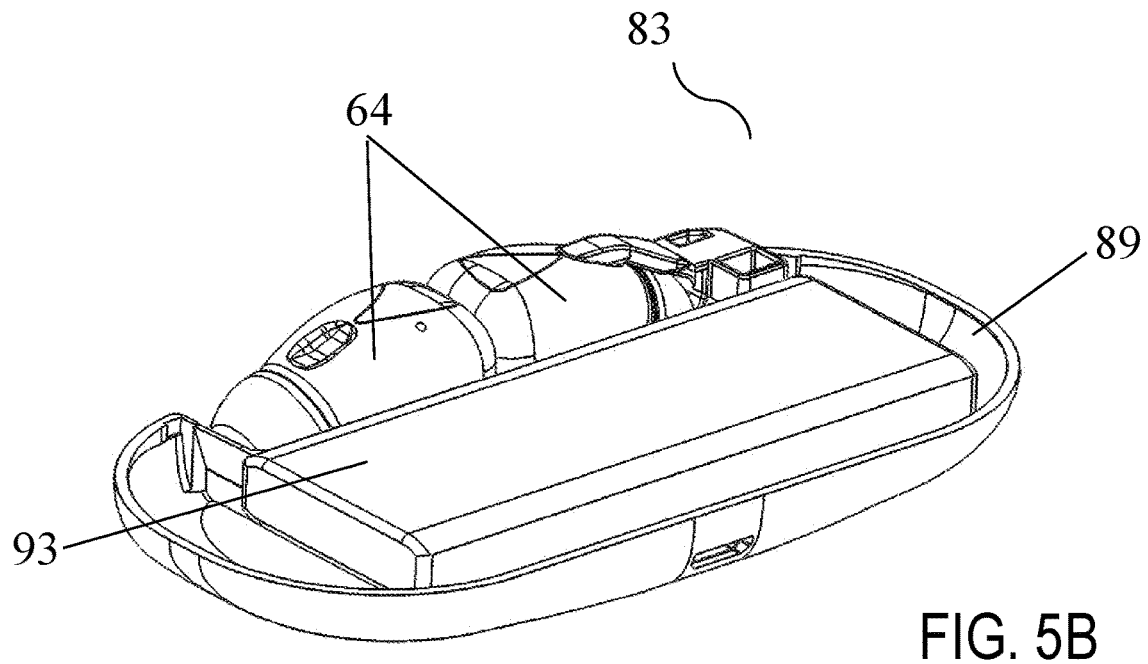
FIG. 5B shows an interior perspective view of one embodiment of an earbud charging or storage device.
Figure 5C:
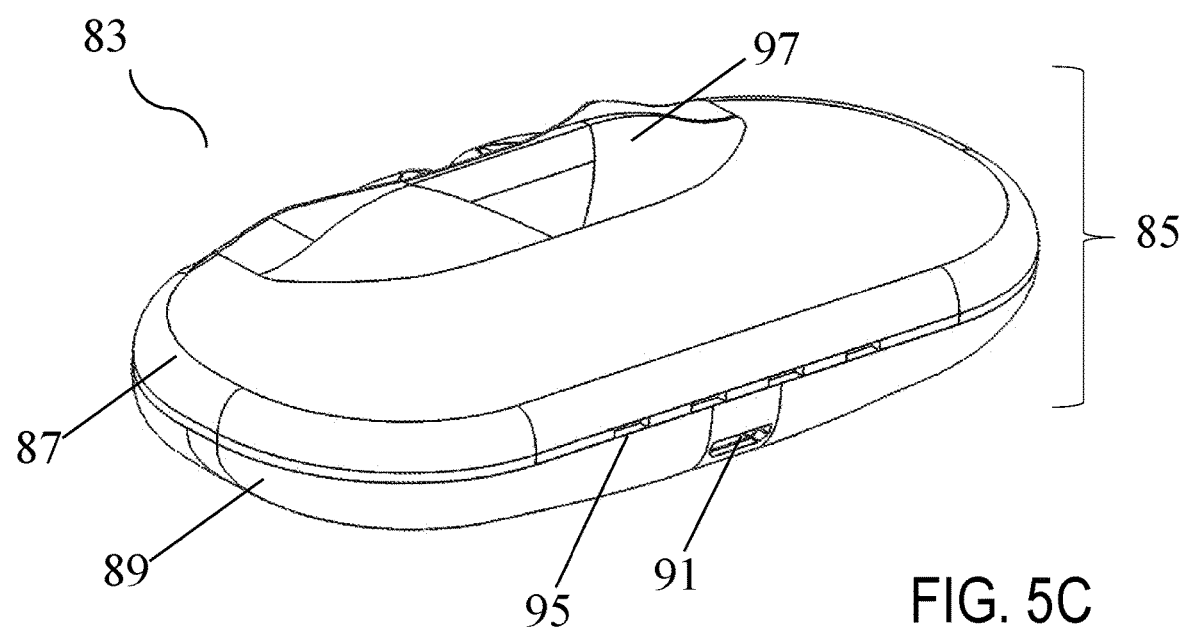
FIG. 5C shows an exterior perspective view of one embodiment of an earbud charging or storage device.
Figure 6D:
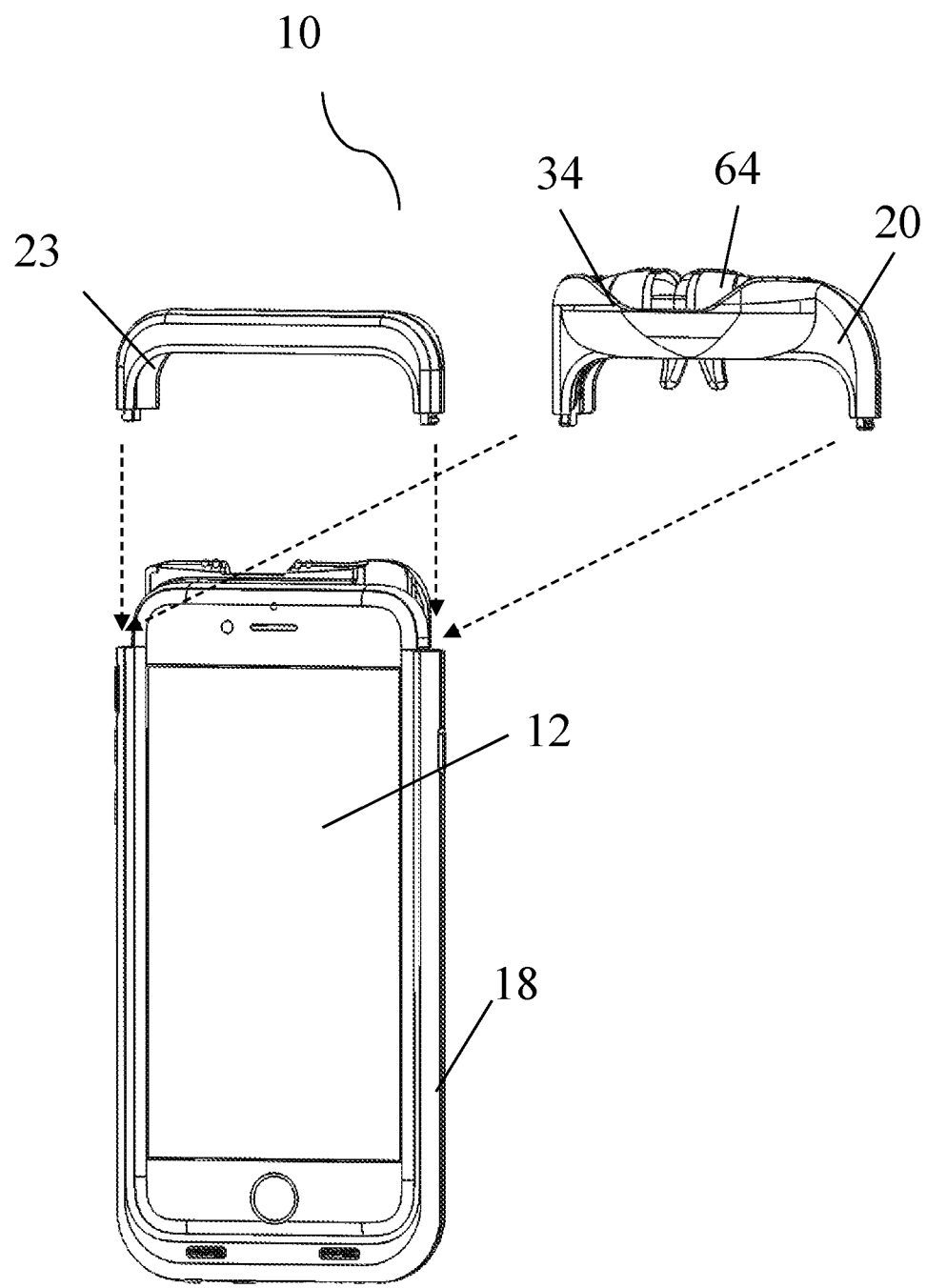
FIG. 6D shows one embodiment of an interchangeable top portion of a case not including an earbud cavity.
Figure 6E:
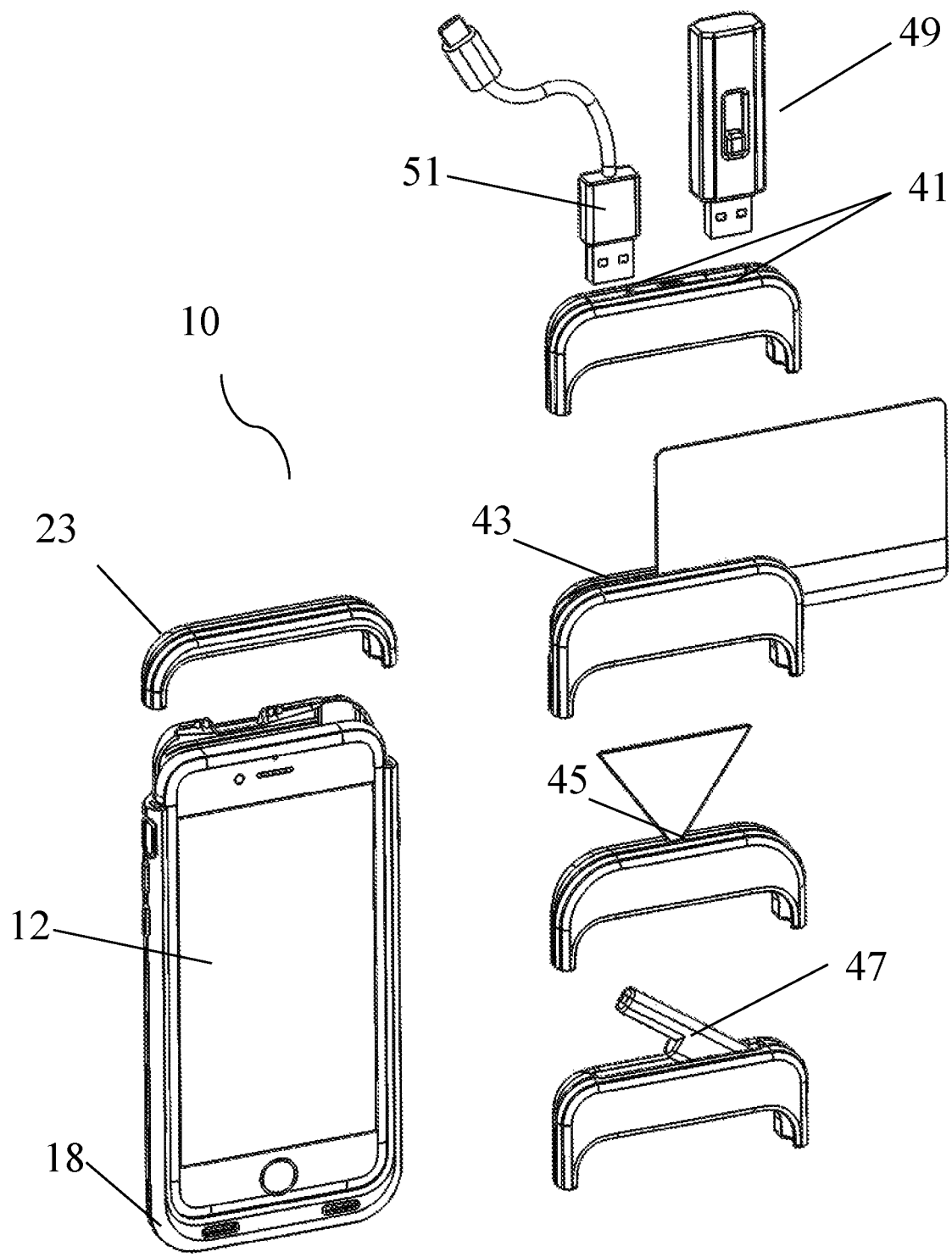
FIG. 6E shows various embodiments of an interchangeable top portion of a case.

In some embodiments, the top portion 20 includes more than one earbud cavity 34, such that each earbud cavity 34 houses one earbud 64 or each earbud cavity 34 houses more than one earbud 64. Alternatively, in some embodiments, one or more earbuds 64 are housed externally to the case 10, as shown in FIGS. 5A-5C, and/or a top portion 20 of the case 10 including the earbud cavity 34 is removeable and/or interchangeable with a second top portion 23 that does not include an earbud cavity, as shown in FIG. 6D. In some such embodiments, the second top portion 23 functions to secure and/or protect the mobile computing device 12 when coupled to the bottom portion 18 when, for example, the user does not desire to have one or more earbuds 64 with him/her or the user is participating in an activity involving water. Alternatively, in some embodiments, as shown in FIG. 6E, the second top portion includes one or more Universal Serial Bus (USB) ports 41 for matingly receiving a USB drive 49 or USB connector/adapter 51, a credit card reader 43, a scanner or projector 45, or a breathalyzer 47. The second top portion 23 may, in some embodiments, include a flashlight, kickstand, keyboard (e.g., qwerty), a photo enhancement, a wall plug (i.e., to directly charge case 10 and/or mobile computing device 12 disposed in the case 10 from a wall outlet), a projector module (i.e., to project images from the mobile computing device 12 onto a surface), a solar power panel (e.g., for charging the case 10 and/or a mobile computing device 12 disposed in the case 10), a thermal imager (e.g., an infrared camera to detect heat), a bottle opener, an electric lighter, an external speaker, a contactless wireless charger (e.g., for induction charging), a scanner (e.g., for reading near-field communication tags, QR codes, barcodes, etc.), a strobe light, a Selfie Flash (i.e., forward facing soft light for pictures), or a power bank (e.g., using USB connector/adapter 51 to power additional devices using the battery 32 in the case 10).

Figure 6F:
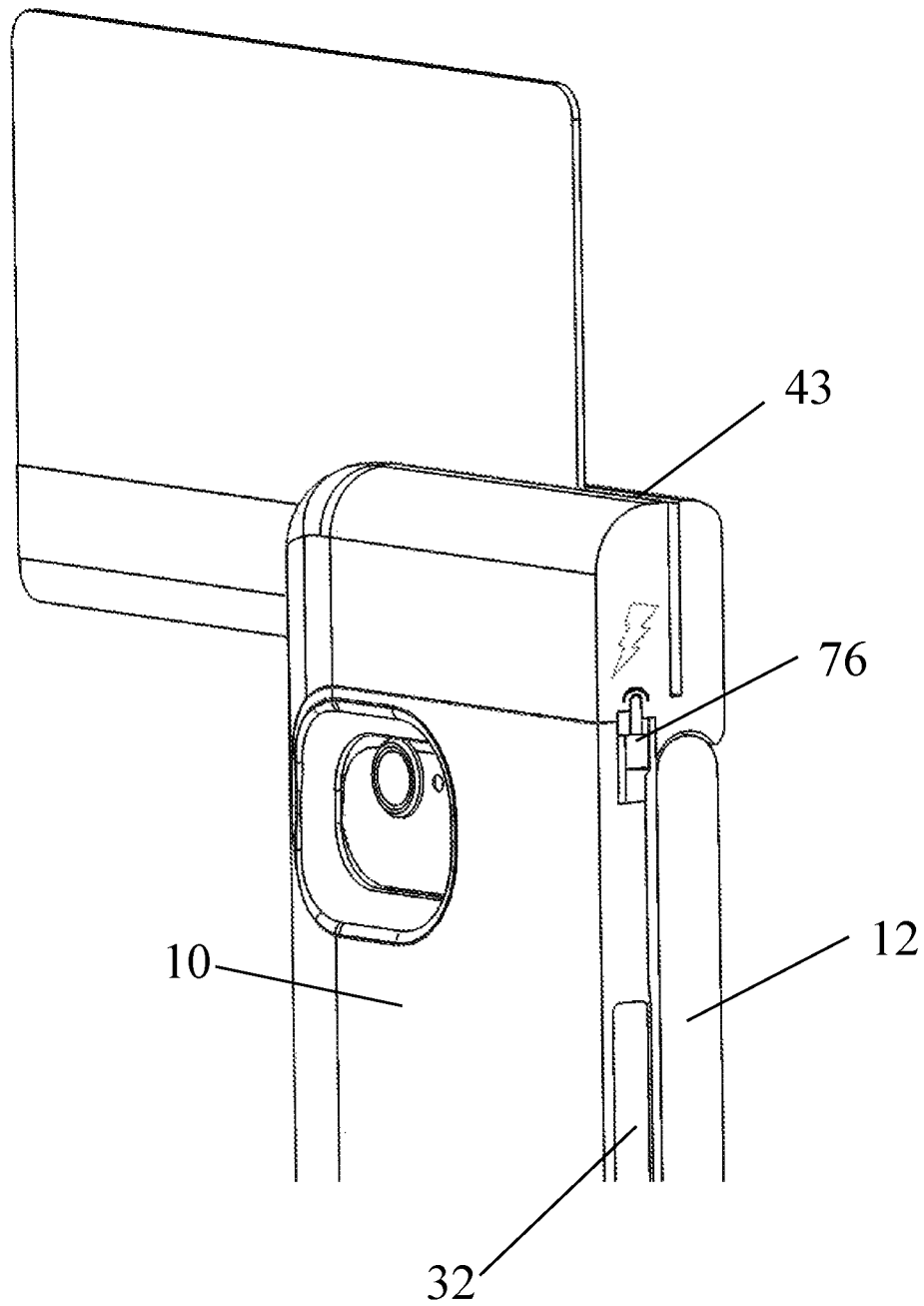
FIG. 6F shows one embodiment of a charging contact for an interchangeable top portion of a case.

In some embodiments, the second top portion, for example a credit card reader 43, may receive charge from a battery 32 disposed in the case 10 via earbud charging contacts 76, as shown in FIG. 6F. The second top portion may receive charge and/or transmit data back to the case 10 or receive data from the case 10 directly via one or more earbud charging contacts 76 or via wireless communication (e.g., Bluetooth). In another embodiment, the second top portion may receive charge and/or transmit data to or receive data from a mobile computing device 12 indirectly via the case 10 (e.g., via connector 19) or directly using wireless communication. In some embodiments, only one earbud charging contact 76 is required to charge and/or transmit data to or from the second top portion; in other embodiments, more than one or a plurality of earbud charging contacts 76 is required to charge and/or transmit data to or from the second top portion.

Figure 11A:
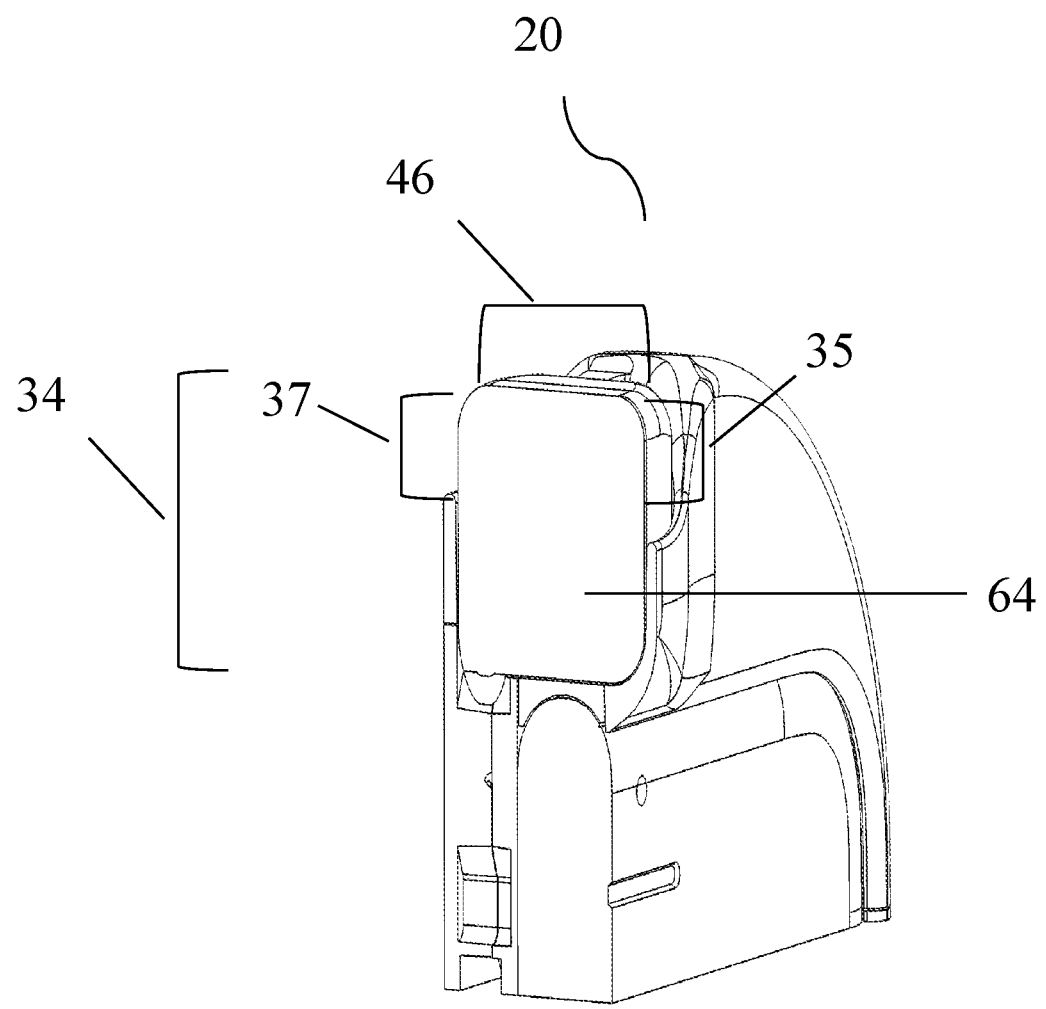
FIG. 11A shows a cross-sectional view of one embodiment of pinch-to-remove earbud housed in a case.
Figure 11B:
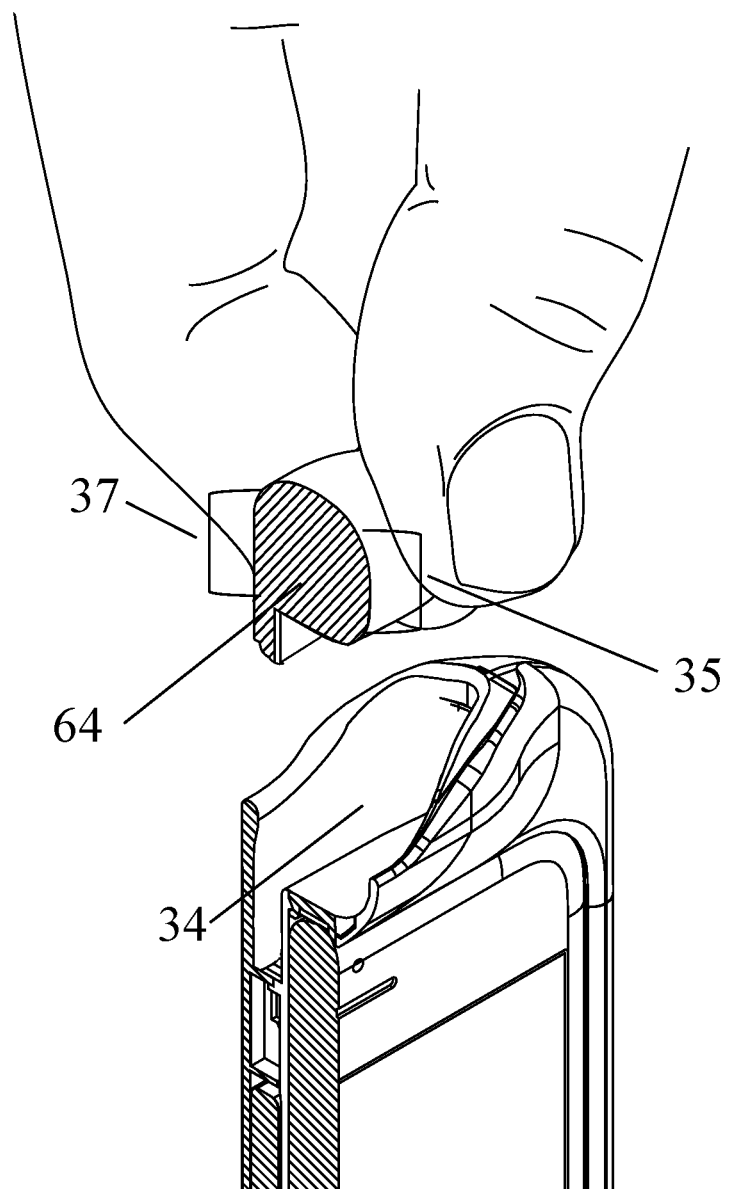
FIG. 11B shows a cross-sectional view of one embodiment of an earbud being pinch removed from a case.

In some embodiments, as shown in FIGS. 6A-6C and FIGS. 11A-11B, a perimeter of an opening of the earbud cavity 34 is concave or has a concave shape so that a top portion 46 and/or a front portion 35 and a back portion 37 of each earbud 64 is exposed in the earbud cavity 34 allowing each earbud 64 to be removed from the earbud cavity 34 using a pinching mechanism or method. For example, as shown in FIG. 11B, a user may use an index finger and thumb to grip or pinch the front portion 35 and the back portion 37 of the earbud 64 simultaneously or substantially simultaneously to insert or remove the earbud 64 from the earbud cavity 34. Alternatively, in some embodiments, a perimeter of an opening of the earbud cavity 34 has a linear or convex shape so that an earbud 64 within the earbud cavity 34 is unexposed but inline with the top portion 20 of the case 10. Alternatively, in some embodiments, one or more earbuds 64 may protrude from the earbud cavity 34 in the top portion 20 of the case 10 for easy removal of the one or more earbuds 64 from the top portion 20 of the case 10.

Figure 12A:
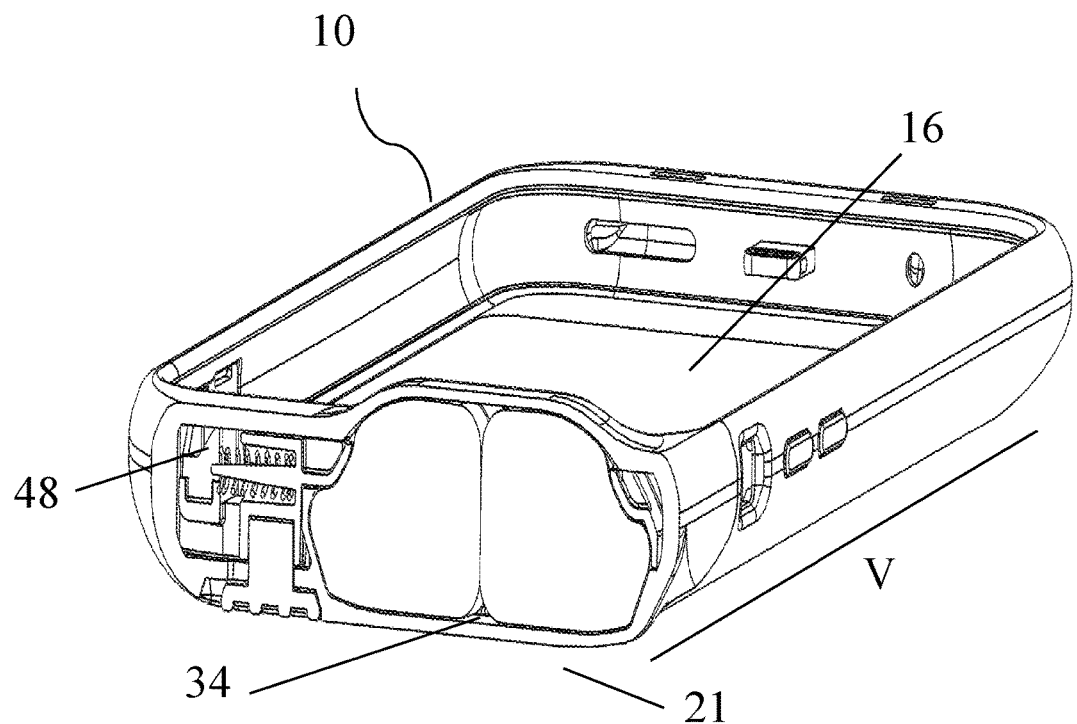
FIG. 12A shows a perspective view of one embodiment of two earbuds locked into an earbud cavity in a top portion of a case.
Figure 12B:
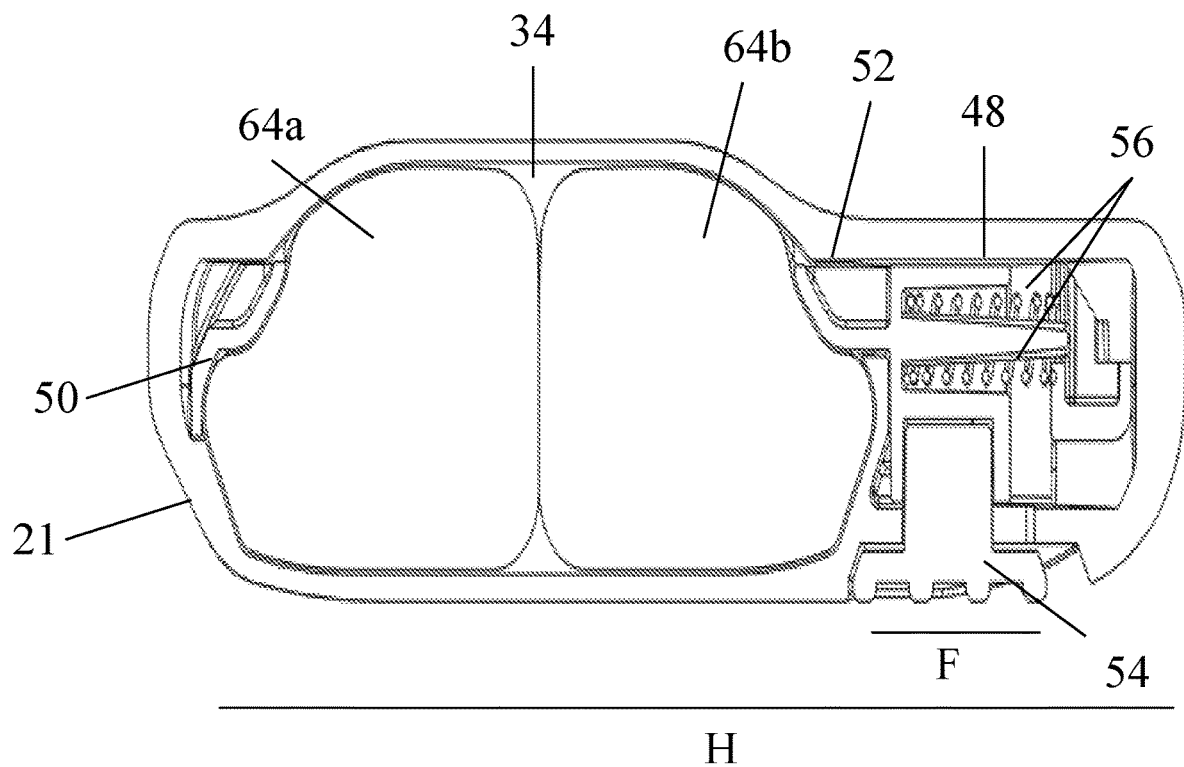
FIG. 12B shows a top view of one embodiment of two earbuds locked into an earbud cavity in a top portion of a case.

In some embodiments, the top portion 20 of the case 10 further includes a locking mechanism 48 to removably secure one or more earbuds 64 within the earbud cavity 34 of the top portion 20 of the case 10, as shown in FIGS. 12A-12B. The locking mechanism 48 is adjacent to the first housing 22, along a top edge 21 of the mobile computing device 12, adjacent to the earbud cavity 34. Since the earbud cavity 34 does not consume the entire volume of the top portion 20, the position of the locking mechanism 48 (either to the left or right (adjacent to) of the earbud cavity in the top portion) prevents the locking mechanism 48 from adding additional length and thickness to the top portion 20 of case 10. As shown in FIG. 12A, the locking mechanism 48 encased in the top portion 20 is horizontally H in-line with the earbud cavity 34, vertically V in-line with the first housing 22 and the second housing 38 of the case 10, as shown in FIG. 12A. This configuration does not increase the overall case width W. In some embodiments, the locking mechanism 48 includes a stationary lock for the first earbud 64a and sliding lock for the second earbud 64b. For example, the locking mechanism 48 may include a stationary stop 50 on a first side of the locking mechanism 48 and a movable stop 52 on a second side of the locking mechanism 48.

During use, as shown in FIG. 12B, a slider 54 on the second side of the locking mechanism 48 is horizontally adjusted, maneuvered, or displaced by applying horizontal force F to the slider 54 to compress a spring or series of springs 56 in the locking mechanism 48 to horizontally displace the movable stop 52 on the second side of the locking mechanism 48. The first earbud 64a is positioned against the stationary stop 50 on the first side of the locking mechanism 48, and the second earbud 64b is positioned next to the first earbud 64a adjacent to the second side of the locking mechanism 48 next to the movable stop 52. Release of the force F applied to the slider 54 allows the movable stop 52 to horizontally contact and secure or lock into place the second earbud 64b. Alternatively, in some embodiments, the locking mechanism 48 includes a stationary lock for both earbuds 64, such that each earbud 64 is snapped into the earbud cavity 34 in the top portion 20 of the case 10. Alternatively, in some embodiments, the locking mechanism 48 includes a sliding lock for both earbuds 64. For example, each side of the locking mechanism 48 may include a slider 54 to compress a spring or series of springs 56 and horizontally displace a movable stop 52. In some embodiments, maneuvering the slider 54 compresses any linear or rotational force applying element (e.g., plastic spring arm, rotary coil spring type of release, etc.) that achieves the same endpoint of locking the earbud 64 in the earbud cavity 34 of the case 10.

Alternatively, in some embodiments, the locking mechanism 48 includes a pressure locking-releasing mechanism. For example, a user may apply force or pressure to an earbud 64 to removably secure or lock the earbud 64 in the earbud cavity 34 and to release or unlock the earbud 64 from the earbud cavity 34. The force or pressure used to secure or lock the earbud 64 in the earbud cavity 34 may compress or load a spring and activate a lock, whereas the force or pressure used to release or unlock the earbud 64 from the earbud cavity 34 may decompress or expand the spring to a normal (i.e., unloaded) position.

Figure 13A:
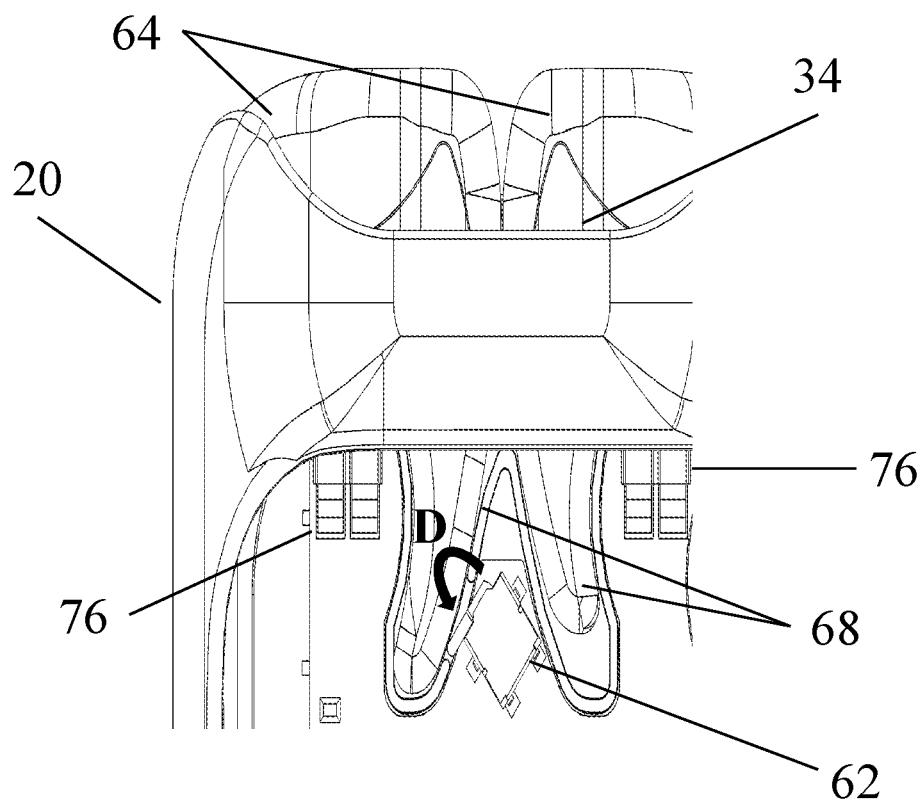
FIG. 13A shows one embodiment of a switch mechanism and charging mechanism for charging the earbuds and deactivating a wireless signal originating from the mobile computing device or the case when the earbuds are housed in the case.
Figure 13B:
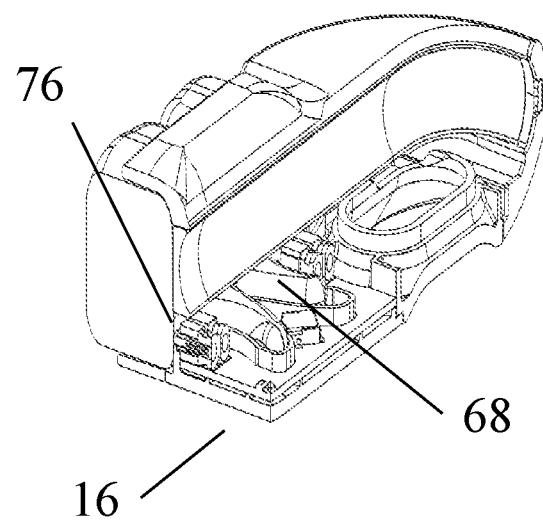
FIG. 13B shows one embodiment of a cross-sectional view of a switch mechanism and charging mechanism for charging the earbuds and deactivating a wireless signal originating from the mobile computing device or the case when the earbuds are housed in the case.
Figure 13C:
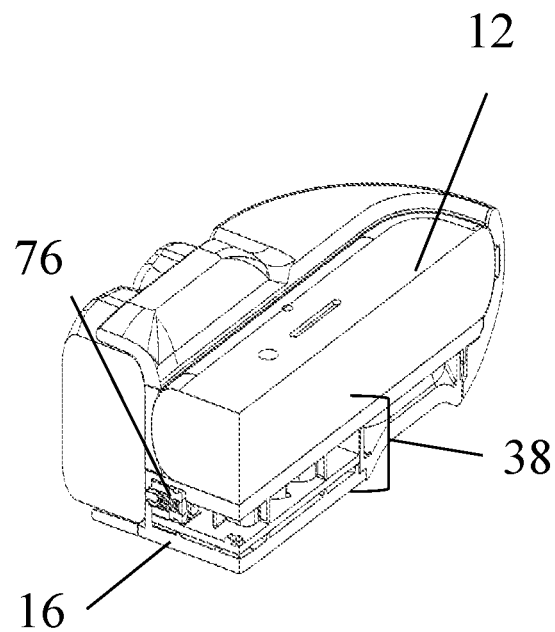
FIG. 13C shows one embodiment of a cross-sectional view of a switch mechanism and charging mechanism for charging the earbuds and deactivating a wireless signal originating from the mobile computing device or the case when the earbuds are housed in the case.
Figure 13D:
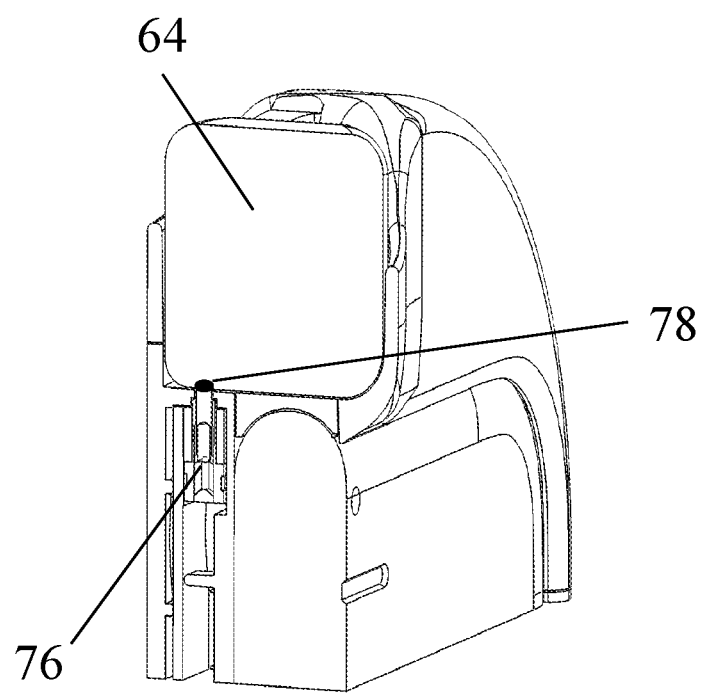
FIG. 13D shows one embodiment of a cross-sectional view of a charging mechanism, including a conductive surface of an earbud inline with a charging contact disposed in a top portion of the case, positioned in a second housing defined by a dividing layer and a back panel of the case.

Further, as shown in FIGS. 13A and 13D, the earbud cavity 34 in the top portion 20 of the case 10 includes at least one earbud charging contact 76 per earbud 64. The earbud charging contact 76 is configured to contact and charge the wireless earbud 64 when the wireless earbud 64 is positioned in the case 10. The earbud charging contact 76 aligns with and interfaces with a conductive surface 78 on the body 70 of the earbud 64 (also shown in FIGS. 2A-2F and FIGS. 3A-3D). The earbud charging contact 76 is disposed within the second housing 38 defined by the dividing layer 13 and the back panel 16 to minimize a thickness T of the case 10. For example, the earbud charging contact 76 may be positioned between the dividing layer 13 and the back panel 16, as shown in FIGS. 1D-1E, 9B. In some embodiments, the earbud charging contact 76 is further positioned adjacent to or in the same plane as a rechargeable battery 32 disposed in the second housing 38.

In some embodiments, the fin 68 of the earbud 64 is shaped such that the earbud 64 only fits into the earbud cavity 34 in one orientation so that the conductive surface 78 on the body 70 of the earbud 64 always interfaces with the earbud charging contacts 76 in the second housing 38. In some embodiments, the earbud charging contacts 76 are spring loaded pins or stationary pins. In some embodiments, the first earbud 64a receives charge from the case 10, for example using the earbud charging contacts 76, and the second earbud 64b receives charge from the first earbud 64a using, for example, induction or one or more conductive surfaces on the second earbud 64b interfacing with a charging contact on the first earbud 64a. In one embodiment, the first and second earbuds 64a/64b both receive power from the case 10 via induction charging and/or conductive charging.

Further, as shown in FIG. 13A, the earbud cavity 34 in the top portion 20 of the case 10 includes a switch mechanism 62 that detects the presence or absence of the earbuds 64 in the earbud cavity 34. In some embodiments, the switch mechanism 62 is disposed in the second housing 38 defined by the dividing layer 13 and the back panel 16. This configuration prevents unnecessary width W or thickness T in the case 10 and prevents any bulging, swelling, or protrusions in the case 10 to accommodate the fins 68 of the earbuds 64 and/or the switch mechanism 62.

In one non-limiting example, when the switch mechanism 62 is activated (i.e., earbuds are in the earbud cavity), the battery 32 recharges the rechargeable battery of the earbuds 64 positioned in the earbud cavity 34; when the switch mechanism 62 is deactivated (i.e., earbuds are not in the earbud cavity), the battery 32 does not supply power to recharge the earbuds 64 in the earbud cavity 34. Further in some embodiments, when the switch mechanism 62 is activated (i.e., earbuds are in the earbud cavity), the wireless signal emanating from the case 10 and/or mobile computing device 12 is turned off or deactivated; when the switch mechanism 62 is deactivated (i.e., earbuds not in the earbud cavity), the wireless signal emanating from the case 10 and/or mobile computing device 12 remains active or on.

In one embodiment of the switch mechanism 62, the mobile computing device 12 is communicatively coupled to the case 10. In one embodiment of the switch mechanism 62, the mobile computing device 12 is communicatively coupled to one or more earbuds 64. For example, when an earbud 64 is being recharged in the case 10, the earbud 64 may sense that it is being recharged and send a signal to the case 10 and/or mobile computing device 12 to deactivate a wireless signal emanating from the case 10 and/or mobile computing device 12. The switch mechanism 62 conserves battery life since wireless signal broadcasting only occurs when the earbuds 64 are not positioned in the earbud cavity 34 in the top portion 20 of the case 10.

The switch mechanism 62 may comprise a toggle switch. For example, positioning an earbud 64 in the earbud cavity 34 deflects D the lever to an "off" state, as shown in FIG. 13A, and removal of the earbuds 64 allows a spring in the switch mechanism 62 to return the lever to a "normal" or "on" state. The switch mechanism 62 may comprise a selector switch similar in functionality to the toggle switch, except allowing two or more states (e.g., wireless off and charging on, wireless on and charging on, wireless off and charging off). The switch mechanism 62 may comprise a lever actuator switch similar in functionality to the toggle switch and selector switch, except further including a roller bearing or similar device to prevent the lever from wear over time from repeated use. The switch mechanism 62 of the top PCB 26 is electrically coupled to the center PCB 30 so that charging and wireless signal broadcasting are controlled by the center PCB 30.

In some embodiments, a sidewall 14, top portion 20, bottom portion 18, a front panel 15, or back panel 16 of the case 10 further comprises a locater switch for locating one or more wireless earbuds 64. The switch when depressed or activated may cause one or more wireless earbuds 64 to broadcast an audible signal (e.g., beep, buzz, spoken word (s), ring tone, etc.) to determine a location of the one or more wireless earbuds 64. For hard of hearing or deaf users, the locater switch may activate an optical signal (e.g., LED) in the wireless earbud 64 for a visual determination of the wireless earbud's location. In some embodiments, an earbud 64 may communicate with the case 10 or mobile computing device 12 using an application downloaded and running on the mobile computing device 12 to indicate a location of the earbud 64. For example, the application may indicate proximity of the earbud 64 to the case 10 or mobile computing device 12 based on a strength of the wireless signal. In some embodiments, color coding (e.g., red for close, blue for distant); metaphors (e.g., hot for close, cold for distant); a displayed relative distance; or any other parameter is used to indicate proximity. The wireless earbud 64 may further include a watch battery, button cell, or single cell battery, so that if the main battery in the wireless earbud 64 is dead or uncharged, the user may still locate the wireless earbud 64. The watch battery, button cell, or single cell battery is sized and configured to be housed in the wireless earbud 64.

Figure 14C:
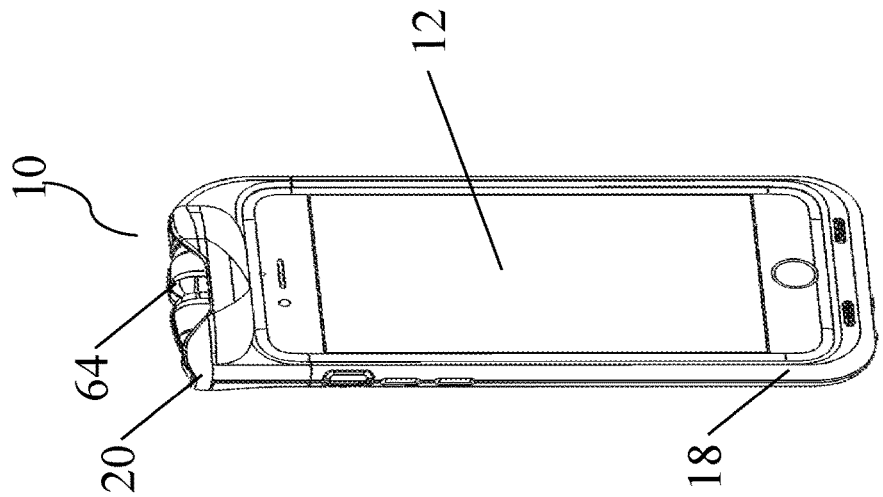
FIG. 14C shows one embodiment of a top portion of a case coupled to a bottom portion of the case, thus restraining the mobile computing device therein.
Figure 14B:
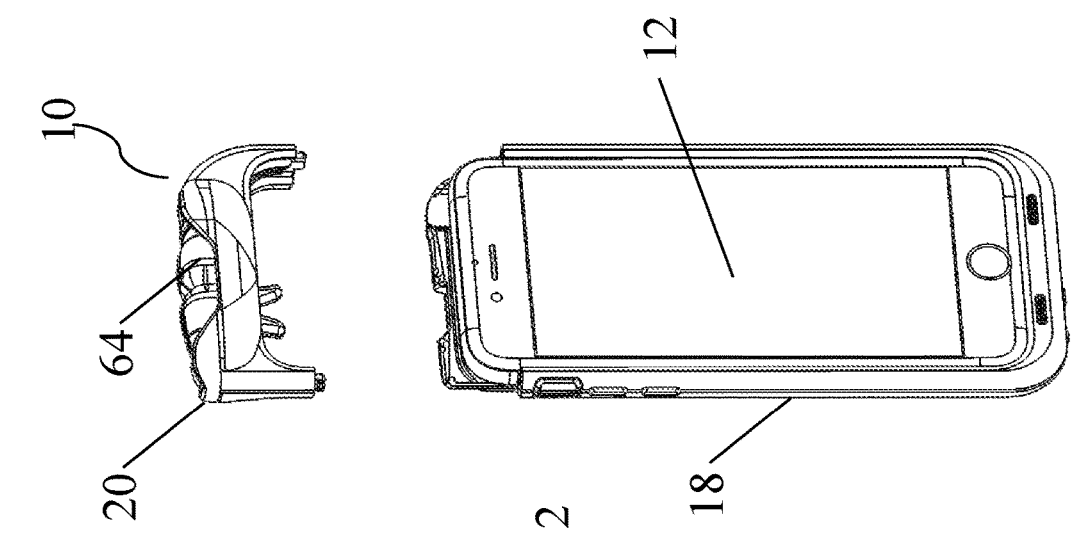
FIG. 14B shows one embodiment of a top portion of a case decoupled from a bottom portion of the case and the bottom portion of the case coupled to a mobile computing device.
Figure 14A:
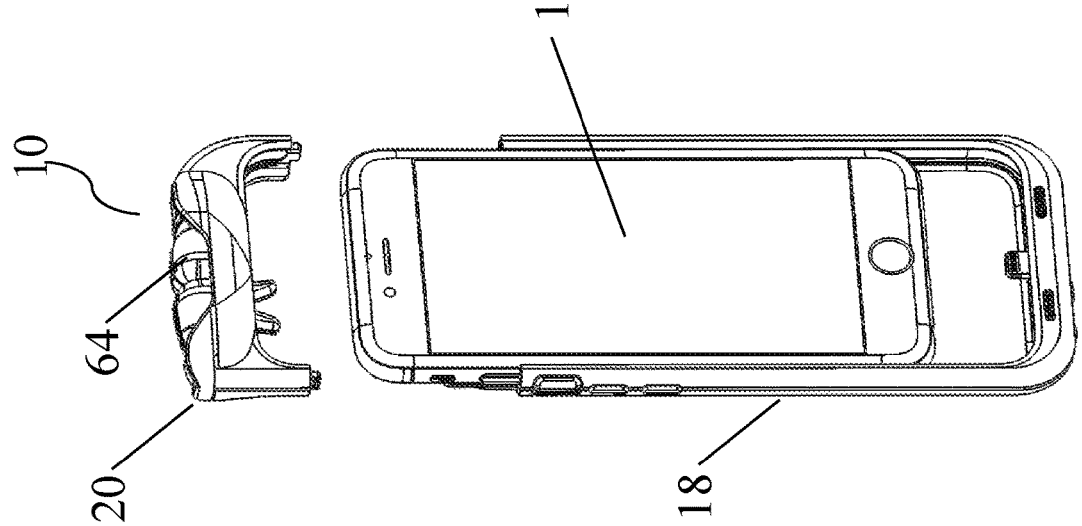
FIG. 14A shows one embodiment of a top portion of a case decoupled from a bottom portion of the case.

FIGS. 14A-14C show a top portion 20 and a bottom portion 18 of a case 10 transitionable between a decoupled state (FIGS. 14A-14B) and a coupled state (FIG. 14C). In the coupled state (FIG. 14C), the mobile computing device 12 is restrained in the case. As shown in FIG. 14A, a top portion 20 of the case 10 is decoupled or uncoupled from a bottom portion 18 of the case 10, such that the mobile computing device 12 is unrestrained. As shown in FIG. 14B, the bottom portion 18 slides onto or receives a portion of the mobile computing device 12 and then a top portion 20 of the case 10 couples to the bottom portion 18 of the case 10 to fully restrain or secure the mobile computing device 12 in the case 10, as shown in FIG. 14C.

Figure 15A:
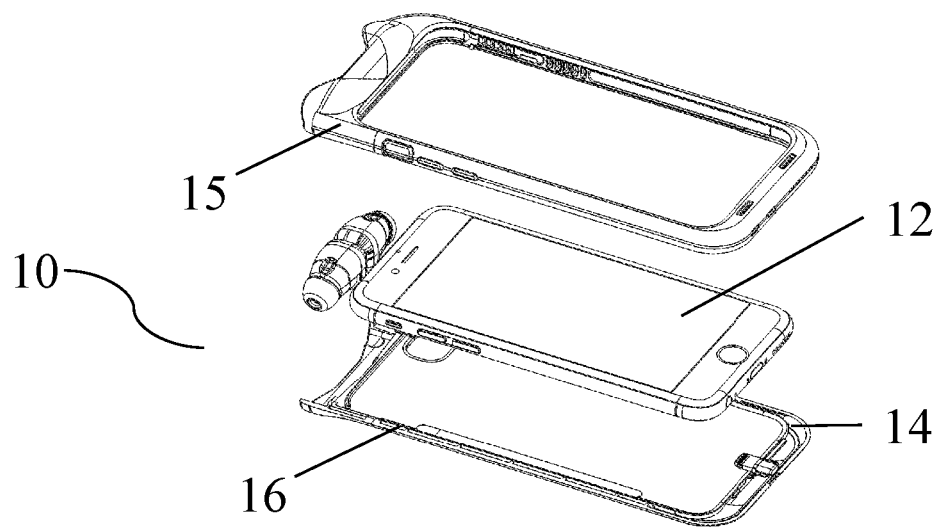
FIG. 15A shows one embodiment of a front panel of a case decoupled from a back panel of the case.
Figure 15B:
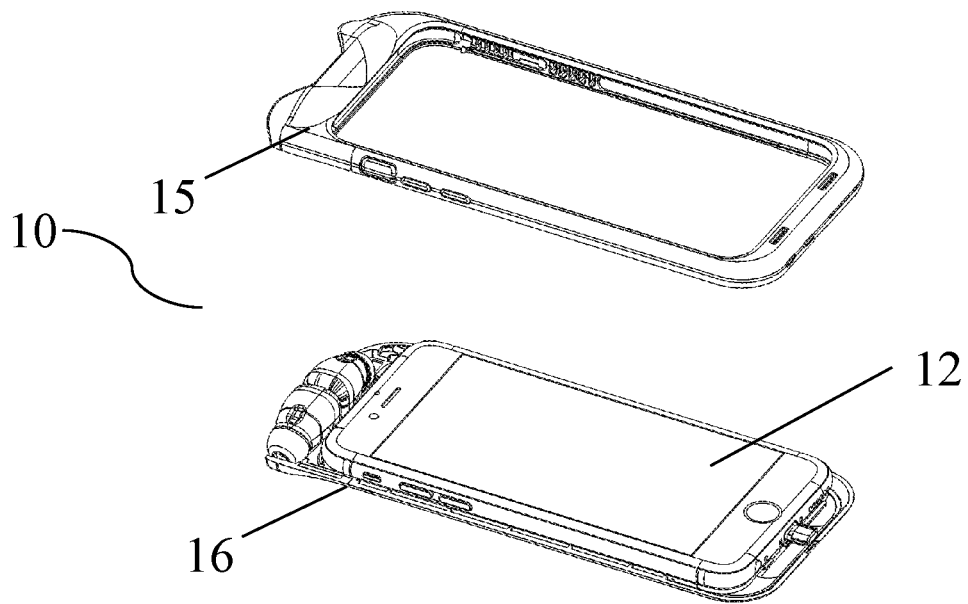
FIG. 15B shows one embodiment of a front panel of a case decoupled from a back panel of the case and the back panel of the case coupled to a mobile computing device.
Figure 15C:
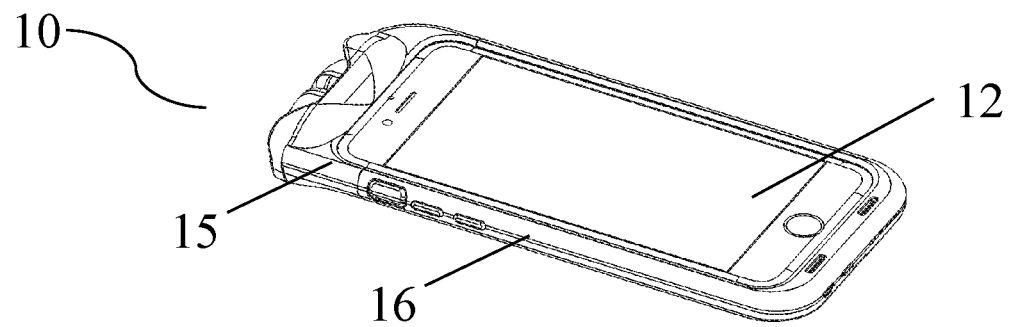
FIG. 15C shows one embodiment of a front panel of a case coupled to a back panel of the case, thus restraining the mobile computing device therein.

FIGS. 15A-15C show a front panel 15 and a back panel 16 of a case 10 transitionable between a decoupled state (FIGS. 15A-15B) and a coupled state (FIG. 15C). In the coupled state (FIG. 15C), the mobile computing device 12 is restrained in the case 10. As shown in FIG. 15A, a front panel 15 of the case 10 is decoupled or uncoupled from a back panel 16 of the case 10, such that the mobile computing device 12 is unrestrained. As shown in FIG. 15B, a plurality of sidewalls 14, coupled to a perimeter of the back panel 16, is sized and configured to receive a mobile computing device 12, as shown in FIG. 15B. The front panel 15 of the case 10 couples to the back panel 16 of the case 10 to fully restrain or secure the mobile computing device 12 in the case 10, as shown in FIG. 15C.

In some embodiments, a system for storing and charging one or more earbuds 64 includes one or more earbuds 64. The earbuds 64 may be wireless or wired to the case 10. FIGS. 2A-2F, FIGS. 3A-3D, and FIGS. 4A-4B show respective views of several embodiments of a wireless earbud 64 of the present system. The wireless earbud 64 includes a body 70, optionally a fin 68 (FIGS. 2A-2F, FIGS. 3A-3B with fin, FIGS. 3C-3D without fin), and optionally a tip portion 72 (FIGS. 2A-2F, FIGS. 3C-3D with tip portion, FIGS. 3A-3B without tip portion). In some embodiments, the fin 68 and/or tip portion 72 are interchangeable or customizable so that the size and shape of the fin 68 and/or tip portion 72 are tailored to the size and shape of the ear of the user, for example a smaller ear as shown in FIG. 4A or a larger ear as shown in FIG. 4B. The body 70 may further include a groove, indentation, or depression 84 for interfacing with a movable or stationary stop of the locking mechanism 48, as described elsewhere herein. The body 70 may include a microphone 82, rechargeable battery, receiver (e.g., wireless), transmitter (e.g., wireless), transceiver (e.g., wireless), and/or antenna 36. In some embodiments, the earbud 64 further includes a balanced armature receiver or speaker or a diaphragm-based speaker for audio sound production.

In some embodiments, the body 70 of the earbud 64 further includes a button 80 for controlling the flow or streaming of audio through the earbud 64, for example pausing, playing, forward skipping, and backward skipping, etc. In some embodiments, the button 80 may also function to initiate a phone call, receive an incoming phone call, disconnect an in-progress phone call, prompt the use of a virtual assistant associated with the mobile computing device 12, adjust the volume, etc.

The microphone 82 functions to receive sounds waves, for example from a user speaking into an earbud 64, and converts the sound waves into electrical energy (e.g., voltage, current, etc.) to be amplified and/or transmitted to another device, for example a case 10 or a mobile computing device 12.

Figure 17A:
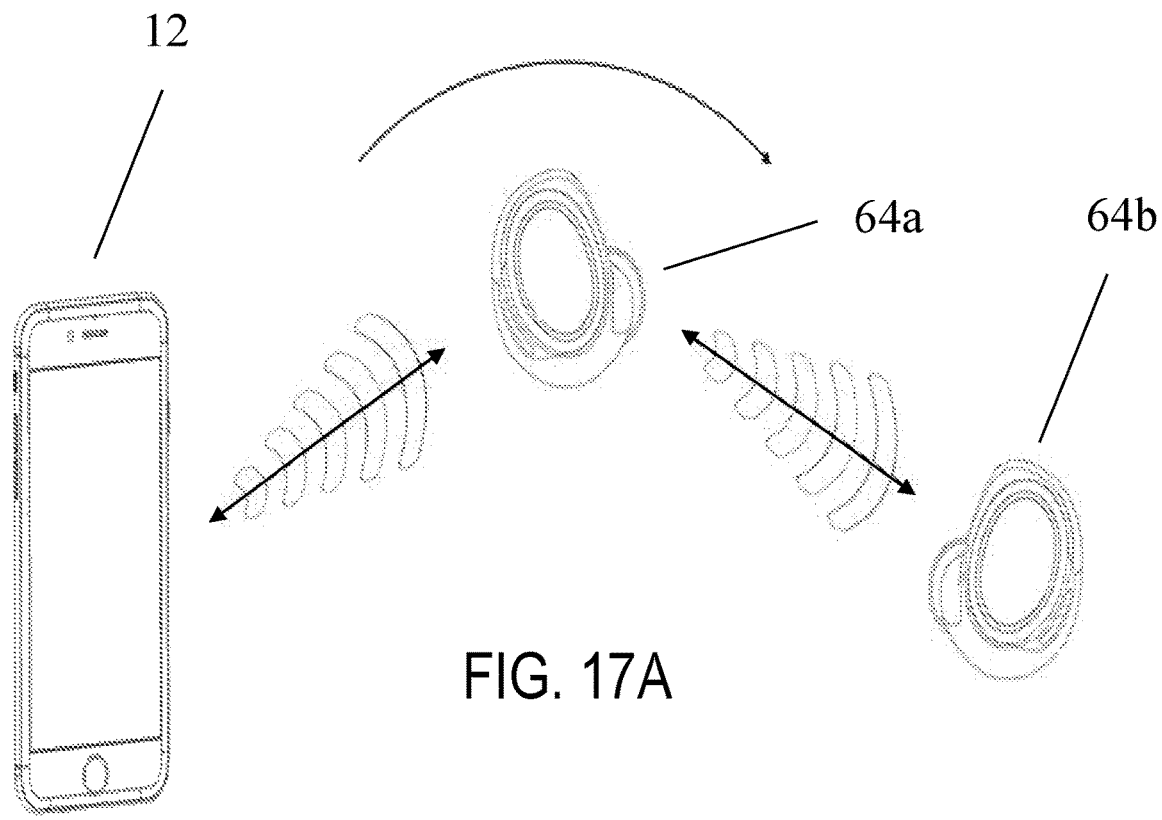
FIG. 17A shows a communication system between a mobile computing device (master) and wireless earbuds (slaves).
Figure 17B:
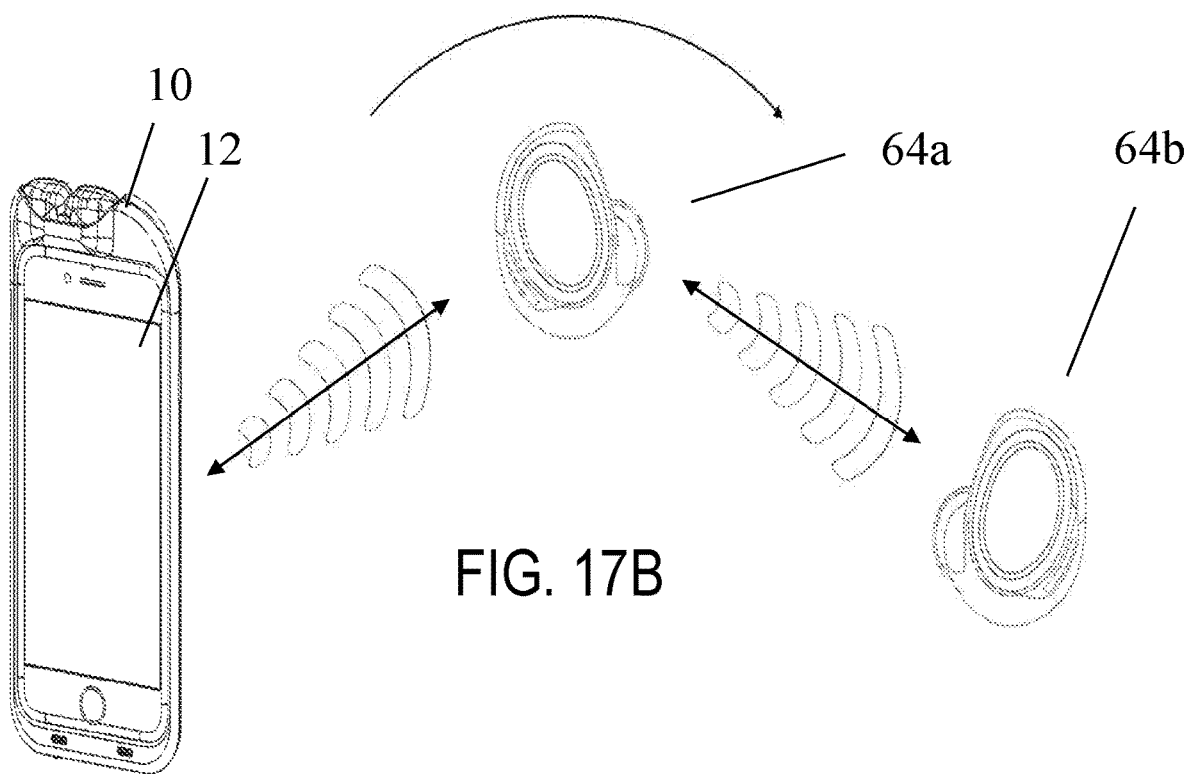
FIG. 17B shows a communication system between a case (master) and wireless earbuds (slaves).

The antenna 36 and receiver (or antenna and transceiver) are configured to receive or intercept and amplify, respectively, wireless signals comprising data (e.g., audio) transmitted from a mobile computing device 12 and/or a case 10. In some embodiments, these wireless signals may then be transmitted from the first wireless earbud 64a to a second wireless earbud 64b, for example as shown in FIGS. 17A-17B. Wireless communication between system components is described in further detail elsewhere herein.

In a wireless earbud 64, the rechargeable battery (e.g., coin cell, cylindrical lithium ion, prismatic cell, etc.) allows the wireless earbud 64 to be used physically disconnected from a case 10 or a mobile computing device 12. As described elsewhere herein, when the wireless earbud 64 is positioned in the case 10, the battery of the wireless earbud 64 may be recharged. Also described elsewhere herein, a wireless earbud 64 may further include a watch battery, button cell, or single cell battery to elongate earbud battery life or to provide a reserve source for earbud battery life, for example to allow a user to locate a wireless earbud 64 physically disconnected from a case 10 or a mobile computing device 12.

In some embodiments, a wireless earbud 64 may include one or more optical indicators (e.g., LED) to visually display a remaining battery life or power of the battery in the wireless earbud 64, for example so that a user knows when he should position the earbud 64 in the case 10 to recharge the earbud 64. Alternatively or additionally, a wireless earbud 64, or another system component in wireless communication with the earbud 64 (e.g., case, mobile computing device, computing device, etc.), may automatically detect a remaining battery life or power of the battery and audibly (e.g., beep, warning with words from speaker in earbud, etc.), visually (e.g., blink, turn-off, etc. optical indicator), or haptically (e.g., vibrate) notify the user (e.g., by sending data packets) that he/she should position the earbud 64 in the case 10 for charging or that he/she has, for example, another hour of battery life remaining.

Figure 3A:
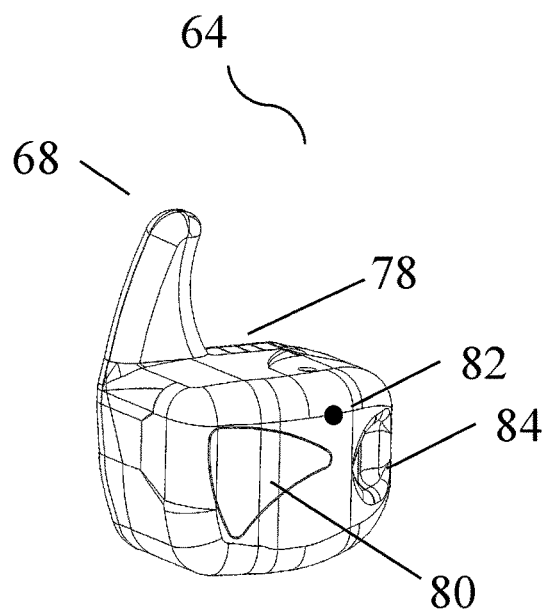
FIG. 3A shows a front view of one embodiment of a wireless earbud without a tip portion.
Figure 3B:
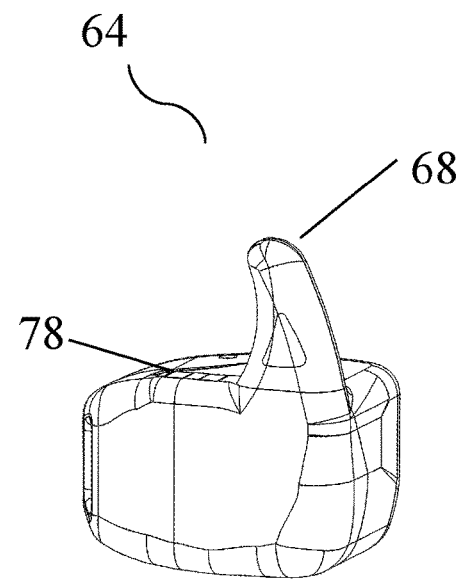
FIG. 3B shows a back view of one embodiment of a wireless earbud without a tip portion.
Figure 3C:
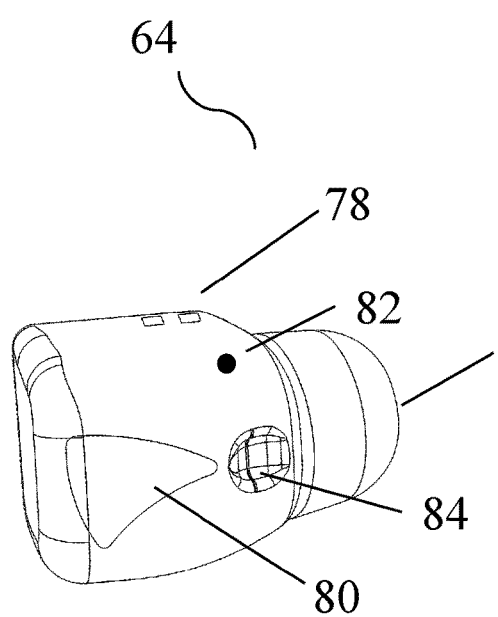
FIG. 3C shows a front view of one embodiment of a wireless earbud without a fin.
Figure 3D:
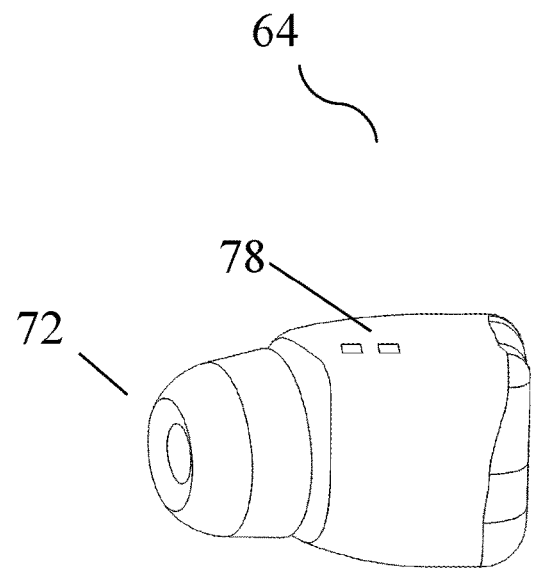
FIG. 3D shows a back view of one embodiment of a wireless earbud without a fin.
Figure 4B:
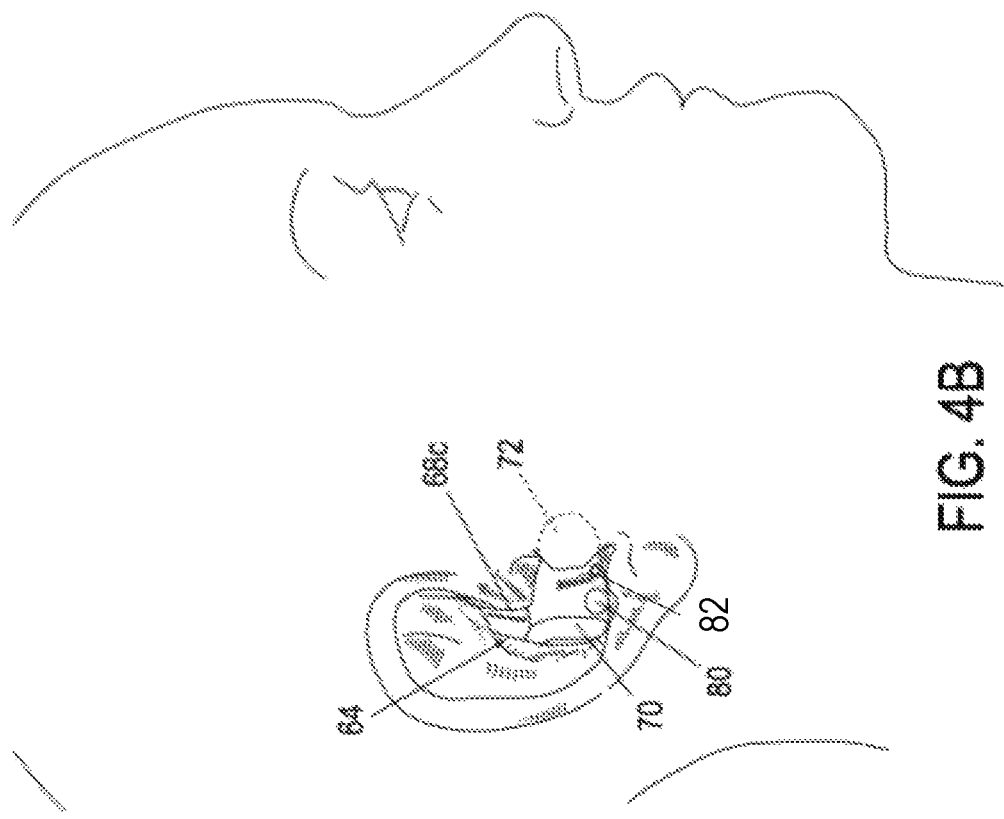
FIG. 4B shows one embodiment of a wireless earbud positioned in a user's ear.
Figure 4A:
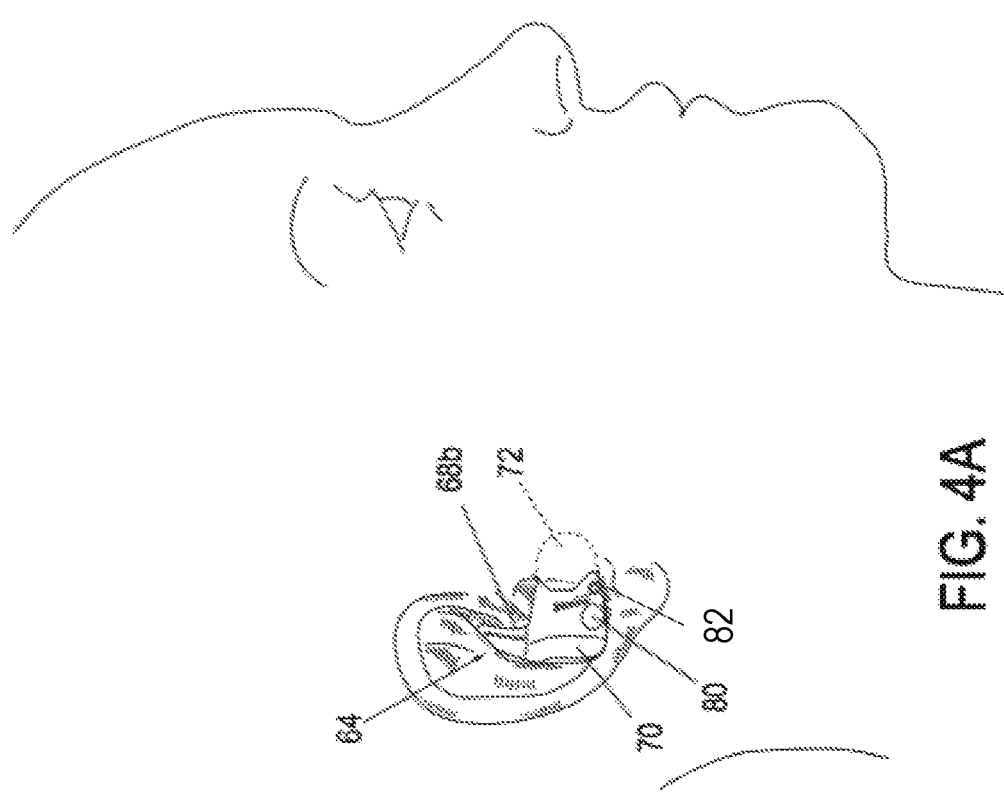
FIG. 4A shows one embodiment of a wireless earbud positioned in a user's ear.

As shown in FIGS. 2A-2F, and FIGS. 3A-B, a wireless earbud 64 may further include a fin 68. In some embodiments, the fin 68 is flexible to hook, secure, or fix the wireless earbud 64 in an ear of a user, as shown in FIGS. 4A-4B. Alternatively, in some embodiments, the fin 68 is rigid, functions as microphone, and/or is positioned proximate an ear lobe of the user. Further, the fin 68 functions to align the earbud 64 with one or more earbud charging contacts 76 in the earbud cavity 34 of the case 10, as described elsewhere herein. The fin 68 may include a flexible plastic, for example polyethylene terephthalate, high-density polyethylene, polyvinyl chloride, low-density polyethylene, polypropylene, polystyrene, or any other suitable flexible plastic known to one of skill in the relevant art. The fin 68 may vary in length, for example to fit an ear shape and/or size of the user. The fin 68 may appear truncated (fin 68*a* in FIGS. 2A-2B), transitional or of medium or intermediate length (fin 68*b* in FIGS. 2C-2D), elongate (fin 68*c* in FIGS. 2E-2F), or any size therebetween or larger or smaller to fit the size of ear of the user. In some embodiments, the earbud 64 does not include a fin 68, as shown in FIGS. 3C-3D.

As shown in FIGS. 2A-2F, and FIGS. 3C-3D, a wireless earbud 64 may further include a tip portion 72. The tip portion 72 of the body 70 opposite the end of the body 70 comprising the fin 68 fits against an outer opening of the ear canal, as shown in FIGS. 4A-4B. Tip portion 72 may appear small (tip portion 72*a* in FIGS. 2A-2B), intermediate (tip portion 72*b* in FIGS. 2C-2D), large (tip portion 72*c* in FIGS. 2E-2F), or any size therebetween or larger or smaller to fit the size of ear of the user. In some embodiments, the earbud 64 does not include a tip portion 72, as shown in FIGS. 3A-3B. In some embodiments, the fin 68 or tip portion 72 includes a microphone, rechargeable battery, receiver, transmitter, transceiver, and/or antenna 36, as described elsewhere herein. In one embodiment, when positioned in the earbud cavity 34 in the top portion 20 of the case 10, the tip portion 72 of the first earbud 64*a* is opposite and away from the tip portion 72 of the second earbud 64*b* and the fin 68 of the first earbud 64*a* is adjacent and in proximity to the fin 68 of the second earbud 64*b*, as shown in FIG. 13A. In some embodiments, at least a portion of the first and second wireless earbuds 64*a*/64*b* extends into the second housing 38 when the first and second wireless earbuds 64*a*/64*b* are positioned in the earbud cavity 34. In one such embodiment, a fin 68 of the wireless earbud 64 extends into the second housing 38.

In some embodiments, as shown in FIGS. 5A-5C, one or more wireless earbuds 64 may be removed from an earbud cavity 34 in the case 10 and positioned in an earbud charging or storage device 83 or removed from an earbud charging or storage device 83 and positioned and/or charged in the case 10. The earbud charging or storage device 83 functions to charge or simply store one or more wireless earbuds 64 when the one or more wireless earbuds 64 are not positioned in the case 10 and/or when a second top portion is being used, as described elsewhere herein. The earbud charging or storage device 83 may include or be formed of a housing 85. The housing 85 may be formed of one monolithic shell or two or more sections that are reversibly coupled or irreversibly fastened. For example, as shown in FIGS. 5B-5C, the housing 85 may include a first section 87 and a second section 89. The first 87 and second 89 sections may be coupled via a snap fit connection, a screw-thread connection, via one or more retractable protrusions, or via any other mechanism known in the art. The housing 85 may include an earbud cavity 97, similar to the earbud cavity 34 in a case 10, as described elsewhere herein. One or more wireless earbuds 64 positioned in the housing 85 may be charged by a battery 93 disposed in the earbud charging or storage device 83, similar to any embodiment of battery described elsewhere herein. In other embodiments, the earbud charging device 83 functions only as a storage device (i.e., does not include a battery) without any charging capacity; in some such embodiments, one or more wireless earbuds 64 positioned in the earbud charging or storage device 83 may be charged directly from an external power source, for example via a lightning cable or USB connecting the earbud charging or storage device 83 to a wall outlet. Alternatively or additionally, the earbud charging or storage device 83 may be connected to an external power source via port 91. Port 91, when connected to an external power source (e.g., via USB, lightning, etc.), may function to charge directly one or more wireless earbuds 64 disposed in the earbud charging or storage device 83 independently of a battery 93 or may charge indirectly one or more wireless earbuds 64 disposed in the earbud charging or storage device 83 by charging a battery 93 disposed in the earbud charging or storage device 83. The earbud charging or storage device 83 may further include one or more optical indicators 95 (e.g., LED, OLED) on an external surface of the housing 85. Such optical indicators 95 may indicate a charge of a battery 93 and/or one or more wireless earbuds 64 positioned in the earbud charging or storage device 83.

Figure 16A:
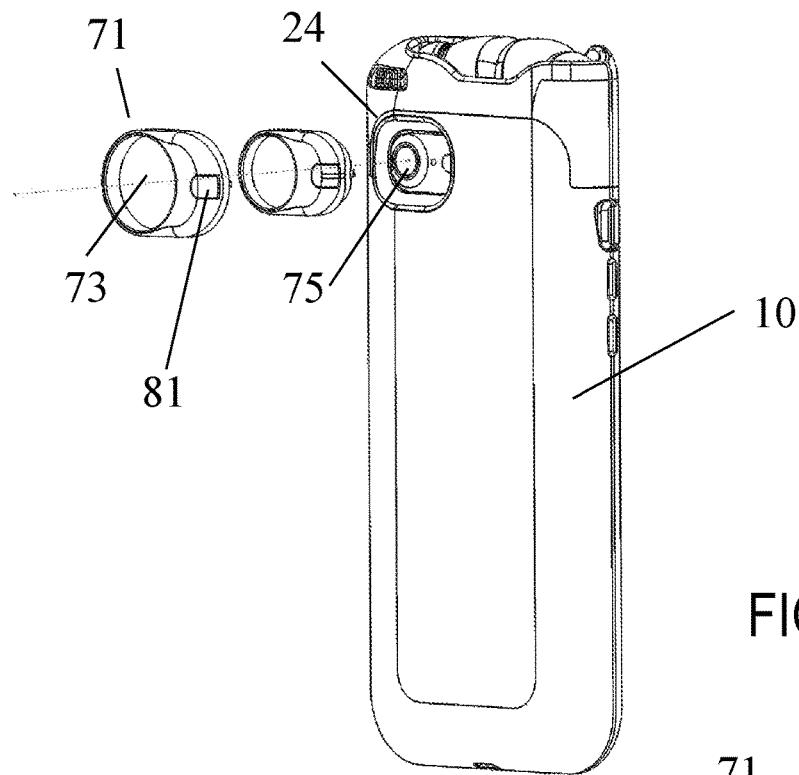
FIG. 16A shows a perspective view of one embodiment of a lens coupleable to a case.
Figure 16B:
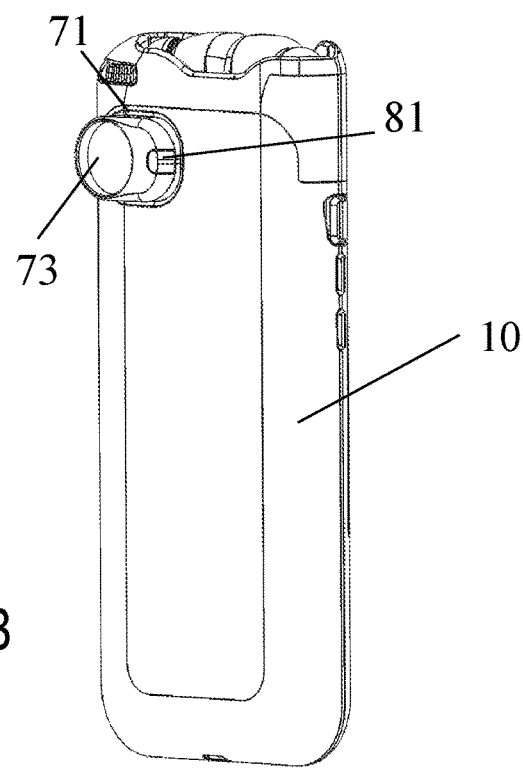
FIG. 16B shows a perspective view of one embodiment of a lens coupled to a case.
Figure 16C:
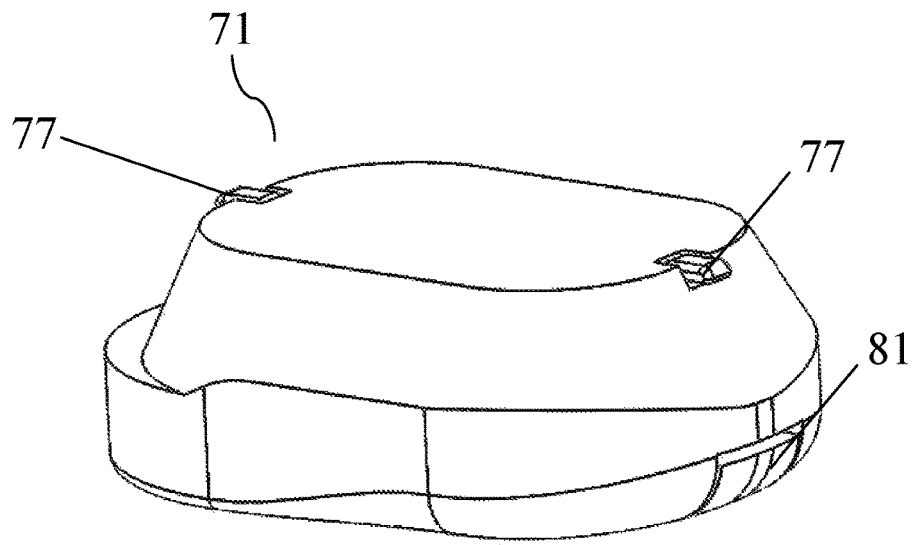
FIG. 16C shows a side perspective view of one embodiment of a lens.
Figure 16D:
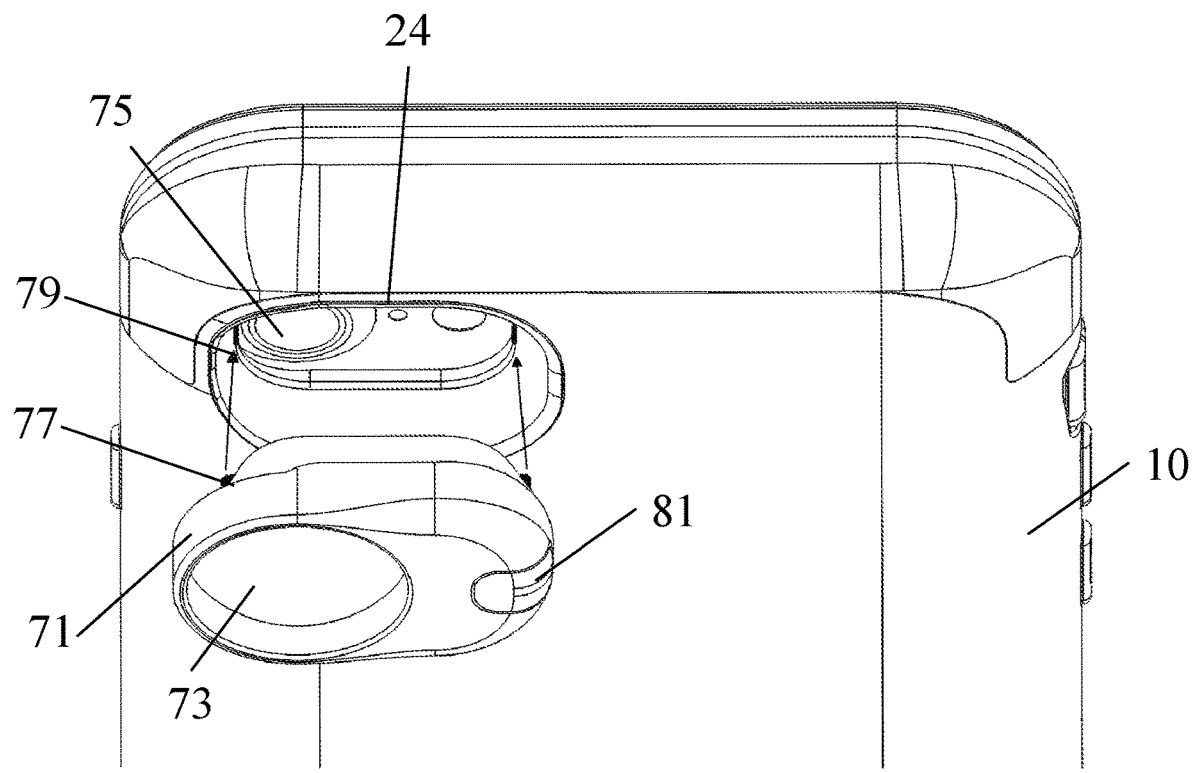
FIG. 16D shows a top perspective view of one embodiment of a lens coupleable to a case.

In some embodiments, as shown in FIGS. 16A-16D, a system for storing and charging one or more earbuds 64 includes a camera adapter 71. The camera adapter 71 functions to adjust an angle, curvature, aperture, perspective, zoom, etc. of the camera in a mobile computing device 12 disposed in the case 10, such that a variety of images may be captured by a user using the camera and the camera adapter 71. The camera adapter 71 may include a lens 73. Non-limiting examples of lenses 73 include: a standard lens, a macro lens, a wide angle lens, an ultra-wide angle lens, a fish-eye lens, a prime lens, a telephoto lens, a tilt lens, a shift lens, a soft-focus lens, an infrared lens, a zoom lens (e.g., zoom in lens, zoom out lens), any other type of lens, or any other type of lens with varying aperture size or speed. One of skill in the art will appreciate that any type of camera adapter 71 may be used with any of the embodiments described elsewhere herein, for example any of the embodiments described in FIGS. 6D-6F. The camera adapter may be transitionable between a coupled state and a decoupled state. In the coupled state, as shown in FIG. 16B, the camera adapter 71 is coupled to the case 10 over a camera aperture 24 of the case 10. In a decoupled state, as shown in FIG. 16A, the camera adapter 71 is unattached or decoupled from a camera aperture 24 of the case 10. The camera adapter 71 may include one or more manipulatable protrusions 77 that function to reversibly secure the camera adapter 71 to the camera aperture 24 and the camera aperture 24 may include one or more depressions or grooves 79 that function to matingly receive the one or more manipulatable protrusions 77. Alternatively, one or more manipulatable protrusions 77 may be on the case 10 and one or more depressions or grooves 79 may be on the camera adapter 24. The camera adapter 24 or case 10 may further include a release 81 that functions to retract the one or more manipulatable protrusions 77 to secure the camera adapter 71 to the camera aperture 24 and to release or remove the camera adapter 71 from the camera aperture 24. The release 81 may include a user input element. Non-limiting examples of user input elements include: a button, a switch, a toggle switch, a slider, or any other type of user input element. Alternatively, the camera adapter 71 may be reversibly secured to the camera aperture 24 by any suitable means, for example a snap-fit connection, screw-thread mechanism, or any other mechanism known in the art. In some embodiments, the camera adapter 71 is irreversibly secured to the camera aperture 24, such that the case 10 is sold, marketed, packaged, sent, or otherwise transferred to a distributor, manufacturer, end user, supplier, store, etc. with the camera adapter 71 fastened to the case 10.

Figure 18A:
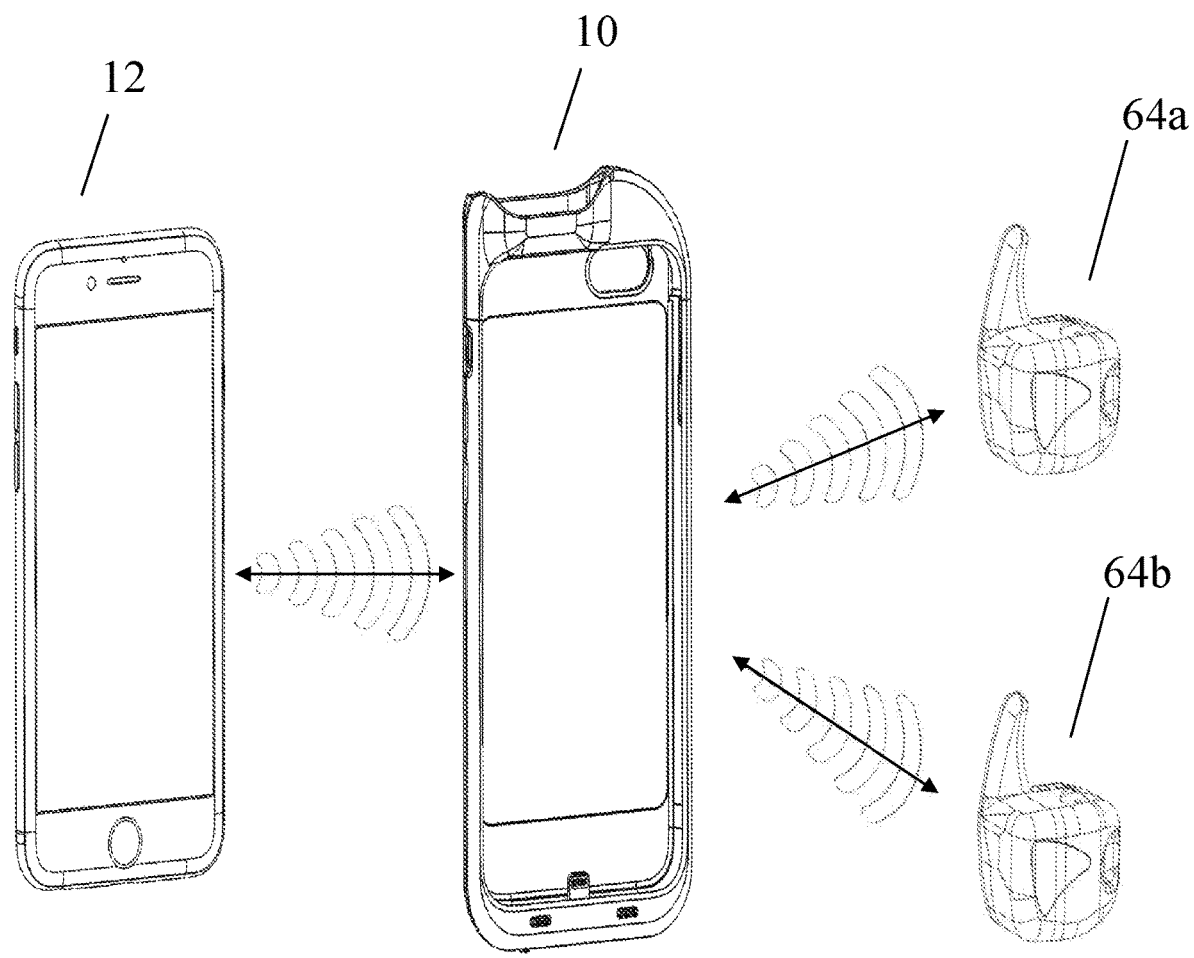
FIG. 18A shows one embodiment of a communication system between a mobile computing device, a case, and wireless earbuds.
Figure 18B:
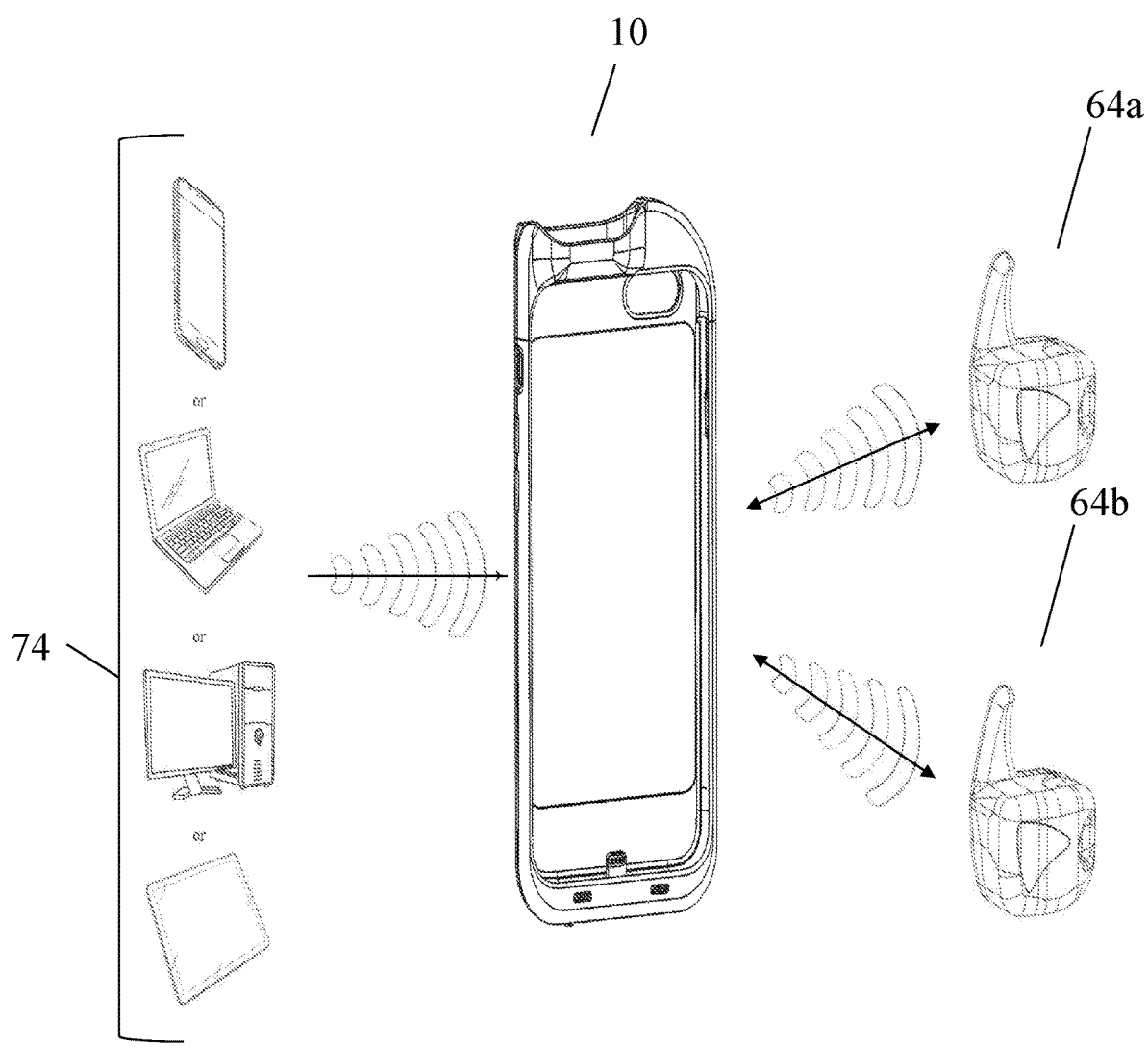
FIG. 18B shows one embodiment of a communication system between a computing device, a case, and wireless earbuds.
Figure 19A:
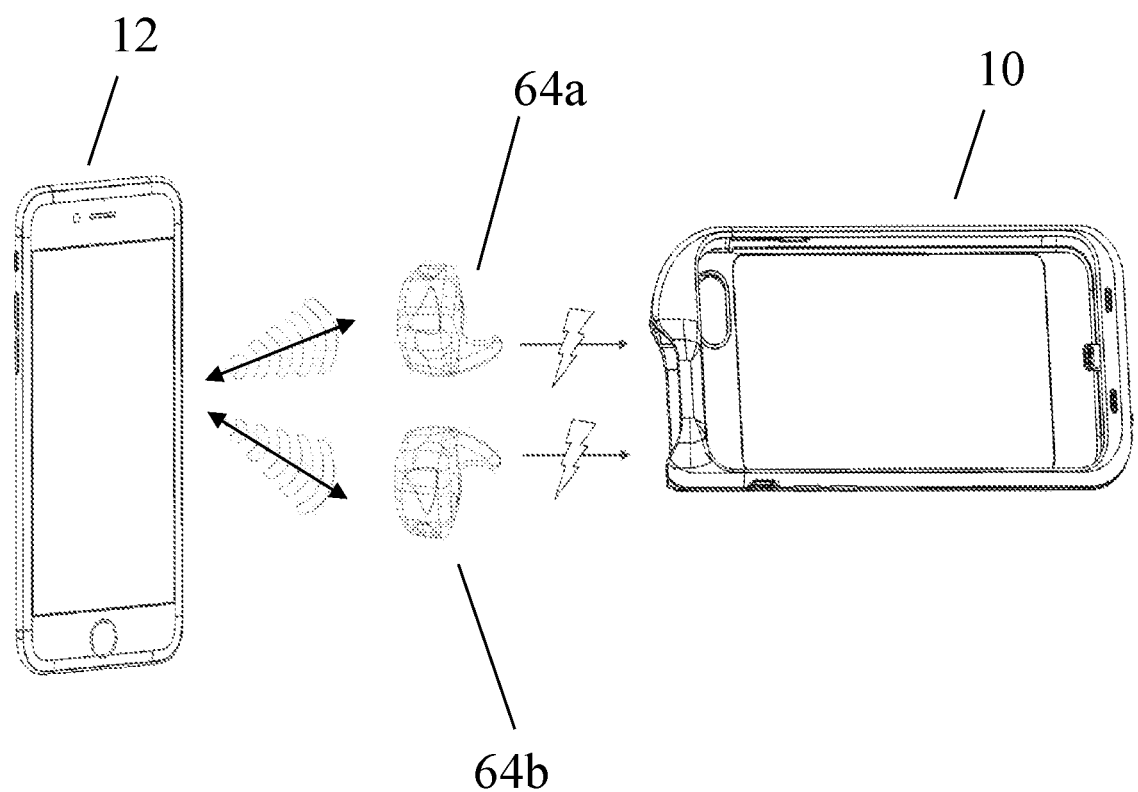
FIG. 19A shows one embodiment of a communication system between a mobile computing device and wireless earbuds and a charging system between a case and wireless earbuds.
Figure 19B:
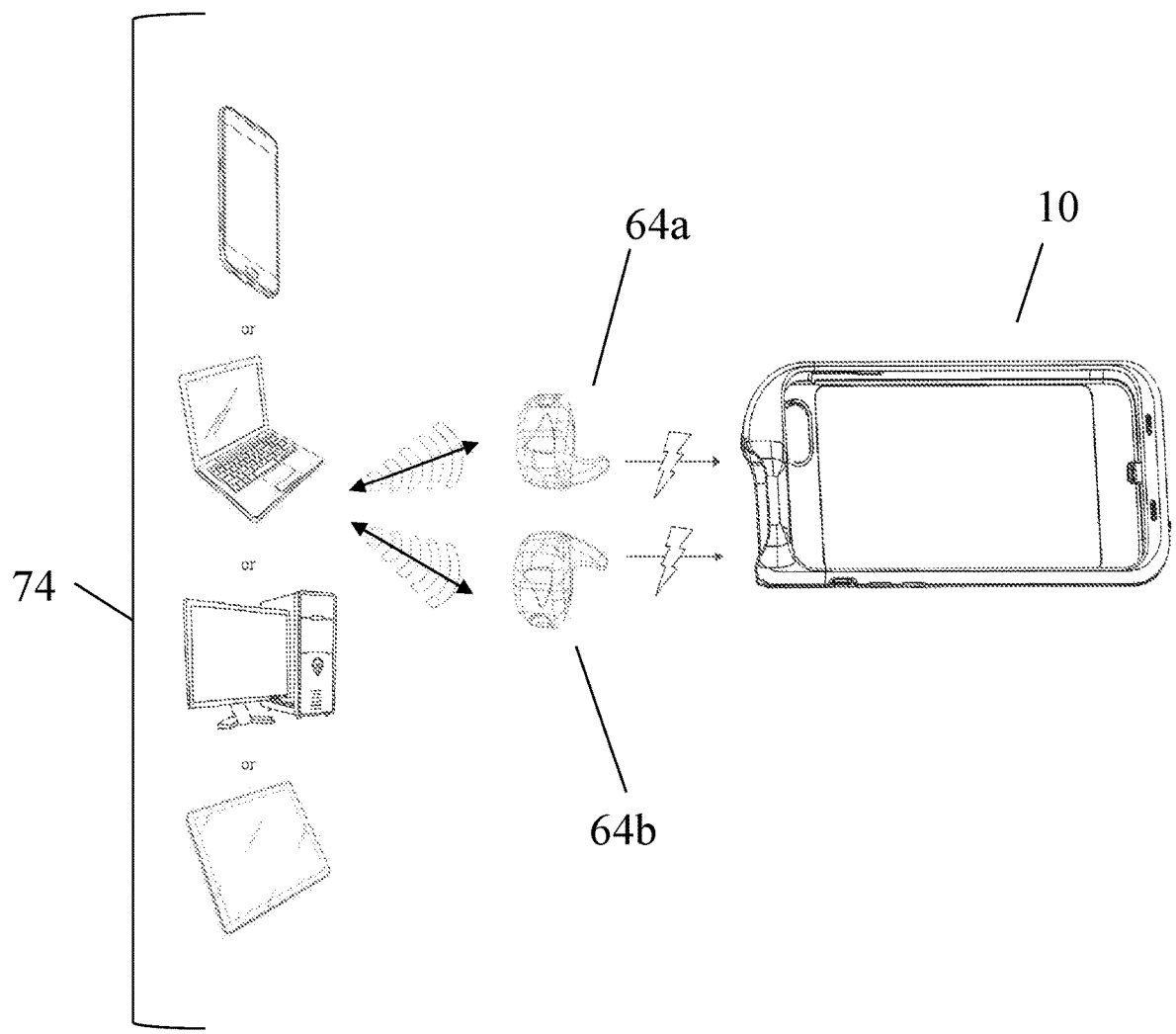
FIG. 19B shows one embodiment of a communication system between a computing device and wireless earbuds and a charging system between a case and wireless earbuds.

In some embodiments, two or more system components may communicate wirelessly or transfer data wirelessly, as shown in FIG. 17B, FIGS. 18A-18B, and FIGS. 19A-19B. As shown in FIG. 17B and FIGS. 18A-18B, the case 10 may include a receiver configured for receiving a wireless data transfer (also referred to as monophonic signal herein) from a computing device 74 (FIG. 18B) or a mobile computing device 12 (FIG. 17B or FIG. 18A) and a transmitter configured for transmitting the wireless data directly to at least the first wireless earbud 64a. The wireless data transmission from a mobile computing device 12 or computing device 74 to the case 10 may occur via Bluetooth, low-energy Bluetooth, or any other RF technology. An antenna 36 of the case 10 may intercept the wireless data transmission and the receiver may amplify and modulate the wireless data. In some embodiments, as shown in FIG. 17B, the transmitter of the case 10 may transmit the wireless data (for example using a monophonic signal) to a first wireless earbud 64a (i.e., the master), which then receives and transmits the wireless data to a second wireless earbud 64b (i.e., slave).

In some embodiments, as shown in FIG. 18A, the transmitter of the case 10 may transmit wireless data directly to the first and second earbuds 64a/64b that includes information for both the first and second earbuds 64a/64b. For example, the first and second earbuds 64a/64b may both receive and interpret the wireless data transmission directly from the case 10 but may only select the information or channel needed by or pertaining to the respective first or second earbud 64a/64b.

In some embodiments, as shown in FIGS. 17A-17B, the transmitter of the case 10 may transmit a plurality of wireless data transfers (also referred to as stereophonic signal herein) directly to each wireless earbud 64. For example, in one embodiment, the transmitter of the case 10 may use frequency hopping spread-spectrum (i.e., scanning through a predetermined or random set of frequencies for wireless data delivery where the predetermined or random frequencies are known to both the transmitter in the case 10 and the receiver in each wireless earbud) to send the data directly to the first wireless earbud 64a and the second wireless earbud 64b.

In one embodiment, the transmitter of the case 10 may use direct-sequence spread spectrum (i.e., using a wireless bandwidth for data transmission that is in excess of what is actually needed) to send the data directly to the first wireless earbud 64a and the second wireless earbud 64b. In one embodiment, the first wireless earbud 64a receives the wireless data transmission at a first frequency and the second wireless earbud 64b receives the wireless data transmission at a second frequency, the first frequency being different from the second frequency.

In one embodiment, the transmitter of the case 10 may use quadrature amplitude modulation (i.e., the amplitude of at least two waves of the same frequency, out-of-phase with each other are changed to represent the data signal) to send the data directly to the first wireless earbud 64a and the second wireless earbud 64b. In one embodiment, the first wireless earbud 64a receives the plurality of wireless data transfers at a first frequency, the first frequency comprising a first wave comprising a first amplitude: the second wireless earbud 64b receives the plurality of wireless data transfers at a second frequency, the second frequency comprising a second wave comprising a second amplitude. In some such embodiments, the first frequency and the second frequency are the same.

In one embodiment, as shown in FIGS. 18A-18B, the transmitter of a mobile device 12 or computing device 74 transmits a plurality of wireless data transfers or stereophonic signals directly to the first wireless earbud 64a and the second wireless earbud 64b using, for example frequency hopping spread spectrum, direct-sequence spread spectrum, quadrature amplitude modulation or any other wireless technology or protocol known to one of skill in the relevant art, and the case 10 functions to charge the rechargeable battery in the first 64a and/or second wireless earbuds 64b when positioned in the case 10, as shown in FIGS. 18A-18B.

Further, in some embodiments, as shown in FIGS. 17A-17B, 18A-18B, and, 19A-19B by the bidirectional arrows, the first earbud 64a and/or second earbud 64b may send or transmit data back to the case 10, computing device 74, or mobile computing device 12. In one embodiment, the second earbud 64b may send or transmit data back to the first earbud 64a.

Methods

Figure 20:
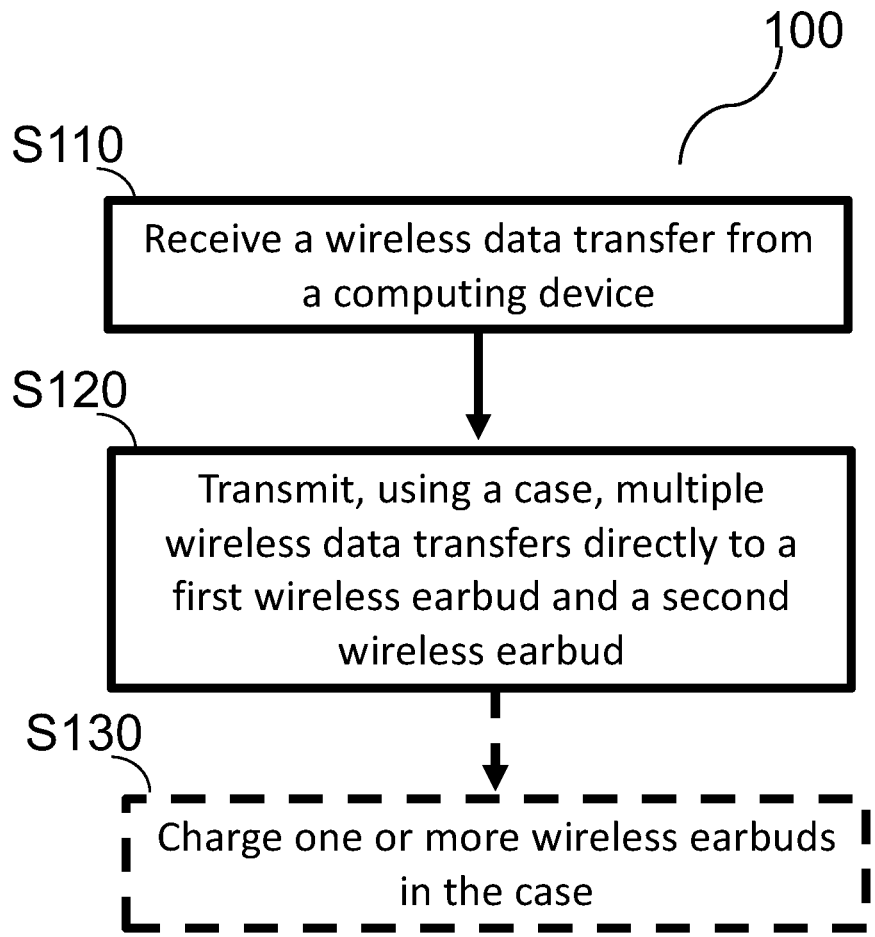
FIG. 20 shows a flow chart of one embodiment of a method of wireless communication between a computing device, a case, and wireless earbuds.

As shown in FIG. 20, a method 100 of wireless communication between system components includes receiving a wireless data transfer from a computing device S110; transmitting, using a case, a plurality of wireless data transfers directly to a first wireless earbud and a second wireless earbud S120; and, optionally, charging one or more wireless earbuds in the case S130. The method functions to transfer or transmit data (e.g., audio) between system components (e.g., linearly or bidirectionally), for example to allow a user to listen to audio in one or more wireless earbuds. The method is used in the field of the Internet of Things or entertainment, but can additionally or alternatively be used for any suitable applications, clinical, educational, musical, industrial, or otherwise.

In some embodiments, the case includes one transceiver (or transmitter) and antenna for transmitting the plurality of wireless data transfers to the first and second wireless earbuds. In some embodiments, the case includes a first transceiver (or first transmitter) and a first antenna dedicated to a first earbud and a second transceiver (or second transmitter) and a second antenna dedicated to a second earbud. In some embodiments, the case includes one antenna and transceiver (or receiver) for communicatively coupling to a mobile computing device or computing device (e.g., for monophonic data transmission) and a second antenna and transceiver (transmitter) for communicatively coupling to one or more earbuds (e.g., for stereophonic data transmission).

As shown in FIG. 20, one embodiment of a method 100 of wireless communication between system components includes block S110: receiving a wireless data transfer from a computing device. Block S110 functions to acquire data from a computing device using an antenna, receiver, or transceiver disposed in a case. The data may be transmitted using a monophonic signal or a wireless data transfer from a computing device to a case, as described elsewhere herein.

As shown in FIG. 20, one embodiment of a method 100 of wireless communication between system components includes block S120: transmitting, using a case, a plurality of wireless data transfers directly to a first wireless earbud and a second wireless earbud. Block S120 functions to avoid transmitted signal latency (e.g., discontinuity in audio versus visual representation of audio) and/or poor signal reception (e.g., signal dropping, audio cutting in and out) by transmitting the data directly to each wireless earbud using for example, frequency hopping spread spectrum, direct-sequence spread spectrum, quadrature amplitude modulation, or any other wireless technology or protocol known to one of skill in the relevant art. In some embodiments, the first wireless earbud receives the plurality of wireless data transfers at a first frequency and the second wireless earbud receives the plurality of wireless data transfers at a second frequency. In one embodiment, the first frequency is different than the second frequency. In one embodiment, the first and second frequencies are transmitted simultaneously to the first and second wireless earbuds, respectively. In one embodiment, the first and second frequencies are transmitted asynchronously to the first and second wireless earbuds, respectively. In one variation, the first and second frequencies vary over time. In another variation, the first and second frequencies are static over time. In some embodiments, the frequency of the data transfer received by the first and second wireless earbuds is the same but the amplitude of the wave received by the first and second wireless earbuds is different.

In some variations, as shown in FIG. 20, the method 100 optionally includes charging one or more wireless earbuds in the case. In some embodiments, methods 100 includes turning off a wireless signal emanating from the case when one or more wireless earbuds are positioned in the case or coupled to the case.

In some variations, the method 100 includes: providing a case and at least two wireless earbuds. The case is configured to receive the wireless data transfer from a computing device and the at least two wireless earbuds are configured to receive a plurality of wireless data transfers directly from the case.

In some variations, the method 100 includes: transmitting, using one or more wireless earbuds, a wireless data transfer or a plurality of wireless data transfers back to the case and/or computing device (e.g., mobile computing device). For example, the one or more earbuds may transmit microphone data or readings back to the case and/or computing device. As described herein, in some embodiments, method 100 functions to transfer data bidirectionally between system components.

Figure 21:
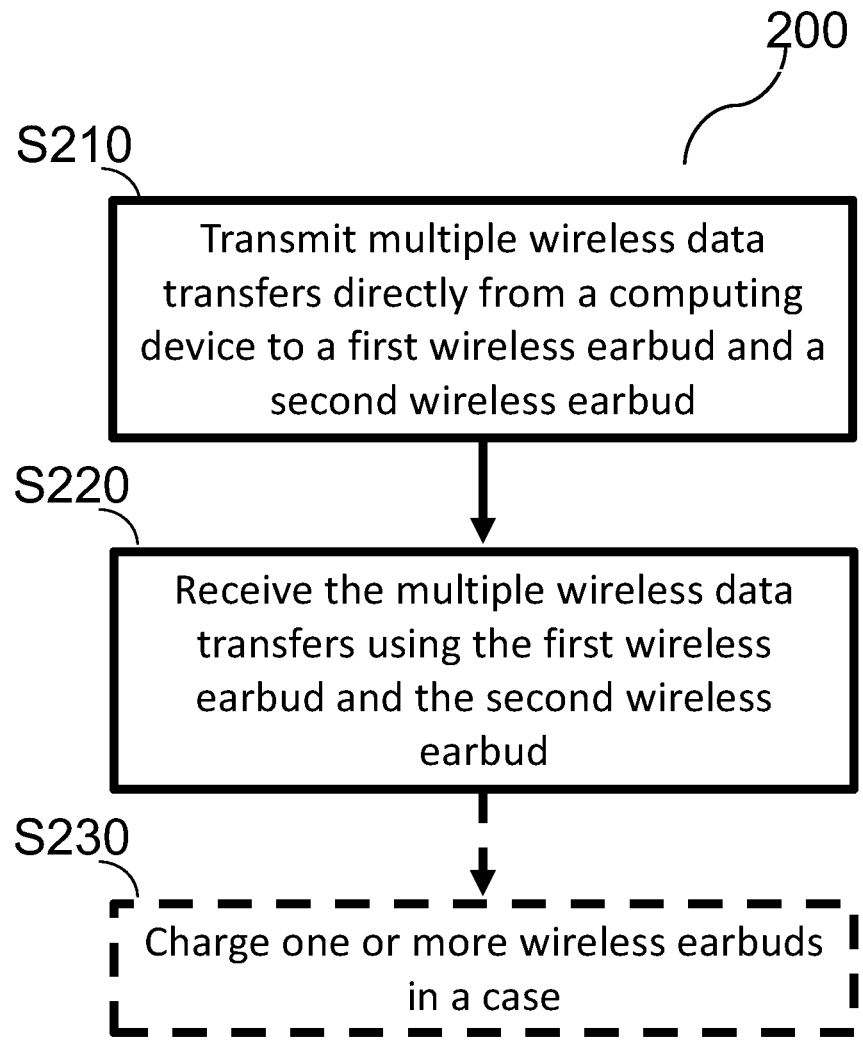
FIG. 21 shows a flow chart of one embodiment of a method of wireless communication between a computing device and wireless earbuds.

As shown in FIG. 21, a method 200 of wireless communication between system components includes transmitting a plurality of wireless data transfers directly from a computing device to a first wireless earbud and a second wireless earbud S210; receiving the plurality of wireless data transfers using the first wireless earbud and the second wireless earbud S220; and, optionally, charging one or more wireless earbuds in a case S230. The method functions to transfer or transmit data (e.g., audio) between system components, for example to allow a user to listen to audio in one or more wireless earbuds. The method is used in the field of the Internet of Things or entertainment, but can additionally or alternatively be used for any suitable applications, clinical, educational, musical, industrial, or otherwise.

As shown in FIG. 21, one embodiment of a method 200 of wireless communication between system components includes block S210: transmitting a plurality of wireless data transfers directly from a computing device to a first wireless earbud and a second wireless earbud. The data may be transmitted using a stereophonic signal or a plurality of wireless data transfers directly from a computing device to two or more wireless earbuds, as described elsewhere herein. Block S220 functions to avoid transmitted signal latency (e.g., discontinuity in audio versus visual representation of audio) and/or poor signal reception (e.g., signal dropping, audio cutting in and out) by transmitting the data directly to each wireless earbud using for example, frequency hopping spread spectrum, direct-sequence spread spectrum, quadrature amplitude modulation, or any other wireless technology or protocol known to one of skill in the relevant art. In some embodiments, the computing device includes one transceiver (or transmitter) and antenna for transmitting the plurality of wireless data transfers to the first and second wireless earbuds. In some embodiments, the computing device includes a first transceiver (or first transmitter) and a first antenna for transmitting to a first earbud and a second transceiver (or second transmitter) and a second antenna for transmitting to a second earbud.

In some embodiments, the first wireless earbud receives the plurality of wireless data transfers at a first frequency and the second wireless earbud receives the plurality of wireless data transfers at a second frequency. In one embodiment, the first frequency is different than the second frequency. In one embodiment, the first and second frequencies are transmitted simultaneously to the first and second wireless earbuds, respectively. In one embodiment, the first and second frequencies are transmitted asynchronously to the first and second wireless earbuds, respectively. In one variation, the first and second frequencies vary over time. In another variation, the first and second frequencies are static over time. In some embodiments, the frequency of the data transfer received by the first and second wireless earbuds is the same but the amplitude of the wave received by the first and second wireless earbuds is different.

As shown in FIG. 21, one embodiment of a method 200 of wireless communication between system components includes block S220: receiving the plurality of wireless data transfers using the first wireless earbud and the second wireless earbud. Block S220 functions to acquire data wirelessly from a computing device using an antenna, receiver, or transceiver disposed in a wireless earbud.

In some variations, as shown in FIG. 21, the method 200 optionally includes charging one or more wireless earbuds in the case. In some embodiments, methods 200 includes turning off a wireless signal emanating from the computing device when one or more wireless earbuds are positioned in the case or coupled to the case. For example, when the one or more wireless earbuds are positioned in or coupled to the case, the earbuds may sense that they are being charged and may transmit a signal to the computing device to deactivate a wireless signal emanating from the computing device.

In some embodiments, the method 200 includes: providing a mobile computing device configured to transmit a plurality of wireless data transfers directly to two or more wireless earbuds. Alternatively or additionally, the method 200 includes: providing a case and at least two wireless earbuds.

Figure 22:
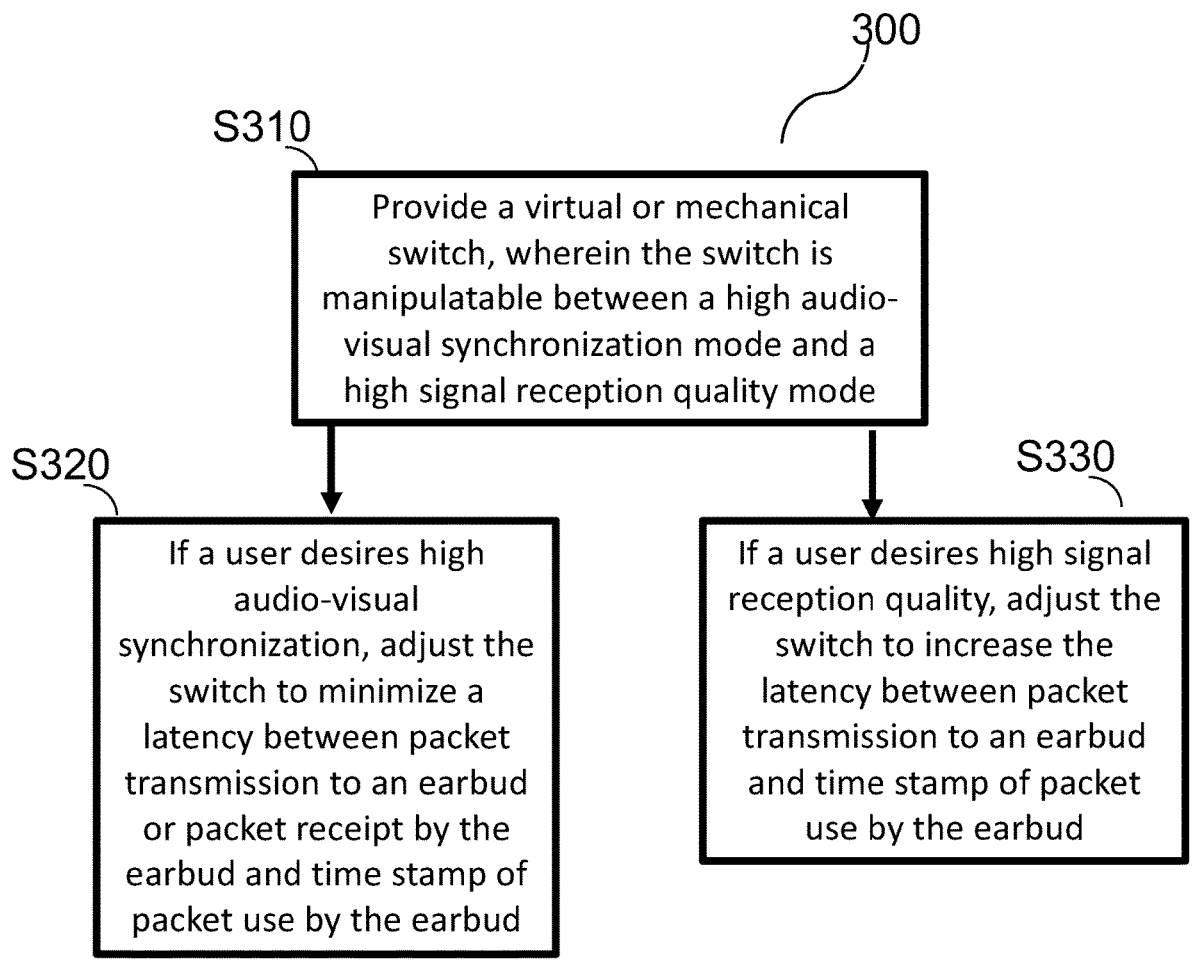
FIG. 22 shows a flow chart of one embodiment of a method for manipulation of data transfer modes.

As shown in FIG. 22, a method 300 for manipulation of data transfer modes includes providing a virtual or mechanical switch, wherein the switch is manipulatable between a high audio-visual synchronization mode and a high signal (e.g., data, information, audio, etc.) reception quality mode S310; if a user desires high audio-visual synchronization, adjusting the switch to minimize a latency between packet transmission to an earbud or packet receipt by the earbud and time stamp of packet use (e.g., play audio) by the earbud S320; and if a user desires high signal reception quality, adjusting the switch to increase the latency between packet transmission to an earbud and time stamp of packet use by the earbud S330. The method functions to enable a user to manipulate or control the balance between reduced dropouts (i.e., high signal reception quality) and reduced latency (i.e., high audio-visual synchronization), as described elsewhere herein. In some embodiments of method 300, there may be a plurality of intermediate modes or settings in between high audio-visual synchronization on a first end of the spectrum and high signal reception quality on a second end of the spectrum.

As shown in FIG. 22, one embodiment of a method 300 for manipulation of data transfer modes includes block S310: providing a virtual or mechanical switch, wherein the switch is manipulatable between a high audio-visual synchronization mode and a high signal (e.g., data, information, audio, etc.) reception quality mode. Block S310 functions to provide a means for a user to tailor his audio or audio-visual experience. A virtual switch may be provided to a user through a graphical user interface (GUI) in an application on a computing device (e.g., mobile computing device). The virtual switch may include: a button, slider, toggle button, toggle switch, switch, dropdown menu, combo box, text input field, check box, radio button, picker control, segmented control, stepper, and/or any other type of control. In some embodiments, the user may use different tactile or haptic lengths or pressures to navigate on the GUI and/or in the application. For example, a user may use a short press, long press, light press, or forceful press to indicate a mode preference. A mechanical switch may be provided to a user on a computing device or a case associated with the computing device. The mechanical switch may include: a button, joystick, slider, toggle switch, switch, or any other type of control. In some embodiments, a user's preferences are preconfigured in an application on the computing device, such that the computing device or an application on the computing device switches to a user's preferred mode upon sensing a user watching a video (e.g., high audio-visual synchronization mode) or only streaming audio (e.g., high signal reception quality mode).

As shown in FIG. 22, one embodiment of a method 300 for manipulation of data transfer modes includes block S320: if a user desires high audio-visual synchronization, adjusting the switch to minimize a latency between packet transmission to an earbud or packet receipt by the earbud and time stamp of packet use by the earbud. Block S320 functions to decrease a perceived lag or latency between a visual event on a display of a computing device (e.g., lips forming words, explosion, car being turned on, etc.) and an audio event heard by a user in relation to the visual event (e.g., words being spoken, a sound of the explosion, sound of a car engine starting, etc.). As described elsewhere herein, if a packet (e.g., data, audio, etc.) is transmitted to an earbud or if an earbud receives a packet of information (e.g., data, audio, etc.) and a long time elapses before the time stamp occurs or passes (i.e., latency), the user may perceive a disconnect or lag between a visual event on the display and an audio event heard in relation to the visual event. Allowing a user to tune or adjust the latency period to minimize or elongate this latency period enables the user to achieve her desired audio-visual experience. In some embodiments, adjusting the switch occurs automatically, for example, upon the earbud, computing device, case, or other device sensing that the user is viewing a video, movie, or other combination of audio and visual, and automatically moving, adjusting, or manipulating the switch to achieve higher audio-visual synchronization. In some embodiments, adjusting the switch occurs manually, for example by a user, manufacturer, designer, etc. of the method.

In some embodiments, if the user is viewing a movie, video, or other audio-visual event indoors or in a semi or fully enclosed space, the user may not experience any dropouts due to the shortened latency between packet receipt and use (e.g., audio/video play). However, in some embodiments, if the user is viewing a movie, video, or other audio-visual event outdoors or in a semi or fully open environment, the user may experience one or more dropouts due to the shortened latency between packet transmission to the earbud or packet receipt by the earbud and packet use by the earbud.

As shown in FIG. 22, one embodiment of a method 300 for manipulation of data transfer modes includes block S330: if a user desires high signal reception quality, adjusting the switch to increase the latency between packet transmission to an earbud and time stamp of packet use by the earbud. Block S330 functions to decrease poor signal reception or dropouts during audio streaming (e.g., music, podcast, etc.). As described elsewhere herein, if a packet (e.g., data, audio, etc.) is transmitted (e.g., by a mobile computing device, computing device, case, etc.) to an earbud and not enough time elapses before the time stamp occurs (i.e., time stamp passes without the earbud receiving the packet of information), the user may experience poor signal reception (i.e., one or more dropouts) in the audio. Allowing a user to tune or adjust the latency period to minimize the number of dropouts the user experiences enables the user to achieve his or her desired audio experience. In some embodiments, adjusting the switch occurs automatically, for example, upon the earbud, computing device, case, or other device sensing that the user is streaming audio, the switch is automatically moved, adjusted, or manipulated to achieve higher audio signal reception quality. In some embodiments, adjusting the switch occurs manually, for example by a user, manufacturer, designer, etc. of the method.

As used in the description and claims, the singular form "a", "an" and "the" include both singular and plural references unless the context clearly dictates otherwise. For example, the term "sidewall" may include, and is contemplated to include, a plurality of sidewalls. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the systems and methods include the recited elements, and may additionally include any other elements. "Consisting essentially of" shall mean that the systems and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed invention. "Consisting of" shall mean that the systems and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A case for storing a mobile computing device and a wireless earbud, the case comprising:
    a back panel;
    a front panel defining a viewing aperture which extends through the front panel;
    a plurality of sidewalls extending from the back panel and configured to couple a first portion of the back panel to a front panel portion, wherein a subset of the plurality of sidewalls is configured to receive a wireless earbud;
    a dividing layer between the front panel and the back panel, wherein the front panel and the dividing layer together define a first housing configured to receive and restrain a mobile computing device, and the dividing layer and the back panel together define a second housing; and
    a wireless earbud charging contact disposed within the second housing and configured to contact and charge the wireless earbud when the wireless earbud is positioned in the case,
    wherein a thickness of the case is less than a combined thickness of the mobile computing device and the wireless earbud.

2. The case of claim 1, further comprising a rechargeable battery disposed in the second housing, wherein the wireless earbud charging contact is positioned adjacent to the rechargeable battery.

3. The case of claim 1, wherein the back panel, the second portion of the front panel, and the subset of the plurality of sidewalls define an earbud cavity configured to receive the wireless earbud.

4. The case of claim 1, wherein the wireless earbud charging contact is disposed within the second housing between the dividing layer and the back panel.

5. The case of claim 1, wherein the thickness of the wireless earbud equals a thickness of one of: a body of the wireless earbud, a distance from a tip portion of the wireless earbud to a first end of the wireless earbud opposite the tip portion, a distance from a fin portion of the wireless earbud to a second end of the wireless earbud opposite the fin portion, and a combined thickness thereof.

6. A case for storing a mobile computing device and wireless earbuds, the case comprising:
    a back panel;
    a front panel defining a viewing aperture which extends through the front panel;
    a plurality of sidewalls extending from the back panel and configured to couple a first portion of the back panel to a front panel portion, wherein a subset of the plurality of sidewalls is configured to receive a first wireless earbud and a second wireless earbud;
    a dividing layer between the front panel and back panel, wherein the front panel and the dividing layer together define a first housing for receiving and restraining a mobile computing device; and
    an earbud locking mechanism configured to removably secure the first wireless earbud and the second wireless earbud in the case,
        wherein the earbud locking mechanism is adjacent to the first housing and adjacent to the first and second wireless earbuds when the first and second wireless earbuds are positioned in the case,
        wherein the earbud locking mechanism is configured to manipulate one or more stops adjacent to the first and second wireless earbuds when positioned in the case such that displacement of the one or more stops allows the first and second wireless earbuds to be inserted into the case or removed from the case.

7. The case of claim 6, wherein the earbud locking mechanism comprises a stop moveable between a locked position and an unlocked position, wherein, in the locked position, the stop contacts a grooved surface on at least the first wireless earbud to restrict movement of at least the first wireless earbud, and wherein, in the unlocked position, at least the first wireless earbud is removable from the earbud cavity.

8. The case of claim 6, wherein the back panel and the dividing layer together define a second housing for receiving an electrical component.

9. The case of claim 8, wherein the electrical component includes one or more of: a rechargeable battery, a printed circuit board, an earbud charging contact, and an antenna.

10. The case of claim 6, further comprising the first and second wireless earbuds, wherein the first and second wireless earbuds each include a depression configured to engage the earbud locking mechanism.

11. A case for storing a mobile computing device and wireless earbuds, the case comprising:
    a back panel;
    a front panel defining a viewing aperture which extends through the front panel;
    a plurality of sidewalls extending from the back panel and configured to couple a first portion of the back panel to a front panel portion, wherein a subset of the plurality of sidewalls define a top edge of the case, and
wherein the top edge is configured to receive a first wireless earbud and a second wireless earbud; and
a dividing layer between the front panel and the back panel,
wherein the front panel and the dividing layer together define a housing for receiving and restraining the mobile computing device,
wherein the dividing layer and the back panel together define a second housing, and wherein the earbud cavity is inline with a first plane of the first housing, a second plane of the dividing layer, and a third plane of the second housing.

12. The case of claim 11, wherein the back panel is planar.

13. The case of claim 11, wherein a front surface portion and a back surface portion of each of the first and second wireless earbuds are exposed for pinch removal of the first and second wireless earbuds from the earbud cavity.

14. The case of claim 11, wherein the earbud cavity is configured to charge one or more of the first wireless earbud and the second wireless earbud when the first and second wireless earbuds are positioned in the earbud cavity.

15. The case of claim 11, wherein the front panel and back panel are transitionable between a coupled state and a decoupled state, wherein the mobile computing device is restrained in the case in the coupled state.

16. The case of claim 11, wherein the top edge is opposite a bottom portion of the case, wherein the bottom portion comprises a connector configured to electrically couple the case to the mobile computing device.

17. The case of claim 11, wherein a thickness of the case equals a maximum thickness of the case at a region between the front panel and the back panel.

* * * * *